US012401147B2

(12) United States Patent
Kitazawa

(10) Patent No.: US 12,401,147 B2
(45) Date of Patent: Aug. 26, 2025

(54) CONNECTOR

(71) Applicant: Molex, LLC, Lisle, IL (US)

(72) Inventor: Sho Kitazawa, Yamato (JP)

(73) Assignee: Molex, LLC, Lisle, IL (US)

( * ) Notice: Subject to any disclaimer, the term of this patent is extended or adjusted under 35 U.S.C. 154(b) by 612 days.

(21) Appl. No.: 17/858,667

(22) Filed: Jul. 6, 2022

(65) Prior Publication Data

US 2023/0011865 A1 Jan. 12, 2023

(30) Foreign Application Priority Data

Jul. 7, 2021 (JP) ................................ 2021-112694

(51) Int. Cl.

| | |
|---|---|
| ***H01R 12/71*** | (2011.01) |
| ***H01R 12/91*** | (2011.01) |
| ***H01R 13/426*** | (2006.01) |
| ***H01R 13/631*** | (2006.01) |
| ***H01R 13/6474*** | (2011.01) |

(52) U.S. Cl.
CPC .......... *H01R 12/716* (2013.01); *H01R 12/91* (2013.01); *H01R 13/426* (2013.01); *H01R 13/6315* (2013.01); *H01R 13/6474* (2013.01)

(58) Field of Classification Search
CPC .... H01R 12/716; H01R 12/91; H01R 13/426; H01R 13/6315; H01R 13/6474; H01R 12/7088
See application file for complete search history.

(56) References Cited

U.S. PATENT DOCUMENTS

2020/0412038 A1 12/2020 Yoshida

FOREIGN PATENT DOCUMENTS

| | | |
|---|---|---|
| CN | 206076547 U | 4/2017 |
| EP | 3696921 A1 | 8/2020 |
| JP | 2015035283 A | 2/2015 |
| JP | 2017079214 A | 4/2017 |
| JP | 2020035539 A | 3/2020 |
| JP | 2020087837 A | 6/2020 |
| JP | 2021093244 A | 6/2021 |
| JP | 2021093249 A | 6/2021 |

OTHER PUBLICATIONS

Extended European Search Report and Opinion received for EP Application No. 22183008.6, mailed on Dec. 6, 2022, 11 pages.

*Primary Examiner* — Briggitte R. Hammond

(57) ABSTRACT

The fixed housing includes a long wall portion extending in the longitudinal direction of the connector and a short wall portion extending in the width direction of the connector and connected to the long wall portion. The movable housing includes a long wall portion extending in the longitudinal direction of the connector and a short wall portion extending in the width direction of the connector and connected to the long wall portion. The power supply terminal includes a fixed-side retained portion retained on the short wall portion of the fixed housing, a movable-side retained portion retained on the movable housing, and a bent portion connected to the fixed-side retained portion and the movable-side retained portion. The movable-side retained portion includes a first retained portion retained on the short wall portion and a second retained portion retained on the long wall portion.

20 Claims, 37 Drawing Sheets

FIG. 15A
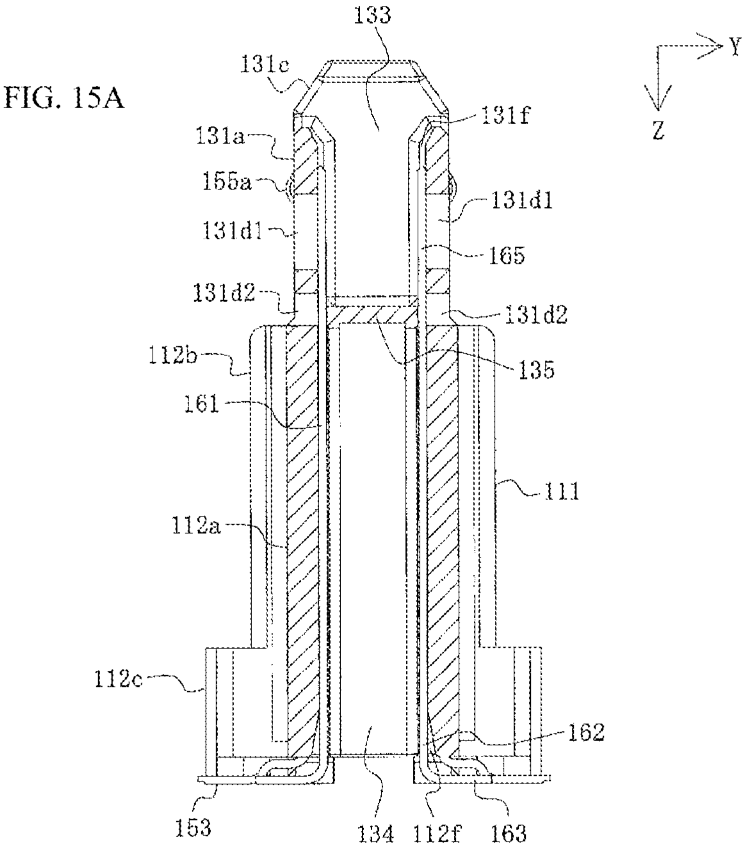
FIG. 15C
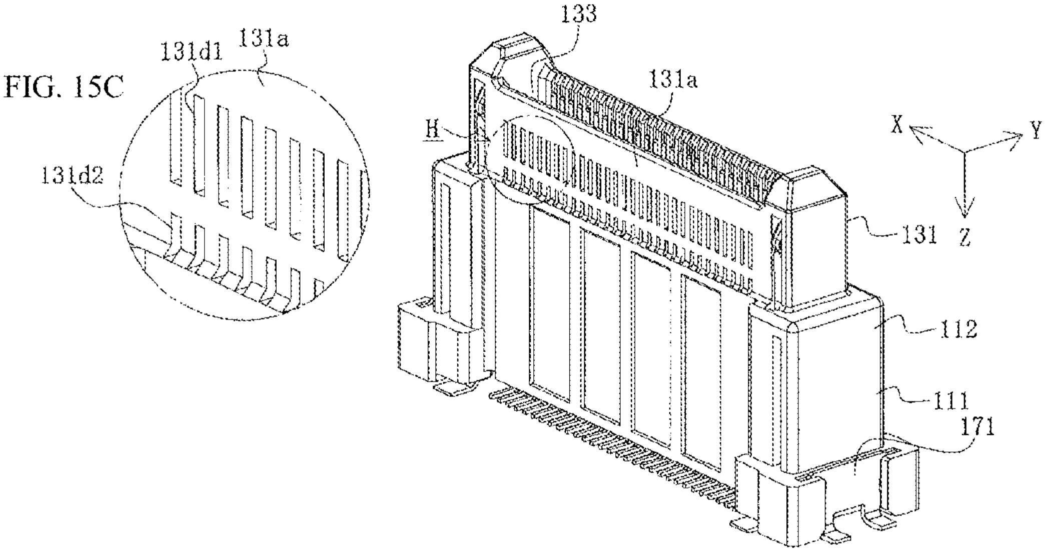
FIG. 15B

FIG. 27A
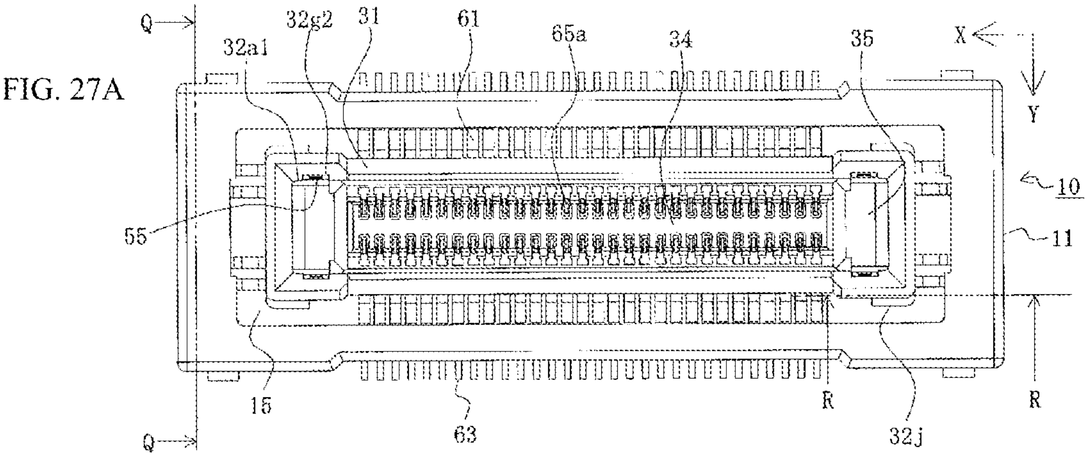
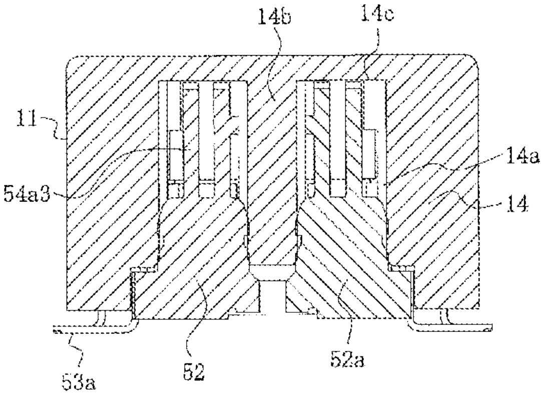
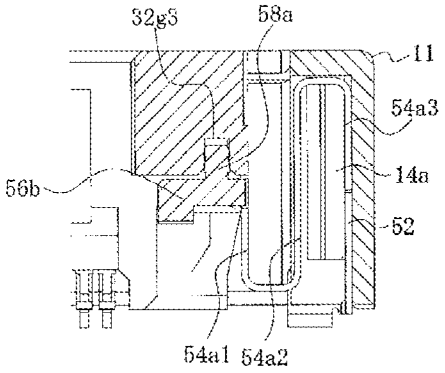
FIG. 27B
FIG. 27C

FIG. 33A
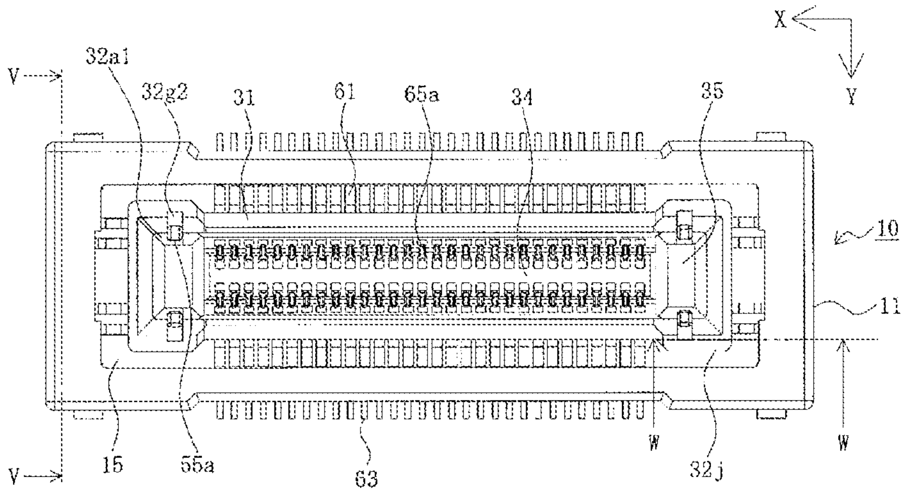
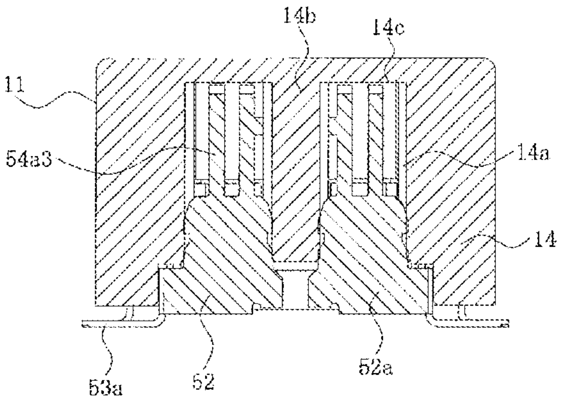
FIG. 33B
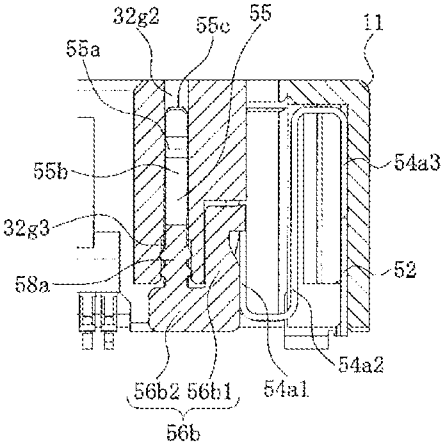
FIG. 33C

Prior art

CONNECTOR

TECHNICAL FIELD

The present disclosure relates to a connector.

BACKGROUND ART

Conventionally, board-to-board connectors have been used to electrically connect pairs of circuit boards to each other. However, the relative positions of the circuit boards set in advance may shift. Therefore, in order to absorb misalignment of the circuit board, providing a floating structure for one or both connectors has been proposed (see, for example, Patent Document 1).

FIG. 37 is a perspective view illustrating a conventional board-to-board connector prior to mating.

In the diagram, 810 is a floating connector mounted on a surface of the first circuit board 891 and includes a fixed housing 811 fixed to the surface of the first circuit board 891 and a movable housing 831 connected in a movable manner to the fixed housing 811. The floating connector 810 includes a plurality of signal terminals 861 and a power supply terminal 851.

On the other hand, the counterpart connector 910 includes a counterpart housing 911 secured to a surface of a second circuit board 991 and a counterpart signal terminal 961 and a counterpart power supply terminal 951 attached to the counterpart housing 911.

With the floating connector 810, each signal terminal 861 has a contact portion 865 that contacts the counterpart signal terminal 961 of the counterpart connector 910, a board connecting portion 863 that is connected to the surface of the first circuit board 891, and an elastic deformation portion (not shown) formed between the contact portion 865 and the board connecting portion 863. In addition, each power supply terminal 851 also has a contact portion 855 that contacts the counterpart power supply terminal 951 of the counterpart connector 910, a board connecting portion 853 that is connected and fixed to the surface of the first circuit board 891, and an elastic deformation portion (not shown) formed between the contact portion 855 and the board connecting portion 853.

The contact portion 865 of the signal terminal 861 and the contact portion 855 of the power supply terminal 851 are attached to the movable housing 831. The board connecting portion 863 of the signal terminal 861 and the board connecting portion 853 of the power supply terminal 851 are attached to the movable housing 831, connected, and fixed to the surface of the first circuit board 891. Therefore, the movable housing 831 can move relative to the fixed housing 811 fixed on the surface of the first circuit board 891 if the elastic deformation portion of the signal terminal 861 or the elastic deformation portion of the power supply terminal 851 are deformed. Note that the fixed housing 811 is fixed to the surface of the first circuit board 891 with a fixation fitting 875.

Furthermore, in a state where the floating connector 810 and the counterpart connector 910 are mated, the movable housing 831 and the counterpart housing 911 mate together, the contact portion 865 of the signal terminal 861 is in contact with the counterpart signal terminal 961, and the contact portion 855 of the power supply terminal 851 is in contact with the counterpart power supply terminal 951. Accordingly, the first circuit board 891 and the second circuit board 991 are electrically connected. Also, even if alignment offset occurs between the floating connector 810 and the counterpart connector 910, this can be reliably absorbed.

Patent Document 1: Japanese Unexamined Patent Application 2017-079214

SUMMARY

However, with the conventional connector, the elastic deformation portion of the signal terminal 861 and the elastic deformation portion of the power supply terminal 851 have the same form, and thus readily elastically deform in a similar direction so position offset between the floating connector 810 and the counterpart connector 910 may not be appropriately absorbed depending on the direction thereof. In addition, since the reinforcing member made of metal is not attached to the mating end of the movable housing 831 or the mating end of the counterpart housing 911, the mating end of the movable housing 831 or the counterpart housing 911 may be injured or damaged during mating operation.

To prevent this manner of situation from happening, the elastic deformation portion of the signal terminal 861 or the power supply terminal 851 may be increased in size, the pitch thereof may be widened to increase the degree of freedom of deformation, the mating end of the movable housing 831 or the counterpart housing 911 may be enlarged, or a separate reinforcing fitting may be attached so that damage occurs less readily. However, in recent years, miniaturization of electronic components and electronic devices have led to size reduction of connectors as well. Therefore, dimensions and pitch of every component of terminals have become extremely fine and similarly, attaching a separate reinforcing member that would increase dimensions of every part of the housing, is difficult.

Here, to resolve the conventional problems described above, an object is to provide a connector with a high degree of freedom of displacement of the movable housing, that enables reliably maintaining a mated state, that enables size reduction, that has a simple construction, that has a small number of components, that is simple to manufacture, that is low cost, and that has high reliability.

To resolve the problems, a connector is provided with a fixed housing, a movable housing movable relative to the fixed housing, and power supply terminals retained in the fixed housing and the movable housing, wherein the fixed housing includes a long wall portion extending in the longitudinal direction of the connector and a short wall portion extending in the width direction of the connector and connected to the end portion of the long wall portion, the movable housing includes a long wall portion extending in the longitudinal direction of the connector and a short wall portion extending in the width direction of the connector and connected to the end portion of the long wall portion, the power supply terminals include a fixed-side retained portion retained in the short wall portion of the fixed housing, a movable-side retained portion retained in the movable housing, and a bent portion connected to the fixed-side retained portion and the movable-side retained portion, and the movable-side retained portion includes a first retained portion with at least a portion extending along the short wall portion and a second retained portion with at least a portion extending along the long wall portion.

With another connector, the first retained portion includes a first upper end cover portion covering an upper end portion of the short wall portion, and the second retained portion includes a second upper end cover portion covering an upper end portion of the long wall portion.

With still another connector, the second retained portion is arranged inside the long wall portion and is connected to a contact portion that comes into contact with the counterpart power supply terminal.

With still another connector, the contact portion extends in the vertical direction along an inner surface of the long wall portion.

With still another connector, the contact portion includes a contact arm portion that extends in the vertical direction at an incline with respect to an inner surface of the long wall portion, and a contact protruding portion that is connected to an upper end of the contact arm portion and bulges inward in the width direction of the connector.

With still another connector, a second retained portion of the movable-side retained portion includes an engaged portion that is engaged to the movable housing.

With still another connector, the engaged portion is inserted and engaged from below in an engagement recess portion in which the lower end is open to the downward facing surface of the movable housing.

With still another connector, the bent portion is bent in a substantially S-shape when viewed from the width direction of the connector, having a first end connected to an upper end of the fixed-side retained portion and a second end connected to a lower end of a first retained portion of the movable-side retained portion.

With still another connector, the power supply terminal includes a board connecting portion connected to the fixed-side retained portion, and the board connecting portion includes a relay portion extending from the fixed-side retained portion toward the center of the connector in a longitudinal direction and a main body portion connected to the relay portion that extends towards the outside of the connector in the width direction.

With still another connector, the power supply terminals are arranged in pairs at both ends of the connector in the longitudinal direction lined up in the width direction of the connector respectively at both ends in the longitudinal direction.

According to the present disclosure, the connector is capable of ensuring a high degree of freedom of displacement of the movable housing and maintaining a mated state. In addition, the size can be reduced, the structure is simple, the number of components is low, manufacturing is simple, cost can be reduced, and reliability is high.

BRIEF DESCRIPTION OF THE DRAWINGS

FIG. 1A illustrates a state of being mated. FIG. 1B illustrates a state prior to being mated.

FIG. 3A is a plan view, FIG. 3B is a side view, FIG. 3C is a bottom view, and FIG. 3D is a front view.

FIG. 5A illustrates a signal terminal. FIG. 5B illustrates a power supply terminal.

FIG. 6A is an overall diagram. FIG. 6B is a sectional view taken along the line A-A in FIG. 6A.

FIG. 8A is a perspective view of the first connector as viewed diagonally from above. FIG. 8B is an enlarged view of part B of FIG. 8A. FIG. 8C is a plan view of the first connector. FIG. 8D is an enlarged view of part C of FIG. 8C.

FIG. 9A is a sectional view taken along the line D-D of FIG. 3A. FIG. 9B is an enlarged view of part E of FIG. 9A.

FIG. 10A is a perspective view of the fixed terminal of the first connector as viewed diagonally from below. FIG. 10B is an enlarged view of part F of FIG. 10A.

FIG. 12A is a plan view, FIG. 12 B is a side view, FIG. 12C is a bottom view, and FIG. 12D is a front view.

FIG. 14A illustrates a signal terminal. FIG. 14B illustrates a power supply terminal.

FIGS. 15A-15C are diagrams illustrating an attaching portion of the second connector signal terminal to the fixed housing according to Embodiment 1. FIG. 15A is a sectional view taken along the line G-G of FIG. 12A. FIG. 15B is a perspective view. FIG. 15C is an enlarged view of part H of FIG. 15B.

FIG. 16A is a plan view from the second connector side. FIG. 16B is a sectional view taken along the line I-I of FIG. 16A. FIG. 16C is a sectional view taken along the line J-J of FIG. 16A.

FIG. 19A is a perspective view including a cross section of the first connector as viewed diagonally from below. FIG. 19B is a perspective view including a side cross section of the first connector as viewed diagonally from below.

FIG. 20A is a plan view of the first connector. FIG. 20B is a sectional view taken along the line L-L of FIG. 20A. FIG. 20C is a sectional view taken along the line M-M of FIG. 20A.

FIG. 22A is a plan view as viewed from the second connector side. FIG. 22B is a sectional view taken along the line N-N of FIG. 22A. FIG. 22C is a sectional view taken along the line O—O of FIG. 22A.

FIG. 24A illustrates a state of being mated. FIG. 24B illustrates a state prior to being mated.

FIG. 26A is a perspective view including a cross section of the first connector as viewed diagonally from below. FIG. 26B is a perspective view including a side cross section of the first connector as viewed diagonally from below.

FIGS. 27A-27C illustrate a mounting portion of the first connector power supply terminal onto the movable housing according to Embodiment 3. FIG. 27A is a plan view of the first connector. FIG. 20B is a sectional view taken along the line Q-Q of FIG. 27A. FIG. 27C is a sectional view taken along the line R-R of FIG. 27A.

FIG. 29A is a plan view from the second connector side. FIG. 29B is a sectional view taken along the line I-I of FIG. 29A. FIG. 29C is a sectional view taken along the line J-J of FIG. 29A.

FIG. 32A is a perspective view including a cross section of the first connector as viewed diagonally from below. FIG. 32B is a perspective view including a side cross section of the first connector as viewed diagonally from below.

FIGS. 33A-33C illustrate a mounting portion of the first connector power supply terminal onto the movable housing according to Embodiment 4. FIG. 33A is a plan view of the first connector. FIG. 33B is a sectional view taken along the line Q-Q of FIG. 33A. FIG. 33C is a sectional view taken along the line R-R of FIG. 33A.

FIG. 35A is a plan view from the second connector side. FIG. 35B is a sectional view taken along the line I-I of FIG. 35A. FIG. 35C is a sectional view taken along the line J-J of FIG. 35A.

DETAILED DESCRIPTION OF THE PREFERRED EMBODIMENTS

Embodiments will hereinafter be described in detail with reference to the drawings.

Figure 2:
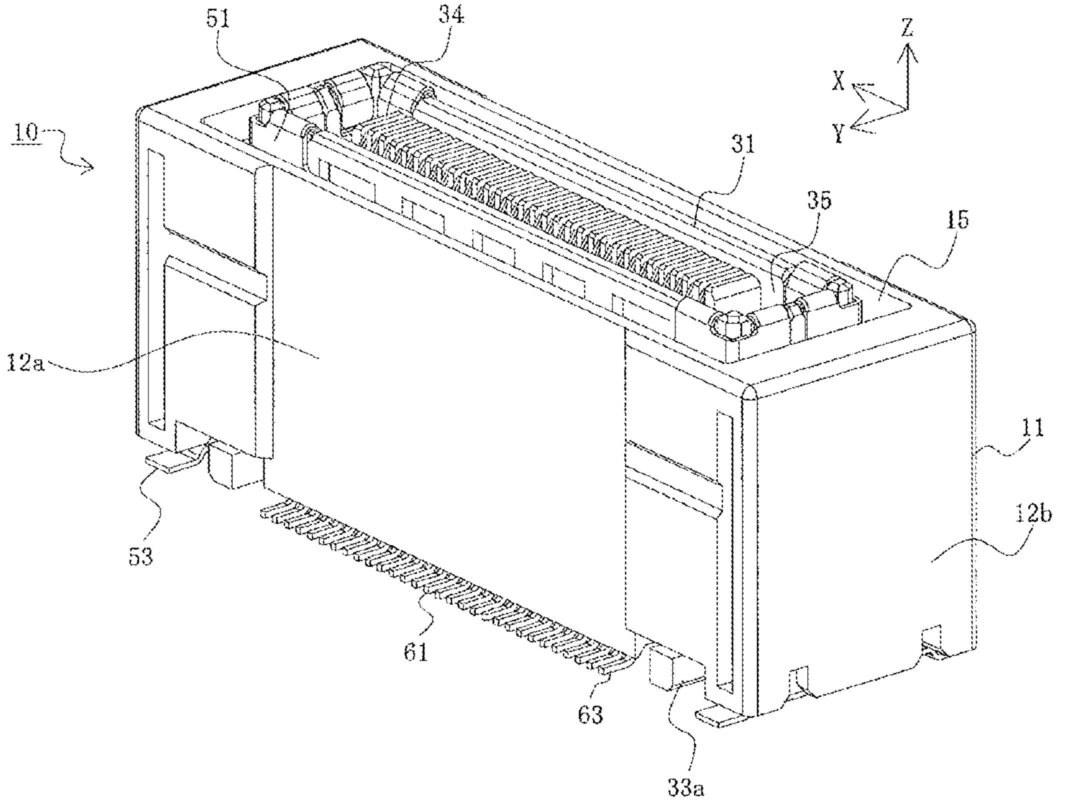
FIG. 2 is a perspective view illustrating the first connector according to Embodiment 1.
Figures 3A, 3B, 3C, 3D:
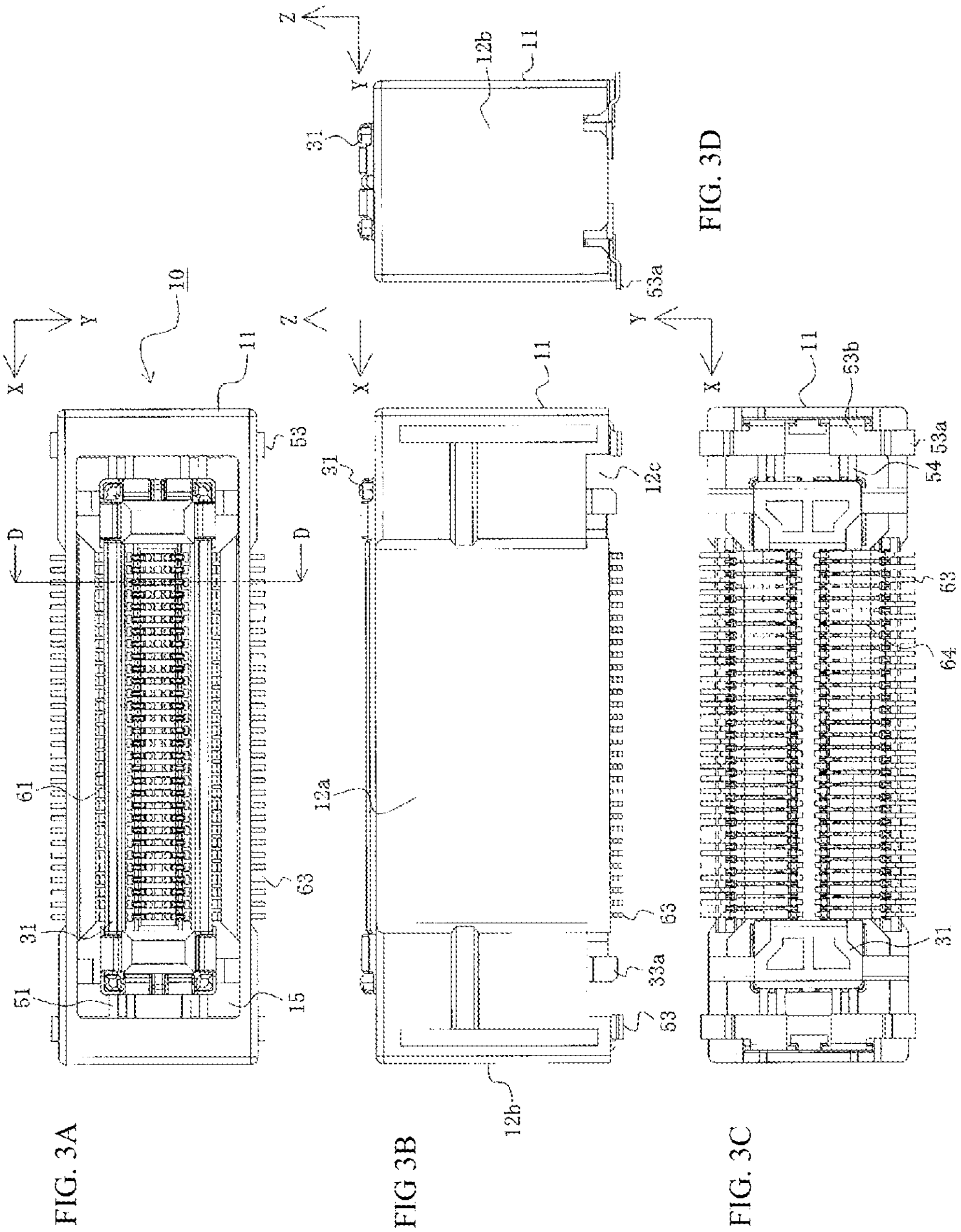
FIGS. 3A-3D are a four-plane diagram of the first connector according to Embodiment 1, where
Figure 4:
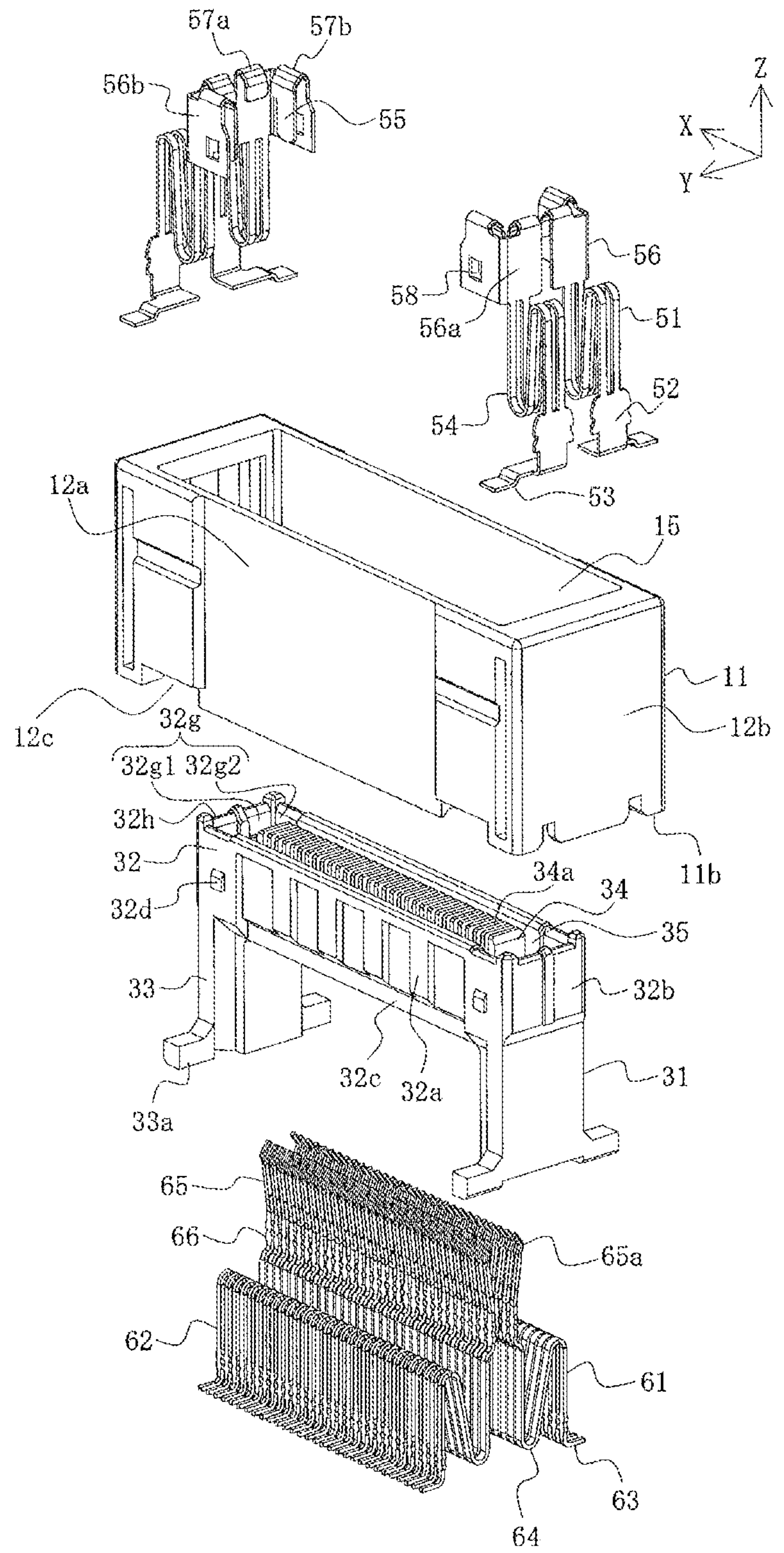
FIG. 4 is an exploded view of the first connector according to Embodiment 1.
Figure 5A:
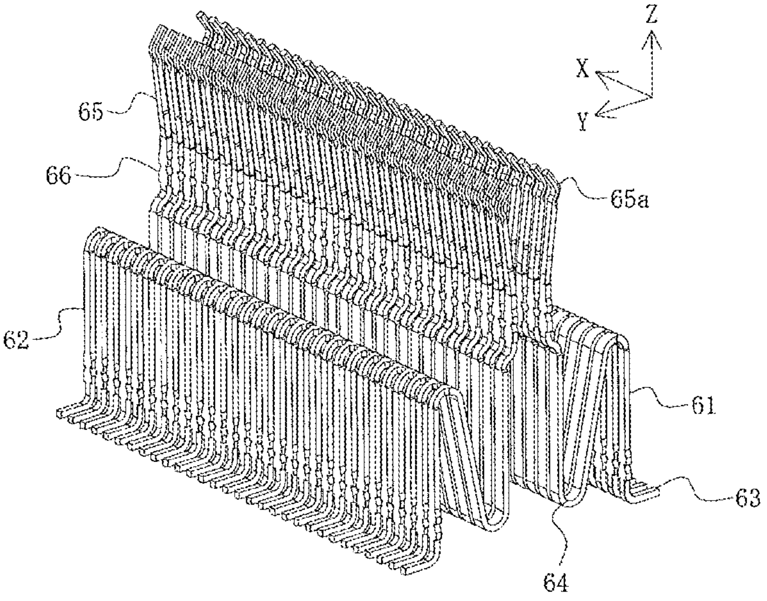
FIGS. 5A and 5B are perspective views illustrating a terminal of the first connector according to Embodiment 1.
Figure 5B:
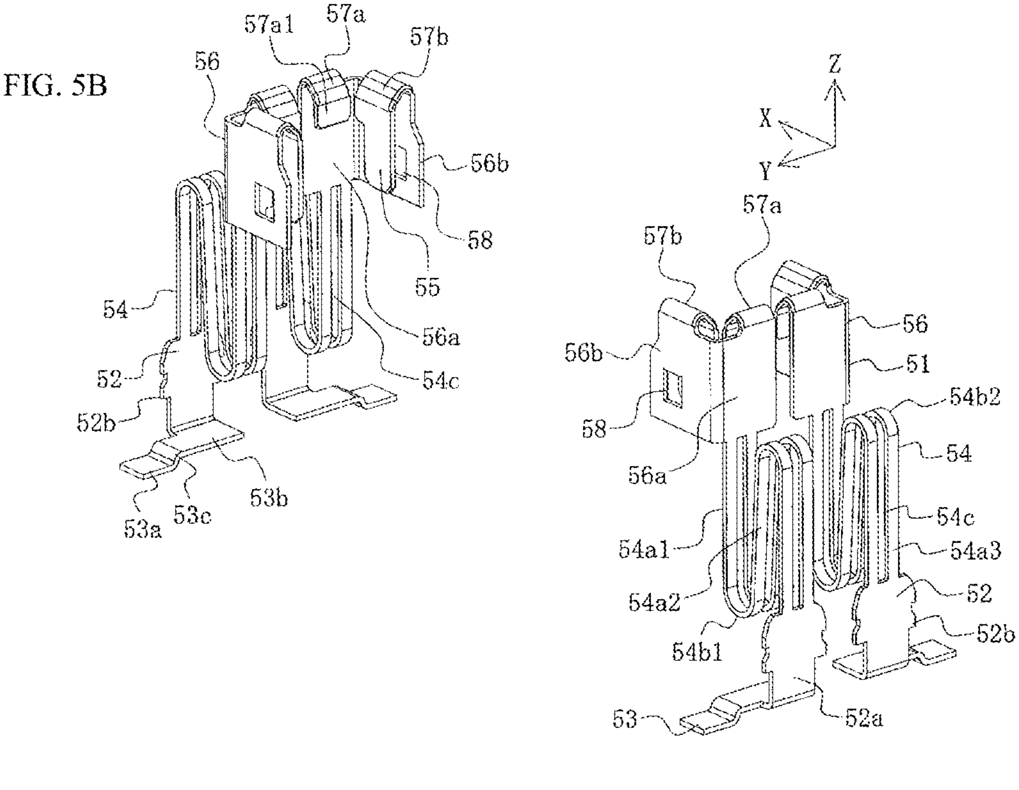
Figure 6A:
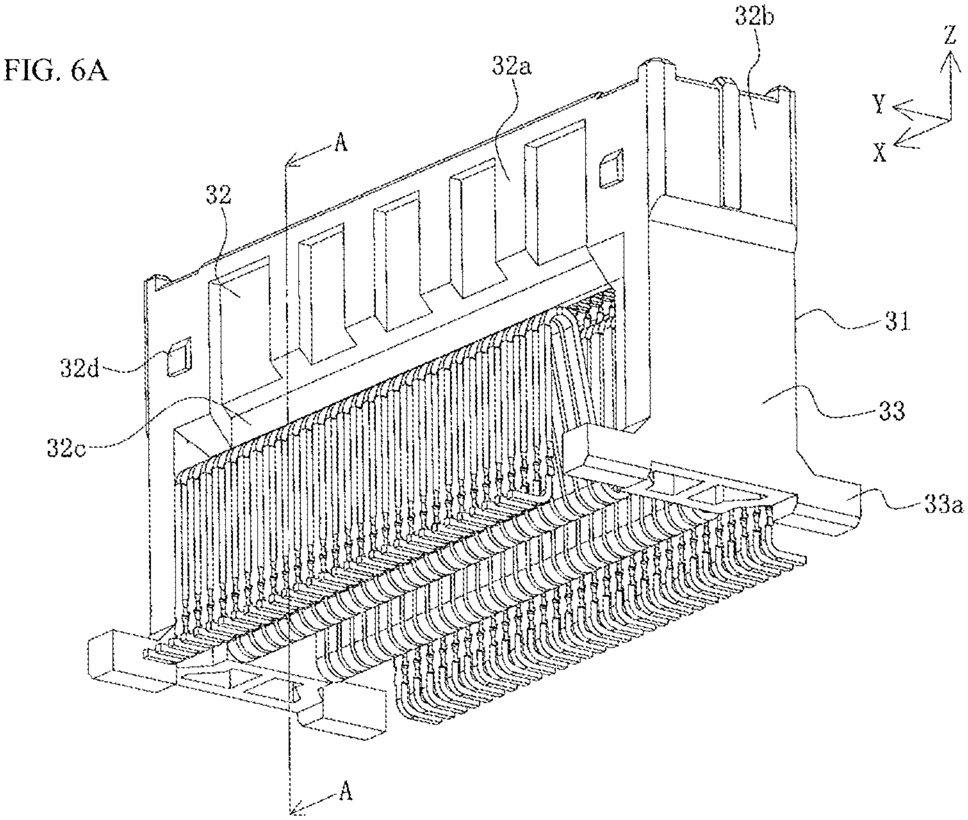
FIGS. 6A and 6B are perspective views of the relationship between the movable housing and the signal terminal of the first connector according to Embodiment 1 as viewed diagonally from below.
Figure 6B:
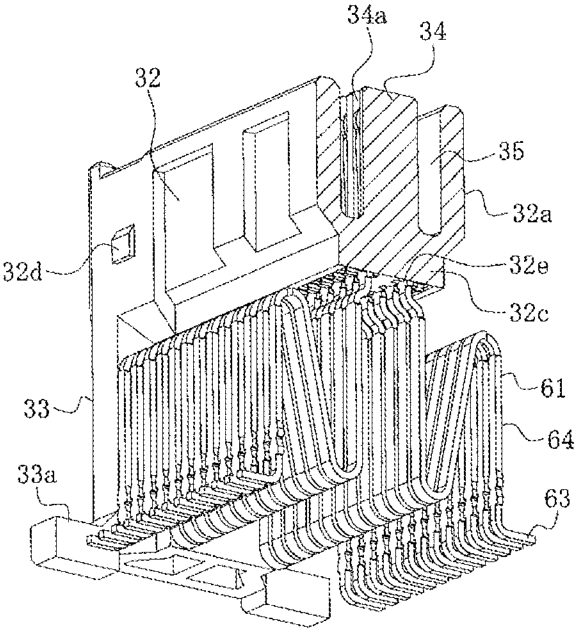
Figure 7:
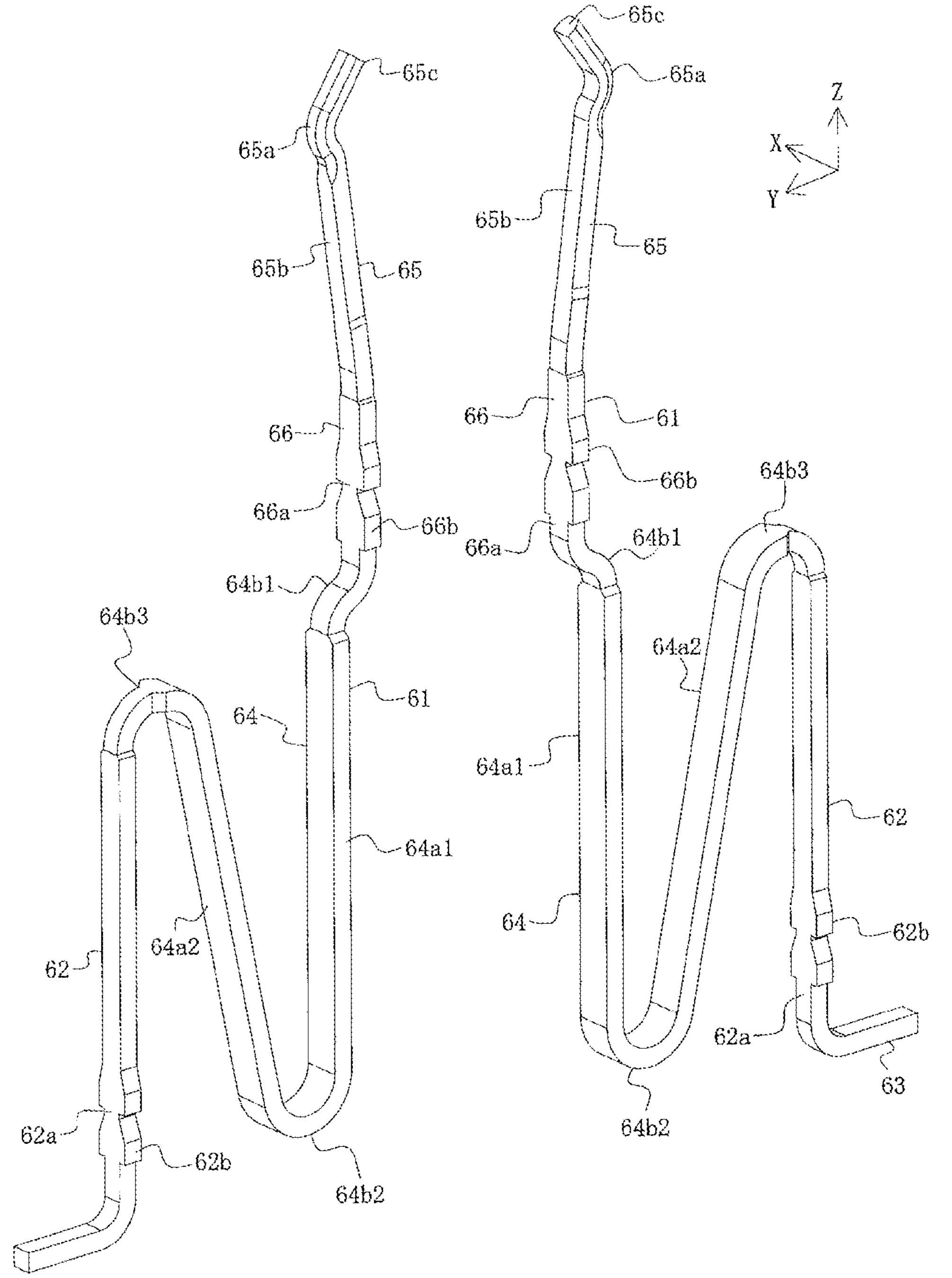
FIG. 7 is a perspective view of one signal terminal assembly of the first connector according to Embodiment 1.
Figure 8B:
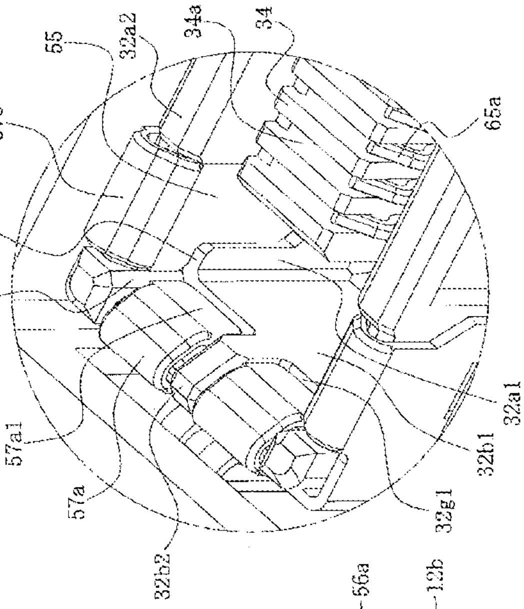
FIGS. 8A-8D are diagrams illustrating an attaching portion of the power supply terminal of the first connector onto the movable housing according to Embodiment 1.
Figure 8D:
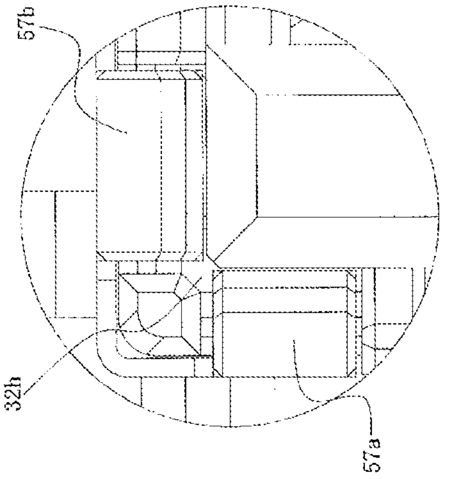
Figure 8A:
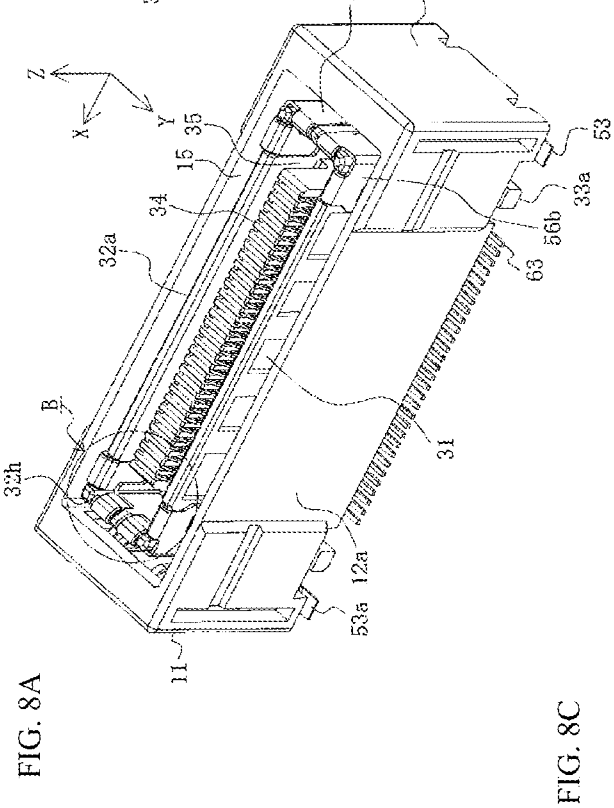
Figure 8C:
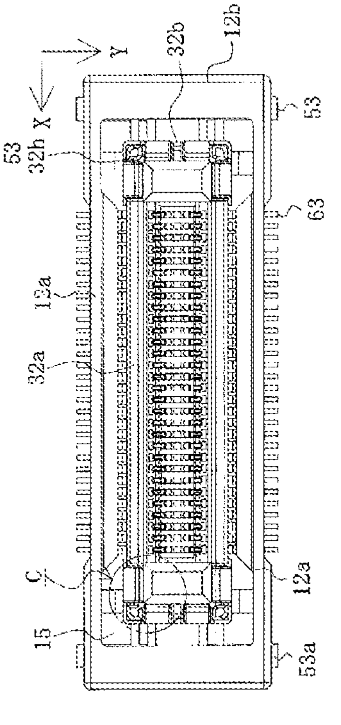
Figure 9B:
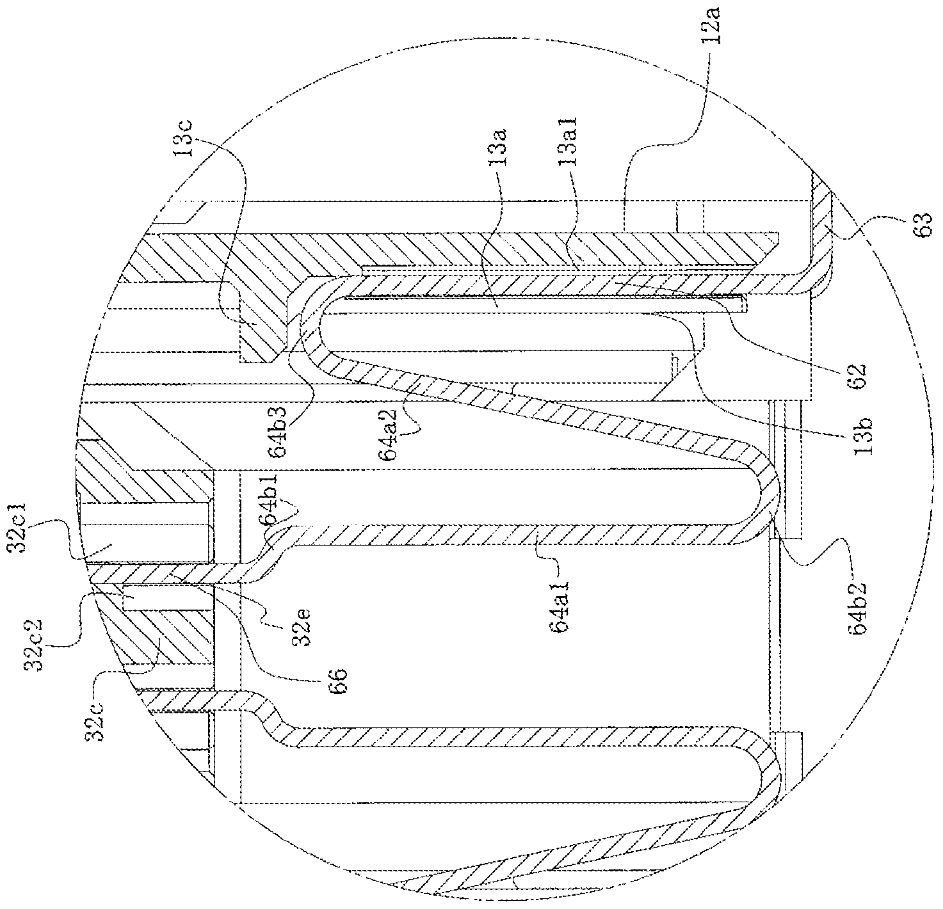
FIGS. 9A and 9B are diagrams illustrating an attaching portion of the fixed housing of the first connector signal terminal to the movable housing according to Embodiment 1.
Figure 9A:
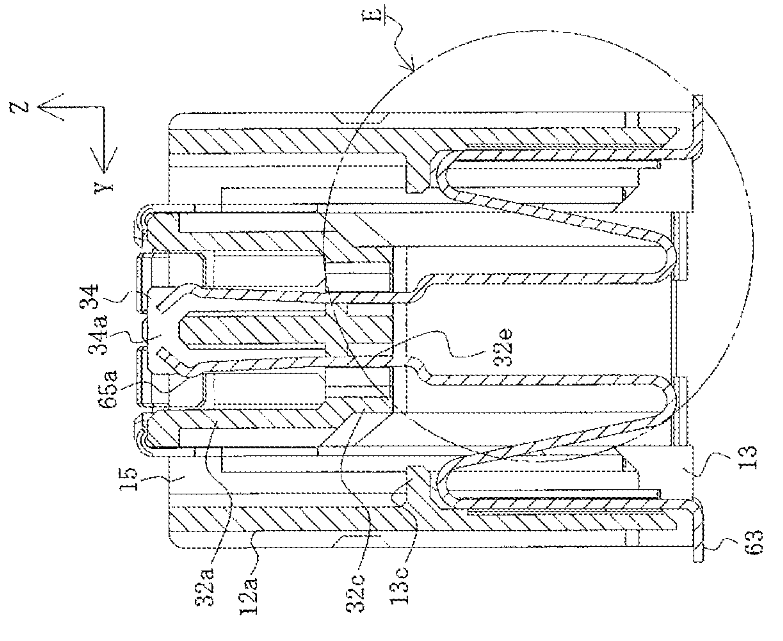
Figure 10A:
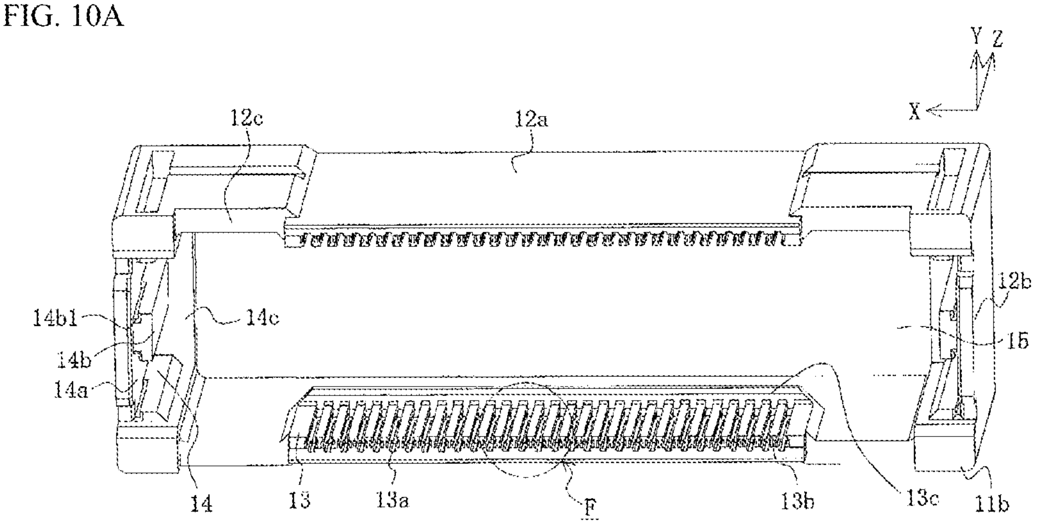
FIGS. 10A and 10B are diagrams illustrating a terminal mounting portion of a fixed housing of the first connector according to Embodiment 1.
Figure 10B:
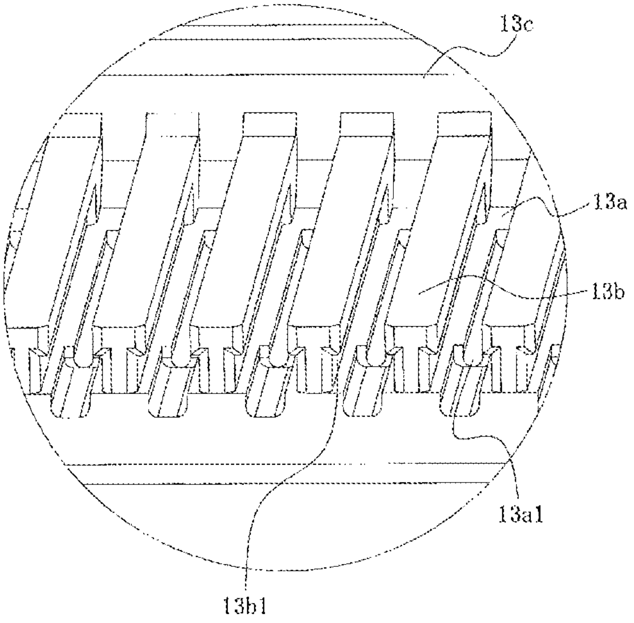

FIG. 1 is a perspective view illustrating the first connector and the second connector according to Embodiment 1. FIG. 2 is a perspective view of the first connector according to Embodiment 1. FIGS. 3A-3D are four views of the first connector according to Embodiment 1. FIG. 4 is an exploded view of the first connector according to Embodiment 1. FIGS. 5A and 5B are perspective views of the first connector terminals according to Embodiment 1. FIGS. 6A and 6B are perspective views diagonally from below of the relationship between the movable housing and the signal terminal of the first connector according to Embodiment 1. FIG. 7 is a perspective view of one signal terminal assembly of the first connector according to Embodiment 1. FIGS. 8A-8D illustrate a mounting portion of the power supply terminal of the first connector to the movable housing according to Embodiment 1. FIGS. 9A and 9B illustrate a mounting portion of the signal terminal of the first connector to the fixed housing and the movable housing in Embodiment 1. FIGS. 10A and 10B illustrate a terminal mounting portion of the fixed housing of the first connector according to Embodiment 1.

Figure 1A:
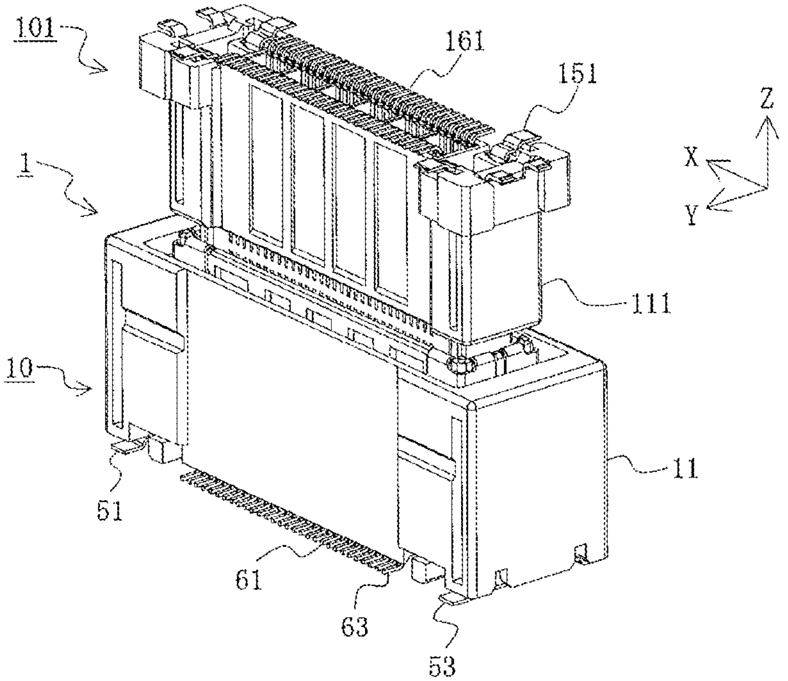
FIGS. 1A and 1B are perspective views illustrating the first connector and the second connector of Embodiment 1.
Figure 1B:
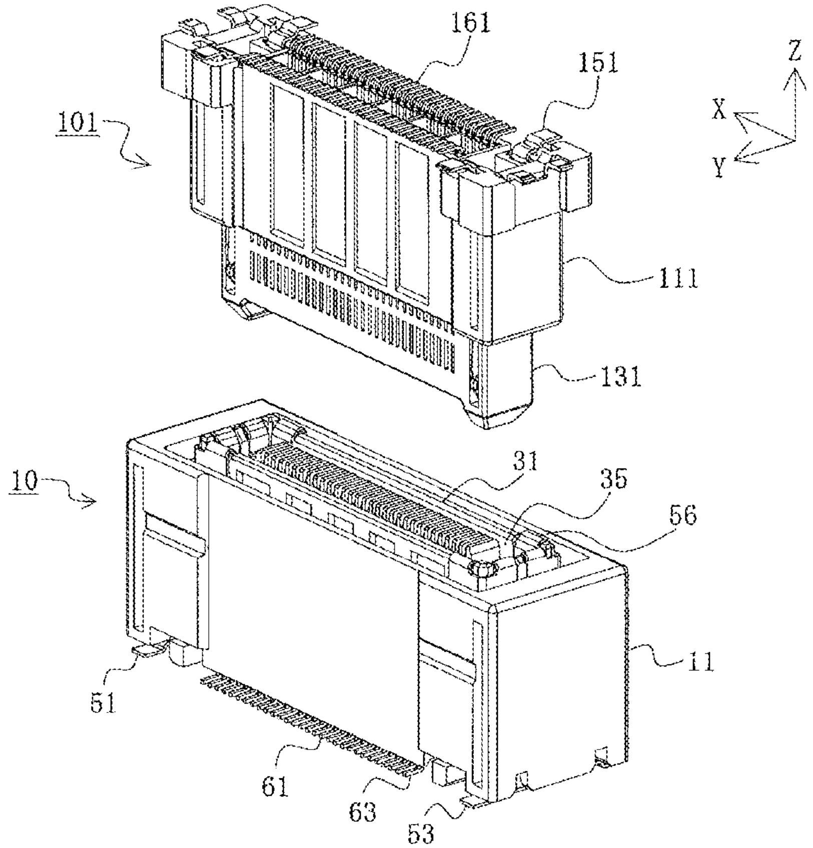

Note, FIG. 1A is a diagram illustrating a mated state and FIG. 1B is a diagram illustrating a state prior to mating. FIG. 3A is a top view, FIG. 3B is a side view, FIG. 3C is a bottom view, and FIG. 3D is a front view. FIG. 5A is a diagram illustrating a signal terminal, and FIG. 5B is a diagram illustrating a power supply terminal. FIG. 6A is a view illustrating the whole, and FIG. 6B is a sectional view taken along the line A-A in FIG. 6A. FIG. 8A is a perspective view of the first connector as seen diagonally from above, FIG. 8B is an enlarged view of part B in FIG. 8A, FIG. 8C is a top view of the first connector, and FIG. 8D is an enlarged view of part C in FIG. 8C. In FIG. 9A is a sectional view taken along the line D-D in FIG. 3A and FIG. 9B is an enlarged view of part E in FIG. 9A. FIG. 10A is a perspective view of the fixed terminal of the first connector as seen diagonally from below, and FIG. 10B is an enlarged view of part F in FIG. 10A.

In the diagrams, 10 represents a first connector as one of a board to board connector 1, which are connectors of Embodiment 1, in other words, the present Embodiment. The first connector 10 is a surface mounting type receptacle connector mounted on a surface of a first board that is a board (not shown) serving as a mounting member and is mated together with a second connector 101 serving as a counterpart connector. The first connector 10 is a so-called floating type connector, and includes a first fixed housing 11 as a fixed housing fixedly attached to a surface of the first board, and a first movable housing 31 as a movable housing movable with respect to the first fixed housing 11.

Furthermore, the second connector 101 is the other of the pair of board to board connectors 1 and is a surface mounting type plug connector mounted on a surface of a second board (not shown) serving as a mounting member. The second connector 101 is not a so-called floating type connector, and includes only a second housing 111 as a counterpart housing that is a fixed housing fixedly attached to a surface of the second board, and does not include a movable housing that is able to move.

Note that the first connector 10 and the second connector 101 of the connector pair according to the present embodiment are preferably used to electrically connect the first board to the second board but can also be used to electrically connect other members. For example, the first substrate and the second substrate are each a printed circuit board, a flexible flat cable (FFC), a flexible circuit board (FPC), or the like as used in electronic devices or the like, but may be any type of substrate.

Note, in the present embodiment, expressions indicating direction such as up, down, left, right, front, rear, and the like used to describe a configuration and operation of each part of the connector pair first connector 10 and the second connector 101 are relative rather than absolute and are appropriate when each part of the first connector 10 and the second connector 101 are in positions illustrated in the drawings. However, these directions should be interpreted as changing in accordance with a change in position when the position thereof is changed.

As illustrated in FIGS. 3A-3D, the first connector 10 is configured so as to be left-right symmetrical in the width direction (Y-axis direction), and is also configured to be left-right symmetrical when viewed in the longitudinal direction (X-axis direction). The first fixed housing 11 and the first movable housing 31 of the first connector 10 are each members integrally formed by an insulator (dielectric) such as a synthetic resin.

The first fixed housing 11 is a substantially square columnar member, and includes a pair of rectangular flat plate-shaped long wall portions 12*a* that are mutually parallel extending in the longitudinal direction of the first connector 10, short wall portions 12*b* that are a mutually parallel pair of rectangular thick plate-like members extending in the width direction of the first connector 10, are shorter than the long wall portions 12*a*, and connect the end portions of the long wall portions 12*a* in the longitudinal direction, and a movable housing cavity for stowing 15 demarcated by the four surfaces of the long wall portions 12*a* and the short wall portions 12*b* and is a hollow square columnar shape that is open at the top and bottom (both ends in the Z-axis direction). The lower surface of the first fixed housing 11 is a mounting surface 11*b* facing the surface of the first board. Furthermore, as illustrated in FIGS. 10A and 10B, a signal terminal mounting portion 13 is formed on the surface of each long wall portion 12*a* on the movable housing cavity for stowing 15 side (negative direction end of the Z-axis), that is, on the inner surface, and a power supply terminal mounting portion 14 is formed on the inner surface at the lower end of each short wall portion 12*b*.

Note that at the lower end of each long wall portion 12*a*, a lower end notch 12*c* is formed at locations adjacent on both sides in the longitudinal direction of the signal terminal mounting portion 13. When the first movable housing 31 is stowed in the movable housing cavity for stowing 15, foot portions 33*a* extending outward in the width direction (Y-axis direction) from the lower end of a pair of leg portions 33 positioned at both ends of the first movable housing 31 in the longitudinal direction (X-axis direction) are stowed in the lower end notch 12*c*. Accordingly, the movable range of the first movable housing 31 with respect to the first fixed housing 11 is appropriately limited in the longitudinal direction and the vertical direction.

A signal terminal fixed-side retention recess 13*a* is formed in the signal terminal mounting portion 13 that retains the fixed-side retained portion 62 of a first signal terminal 61 that is a signal terminal out of the first terminals the first connector 10 is provided with. Each signal terminal fixed-side retention recess 13*a* is an elongated groove shaped recessed portion extending in the vertical direction (Z-axis direction), and the fixed-side retained portion 62 of each of the first signal terminals 61 is stowed therein. In addition, there is a signal terminal fixed-side retention wall 13*b* formed so as to protrude relatively toward the center of the first fixed housing 11 in the width direction on both sides of each signal terminal fixed-side retention recess 13*a*. Furthermore, a signal terminal fixed-side retention groove 13*b*1 extending upward from the lower end is formed on both side surfaces of each signal terminal fixed-side retention recess 13*a*, that is, the side wall surface of the signal terminal fixed-side retention wall 13*b*. In addition, the bottom surface of each signal terminal fixed-side retention recess 13*a* has a signal terminal fixed-side retention portion thickness reduction 13*a*1 formed as a long groove recessed portion thickness reduction extending in the vertical direction. The signal terminal fixed-side retention portion thickness reduction 13*a*1 is formed to match the impedance of the first signal terminal 61. Furthermore, the upper end of the signal terminal mounting portion 13 protrudes toward the center in the width direction of the first fixed housing 11 where a brim portion 13*c* is formed, demarcating the upper end of the signal terminal fixed-side retention recess 13*a*. Note that in the example illustrated in the drawings, there are thirty signal terminal fixed-side retention recesses 13*a* formed respectively for the signal terminal mounting portions 13 on the left and the right of the first fixed housing 11. This number is changed according to the number of first signal terminals 61.

Additionally, power supply terminal fixed-side retention recesses 14*a* are formed in the power supply terminal mounting portion 14 for retaining power supply terminals of the first terminals provided in the first connector 10, in other words, for retaining a fixed-side retained portion 52 of first power supply terminals 51 that are power supply terminals. Each power supply terminal fixed-side retention recess 14*a* is a narrow long groove-shaped recess extending in the vertical direction, in which the fixed-side retained portion 52 of each first power supply terminal 51 is stowed and retained. In addition, power supply terminal fixed-side retention walls 14*b* are formed on both sides of each power supply terminal fixed-side retention recess 14*a* protruding relatively toward the center of the first fixed housing 11 in the longitudinal direction. A power supply terminal fixed-side retention groove 14*b*1 extending upward from the lower end is formed on both side surfaces of each power supply terminal fixed-side retention recess 14*a*, that is, the side wall surfaces of the power supply terminal fixed-side retention walls 14*b*. Furthermore, the upper end of the power supply terminal mounting portion 14 protrudes toward the center of the first fixed housing 11 in the longitudinal direction forming a brim portion 14*c* that demarcates the upper end of the power supply terminal fixed-side retention recess 14*a*. Note that in the example illustrated in the diagrams, two power supply terminal fixed-side retention recesses 14*a* are formed in the power supply terminal mounting portion 14 at both ends in the longitudinal direction of the first fixed housing 11 and the number thereof is changed according to the number of first power supply terminals 51.

The first movable housing 31 includes a substantially trough shaped main body portion 32 extending in the longitudinal direction of the first connector 10 and a pair of leg portions 33 extending downward from the lower end at both ends in the longitudinal direction of the main body portion 32. Note, the foot portion 33*a* extending outward in the width direction is connected to the lower end of each leg portion 33. The lower surface of the foot portion 33*a* is a mounting surface 11*b* facing the surface of the first board. The main body portion 32 includes a pair of rectangular thick plate-shaped long wall portions 32*a* parallel to each other and extending in the longitudinal direction of the first connector 10, short wall portions 32*b* that are a mutually parallel pair of rectangular shaped thick plate-shaped members extending in the width direction of the first connector 10, are shorter than the long wall portions 32*a*, and connect the end portions of the long wall portions 32*a* in the longitudinal direction, a counterpart housing cavity for stowing 35 that is demarcated by the four surfaces of the long wall portions 32*a* and the short wall portions 32*b* and has a hollow square columnar shape with an upper end (end in the positive direction of the Z-axis) that is open, and a bottom portion 32*c* that is connected to the lower end of the long wall portions 32*a* and the lower end of the short wall portions 32*b* and that blocks the lower end of the counterpart housing cavity for stowing 35 (end in the negative direction of the Z-axis). Note, engaging protrusions 32*d* that protrudes outward are formed on the outer surface near both ends in the longitudinal direction of the long wall portions 32*a* to engage with movable-side retained portions 56 of the first power supply terminals 51

As illustrated in FIGS. 1A and 1B, in a state where the first connector 10 and the second connector 101 are mated, at least a portion of an upper portion 131 of the second housing 111 of the second connector 101 is stowed in the counterpart housing cavity for stowing 35. A thick plate-shaped central wall portion 34 extending in the longitudinal direction of the first connector 10 is disposed within the counterpart housing cavity for stowing 35. The central wall portion 34 is a member that extends upward from the upper surface of the bottom portion 32*c*, as illustrated in FIG. 6B, and the outer peripheral surface thereof is formed so as to be spaced apart from the inner surface of the long wall portions 32*a* and the inner surface of the short wall portions 32*b*. Furthermore, as illustrated in FIG. 9A, a plurality of inverted U-shaped signal terminal contact portion grooves for stowing 34*a*, continuous from the upper end and across both sides, are formed in the central wall portion 34. In addition, a signal terminal movable-side retention recess 32*e* that extends in the vertical direction and penetrates from the lower surface to an upper surface of the bottom portion 32*c* is formed in a position corresponding to each signal terminal contact portion groove for stowing 34*a* of the bottom portion 32*c*. Contact portions 65 and movable-side retained portions 66 of the first signal terminals 61 are stowed respectively in the left and right portions extending in the vertical direction of each signal terminal contact portion groove for stowing 34*a* and the signal terminal movable-side retention recess 32*e* connected thereto.

In addition, as illustrated in FIG. 9B, a signal terminal movable-side retention portion first thickness reduction 32*c*1 and a signal terminal movable-side retention portion second thickness reduction 32*c*2 are formed in each signal terminal movable-side retention recess 32*e* as thickness reductions that are long narrow groove shaped recesses extending in the vertical direction more to the outside in the width direction and to the inside in the width direction of the first connector 10 than the movable-side retained portion 66. The signal terminal movable-side retention portion first thickness reduction 32*c*1 and the signal terminal movable-side retention portion second thickness reduction 32*c*2 are formed to match the impedance of the first signal terminal 61. In the example illustrated in the drawing, 30 signal terminal contact portion grooves for stowing 34*a* are formed, and 30 signal terminal movable-side retention recesses 32*e* are formed on the left and the right, and this number is changed according to the number of first signal terminals 61.

Furthermore, as illustrated in FIG. 4, power supply terminal movable-side recesses for stowing 32*g* are formed in the four corner portions 32*h* of the main body portion 32 for stowing a part of the movable-side retained portion 56 of the first power supply terminal 51. The power supply terminal movable-side recesses for stowing 32*g* include first recesses for stowing 32*g*1 formed near the upper end of an inner surface 32*b*1 of the short wall portions 32*b* and second recesses for stowing 32*g*2 formed near the upper end of an inner surface 32*a*1 of the long wall portions 32*a*. As illustrated in FIGS. 8A-8D, a first upper end cover portion 57*a* and first upper end cover extension portion 57*a*1 as well as a second upper end cover portion 57*b* and contact portion 55 of the movable-side retained portion 56 of the first power supply terminal 51 are stowed in the first recess for stowing 32*g*1 and second recess for stowing 32*g*2. Note that the surfaces of the first upper end cover extension portion 57*a*1 and contact portion 55 stowed in the first recess for stowing 32*g*1 and the second recess for stowing 32*g*2 are preferably more indented into the short wall portions 32*b* and the long wall portions 32*a* than the inner surface 32*b*1 of the short wall portions 32*b* and the inner surface 32*a*1 of the long wall portions 32*a*. In addition, the top surface of the first upper end cover portion 57*a* and the second upper end cover portion 57*b* (upper end surface) is preferably positioned above an upper end surface 32*b*2 of the short wall portions 32*b* and an upper end surface 32*a*2 of the long wall portions 32*a*.

Each of the first signal terminals 61 are long narrow rod shaped members integrally formed and provided elasticity by performing processing such as punching and bending of a conductive metal plate and as illustrated in FIG. 7, include a fixed-side retained portion 62, a tail portion 63 connected to the lower end of the fixed-side retained portion 62 as a board connecting portion, a bent portion 64 connected to the upper end of the fixed-side retained portion 62, a movable-side retained portion 66 connected to the upper end of the bent portion 64, and a contact portion 65 connected to the upper end of the movable-side retained portion 66. In the example illustrated in the drawings, there are thirty first signal terminals 61 lined up extending in the longitudinal direction of the first connector 10 configured on each of a pair of rows on the left and right having a prescribed pitch (for example, roughly 0.3 to 0.5 mm). The pitch and the number of the first signal terminals 61 can be changed as appropriate. In addition, the first signal terminals 61 in each of the left and right rows are arranged so as to be symmetrical as viewed in the longitudinal direction of the first connector 10. Furthermore, each first signal terminal 61 is formed of a plate material extending in the longitudinal direction of the first connector 10 in a parallel plane and is bent within a cross-sectional surface of the first connector 10 as illustrated in FIGS. 9A and 9B.

A tail portion 63 is bent at approximately 90 degrees relative to the fixed-side retained portion 62 that extends in the vertical direction and is connected thereto and extends outward in the width direction of the first fixed housing 11. Furthermore, the lower surface thereof is substantially flush with the mounting surface 11*b*, which is the lower surface of the first fixed housing 11, and is connected and fixed to a connection pad formed on the surface of the first board (not shown) by means of soldering or the like. This connection pad is typically connected to a conductive trace for transmitting signals on the first board. In addition, as illustrated in FIG. 8C, the tail portions 63 are disposed so that at least the tips thereof are positioned to the outside of the long wall portions 12*a* of the first fixed housing 11 in the width direction so as to form a row extending along the long wall portions 12*a* extending in the longitudinal direction of the first connector 10. Accordingly, in the work of mounting the first connector 10 to the surface of the first board, the operator can readily visually confirm the connection state of the tail portions 63 to connection pads formed on the surface of the first board. Furthermore, the length of tips of the tail portions 63 that protrude outside the long wall portions 12*a* of the first fixed housing 11 is set small to enable shortening the length thereof. This enables preventing an increase in the impedance of the first signal terminal 61.

As illustrated in FIGS. 6A and 6B, the bent portion 64 is a portion that is bent so as to meander when viewed from the longitudinal direction (X-axis direction) of the first connector 10, and functions as an elastic deformation portion. The bent portion 64 includes a first straight portion 64*a*1 and a second straight portion 64*a*2 as straight portions, and includes a first bent portion 64*b*1 and a second bent portion 64*b*2 as a bent portion that is bent nearly 180 degrees as well as a third bent portion 64*b*3. The first bent portion 64*b*1 has an upper end thereof connected to the lower end of the movable-side retained portion 66 and a lower end thereof connected to the first straight portion 64*a*1 and is bent into a substantially S shape as viewed from the side. The first straight portion 64*a*1 is a portion that extends vertically and the two ends are connected to the first bent portion 64*b*1 and the second bent portion 64*b*2. Furthermore, the second straight portion 64*a*2 extends diagonally with respect to the width direction of the first fixed housing 11 and the two ends thereof are connected to the second bent portion 64*b*2 and the third bent portion 64*b*3. Note that a first end of the third bent portion 64*b*3 is connected to the second straight portion 64*a*2, and a second end is connected to the upper end of the fixed-side retained portion 62.

In this manner, the bent portion 64 has a first end connected to the fixed-side retained portion 62 retained in the signal terminal fixed-side retention recess 13*a* of the first fixed housing 11 and a second end connected to the movable-side retained portion 66 retained in the signal terminal movable-side retention recess 32*e* of the first movable housing 31, has a bent shape as viewed from the side, includes a first straight portion 64*a*1 and a second straight portion 64*a*2, and a first bent portion 64*b*1, a second bent portion 64*b*2, and a third bent portion 64*b*3 that connect the straight shapes; therefore, the portion not restrained by the first fixed housing 11 or first movable housing 31, in other words, the length of the elastically deformable portion is long. Therefore, the bent portion 64 that is present between the signal terminal fixed-side retention recess 13*a* and the signal terminal movable-side retention recess 32*e* can flexibly deform enabling the first movable housing 31 to move flexibly with respect to the first fixed housing 11. Also, as illustrated in FIGS. 9A and 9B, the bent portion 64 is positioned on the lower side of the brim portion 13*c* that demarcates the upper end of the first fixed housing 11 and the signal terminal fixed-side retention recess 13*a* and the lower side of the bottom portion 32*c* of the first movable housing 31 main body portion 32 stowed in the movable housing cavity for stowing 15 of the first fixed housing 11 and so can deform without interference with the first fixed housing 11 or first movable housing 31. Accordingly, relative to the first fixed housing 11, the first movable housing 31 can move in the span direction of the first signal terminal 61, or in other words, the width direction of the first connector 10, and the pitch direction of the first signal terminal 61, or in other words, the longitudinal direction of the first connector 10. Furthermore, the first movable housing 31 can be inclined in the span direction of the first signal terminal 61 with respect to the first fixed housing 11.

The contact portion 65 of each of the first signal terminals 61 is a portion that comes into contact with the second signal terminal 161 of the second connector 101, which is the counterpart signal terminal, is a straight rod or strip having a rectangular cross-sectional shape with substantially uniform dimensions in the width direction (X-axis direction) and thickness direction (Y-axis direction), and functions as a cantilever with a lower end connected to the movable-side retained portion 66 as a base end (fixed end) and the upper end as a free end. Specifically, the contact portion 65 includes a contact arm portion 65*b*, the lower end of which is connected to the movable-side retained portion 66, that initially has no external force applied, that is overall slightly inclined, and which has an upper end positioned more to the outside of the first movable housing 31 than the movable-side retained portion 66, a contact protrusion portion 65*a* that is connected to the upper end of the contact arm portion 65*b* and bulges outwards in the width direction towards the first movable housing 31, and a contact tip portion 65*c* that is the upper end of the contact protrusion portion 65*a* and faces inward in the width direction of the first movable housing 31. As illustrated in FIGS. 9A and 9B, the contact portion 65 stowed in the signal terminal contact portion groove for stowing 34*a* of the central wall portion 34 of the first movable housing 31 is set so that at least a portion of the contact protrusion portion 65*a* protrudes outside of the side surface of the central wall portion 34.

In addition, the movable-side retained portion 66 connected to the lower end of the contact portion 65 includes a straight rod-shaped or strip-shaped main body portion 66*a* having a rectangular cross-sectional shape with uniform dimensions in the width direction (X-axis direction) and thickness direction (Y-axis direction) thereof and a plurality of protrusions 66*b* protruding outward in the width direction from both surfaces in the width direction (X-axis direction) of the main body portion 66*a*. The main body portion 66*a* is configured such that the width dimension thereof is smaller than the width dimension of the signal terminal movable-side retention recess 32*e*, and the distance between the tips of the left and right protrusions 66*b* is set to be greater than the width dimension of the signal terminal movable-side retention recess 32*e*. As a result, the movable-side retained portion 66 of the first signal terminal 61 inserted from below into the signal terminal movable-side retention recess 32*e* is stably retained by the left and right protrusions 66*b* penetrating into the left and right wall surfaces of the signal terminal movable-side retention recess 32*e*. In addition, since the first bent portion 64*b*1 of the bent portion 64 is connected to the lower end of the movable-side retained portion 66, the first straight portion 64*a*1 of the bent portion 64 is in a state of being offset with respect to the movable-side retained portion 66. Therefore, while holding the first straight portion 64*a*1, the operator can easily insert the movable-side retained portion 66 into the signal terminal movable-side retention recess 32*e* from below.

Furthermore, the fixed-side retained portion 62 includes a straight rod-shaped or strip-shaped main body portion 62*a* having a rectangular cross-sectional shape and uniform dimensions in the width direction (X-axis direction) and the thickness direction (Y-axis direction), and a plurality of protrusions 62*b* protruding outward in the width direction from both side surfaces in the width direction (X-axis direction) of the main body portion 62*a*. Also, the width dimension of the main body portion 62*a* is smaller than the width dimension of the portion of the signal terminal fixed-side retention recess 13*a* corresponding to the signal terminal fixed-side retention groove 13*b*1. The distance between the tips of the left and right protrusions 62*b* is set larger than the width dimension of the portion of the signal terminal fixed-side retention recess 13*a* corresponding to the signal terminal fixed-side retention groove 13*b*1. As a result, the fixed-side retained portion 62 of the first signal terminal 61 inserted from below the signal terminal fixed-side retention recess 13*a* is stably retained by the left and right protrusions 62*b* penetrating into the left and right wall surfaces of the signal terminal fixed-side retention groove 13*b*1.

Although the first signal terminal 61 is used to transmit the signal, in recent years, a high-frequency signal can be transmitted at, for example, 8 (GHz) (16 (Gbps)) as the speed of various types of signals has increased. If this manner of radio-frequency signals are transmitted, the impedance needs to be matched. Therefore, with the present embodiment, the signal terminal fixed-side retention portion thickness reduction 13*a*1 that is a space containing air having a lower dielectric constant than the first fixed housing 11 is established between the fixed-side retained portion 62 and the bottom surface of the signal terminal fixed-side retention recess 13*a* of the first fixed housing 11 that is a dielectric. The dielectric constant of the dielectric surrounding the fixed-side retained portion 62 can be adjusted, and the signal terminal movable-side retention portion first thickness reduction 32*c*1 and the signal terminal movable-side retention portion second thickness reduction 32*c*2 that are spaces containing air having a lower dielectric constant than the first movable housing 31 are established between the movable-side retained portion 66 and the bottom portion 32*c* of the first movable housing 31 main body portion 32 that is a dielectric. The dielectric constant of the dielectric surrounding the movable-side retained portion 66 was made adjustable, enabling the impedance of the first signal terminal 61 to be adjusted.

Furthermore, the pair of first signal terminals 61 adjacent to each other in the width direction (X-axis direction) in each column on the left and right can be used as a differential pair, enabling transmitting a high frequency signal. In such a case, the impedance of the first signal terminals 61 adjacent to each other in the width direction needs to be matched. Here, with the present embodiment, the dimension of the bent portion 64 in the width direction is set larger than that of the fixed-side retained portion 62, the movable-side retained portion 66, or the contact portion 65, into which a portion of the first fixed housing 11 or the first movable housing 31 is interposed between first signal terminals 61 adjacent in the width direction. Shortening of the distance between adjacent bent portions 64 with no first fixed housing 11 or first movable housing 31 interposed therebetween enables adjusting the dielectric constant of the space surrounding the periphery of the bent portion 64. This enables adjusting the impedance between first signal terminals 61 adjacent in the width direction.

Each of the first power supply terminals 51 are members integrally formed and provided elasticity by performing processing such as punching and bending of a conductive metal plate and as illustrated in FIG. 5B, include a fixed-side retained portion 52, a tail portion 53 connected to the lower end of the fixed-side retained portion 52 as a board connecting portion, a bent portion 54 connected to the upper end of the fixed-side retained portion 52, a movable-side retained portion 56 connected to the upper end of the bent portion 54, and a contact portion 55 connected to the movable-side retained portion 56. In the example illustrated in the drawings, the first power supply terminals 51 are arranged in pairs at both ends in the longitudinal direction of the first connector 10, and arranged such that two are lined up in the width direction of the first connector 10 respectively at both ends in the longitudinal direction of the first connector 10. Thus, the first connector 10 is provided with power supply lines respectively at both ends in the longitudinal direction in which positive and negative power supply current flows. Also, the left and right first power supply terminals 51 at each of both ends in the longitudinal direction of the first connector 10 are configured so as to be symmetrical in the longitudinal direction of the first connector 10. The first power supply terminal 51 is formed, in general, with plate material extending in the width direction and the vertical direction of the first connector 10 bent within a plane parallel to the first connector 10 in the longitudinal direction.

The fixed-side retained portion 52 is a portion retained in the short wall portion 12*b* of the first fixed housing 11, and includes a flat plate-shaped main body portion 52*a* extending in the width direction and the vertical direction of the first connector 10, and a plurality of protrusions 52*b* protruding outward in the width direction from both side surfaces in the width direction (Y-axis direction) of the main body portion 52*a*. Also, the width dimension of the main body portion 52*a* is smaller than the width dimension of the portion of the power supply terminal fixed-side retention recess 14*a* corresponding to the power supply terminal fixed-side retention groove 14*b*1. The distance between the tips of the left and right protrusions 52*b* is set larger than the width dimension of the portion of the power supply terminal fixed-side retention recess 14*a* corresponding to the power supply terminal fixed-side retention groove 14*b*1. Thus, the fixed-side retained portion 52 of the first power supply terminal 51 inserted from below into the power supply terminal fixed-side retention recess 14*a* is stably retained based on the protrusions 52*b* on the left and right penetrating the left and right wall surfaces of the power supply terminal fixed-side retention groove 14*b*1.

The movable-side retained portion 56 is a portion retained by the short wall portion 32*b* of the first movable housing 31, and includes a first main body portion 56*a* as a flat plate-shaped first retained portion extending in the width direction and the vertical direction of the first connector 10, and a second main body portion 56*b* as a flat plate-shaped second retained portion that is bent by approximately 90 degrees on an outer end edge in the width direction of the first connector 10 and connected to the first body portion 56*a*, and extends toward the center of the first connector 10 in the longitudinal direction. At least a portion of the first main body portion 56*a* extends along the short wall portion 32*b*, and at least a portion of the second main body portion 56*b* extends along the long wall portion 32*a*. Note that an engagement opening 58 is formed in the second main body portion 56*b* as an engaged portion to be engaged to the first movable housing 31. In particular, the engagement opening 58 engages with the engaging protrusion 32*d*, which is an engaging part formed on the outer surface of the long wall portion 32*a* of the first movable housing 31.

The first upper end cover portion 57*a* is connected to the upper end of the first main body portion 56*a*, and the second upper end cover portion 57*b* is connected to the upper end of the second main body portion 56*b*. The first upper end cover portion 57*a* and the second upper end cover portion 57*b* are members covering the upper end portion of the short wall portion 32*b* and the upper end portion of the long wall portion 32*a* near the corner portion 32*h* of the first movable housing 31, and are formed with an approximately 180 degree bend so that the tip (lower end) faces downward. Furthermore, a flat plate-shaped first upper end cover extension portion 57*a*1 is connected to the lower end of the first upper end cover portion 57*a*, and a flat plate-shaped contact portion 55 is connected to the lower end of the second upper end cover portion 57*b*. The contact portion 55 is a rectangular plate material that is long in the vertical direction, and functions as a contact surface in contact with a second power supply terminal 151 of the second connector 101, which is a counterpart power supply terminal. This contact surface is parallel with the inner surface 32*a*1 of the long wall portion 32*a* but is preferably more indented into the long wall portion 32*a* than the inner surface 32*a*1. In addition, the top surface of the first upper end cover portion 57*a* and the second upper end cover portion 57*b* (upper end surface) is preferably positioned above an upper end surface 32*b*2 of the short wall portions 32*b* and an upper end surface 32*a*2 of the long wall portions 32*a*.

In this manner, the movable-side retained portion 56 covers the long wall portions 32*a* close to both ends of the first connector 10 in the longitudinal direction, the inner and outer side surfaces of the short wall portions 32*b*, the upper end surface 32*a*2, and the upper end surface 32*b*2 of the first movable housing 31 and therefore effectively protects the first movable housing 31, improving robustness. In other words, in addition to the function of contacting the second power supply terminal 151, the movable-side retained portion 56 effectively exhibits a function as a reinforcing metal fitting that reinforces near the corner portions 32*h* of the first movable housing 31.

Furthermore, the bent portion 54 is a portion bent in a meander like substantially S shape as viewed in the width direction (Y-axis direction) of the first connector 10 and functions as an elastic deformation portion. Furthermore, the bent portion 54 includes a first straight portion 54*a*1, a second straight portion 54*a*2, and a third straight portion 54*a*3 as straight portions as well as a first bent portion 54*b*1 and a second bent portion 54*b*2 as bent portions bent close to 180 degrees. The first straight portion 54*a*1 has an upper end connected to the lower end of the first main body portion 56*a* of the movable-side retained portion 56 and a lower end that is a portion extending in the vertical direction and is connected to the first bent portion 54*b*1. In addition, the second straight portion 54*a*2 is a portion that extends vertically and the two ends are connected to the first bent portion 54*b*1 and the second bent portion 54*b*2. Furthermore, the third straight portion 54*a*3 has an upper end connected to the second bent portion 54*b*2 and a lower end that is a portion extending in the vertical direction and is connected to the upper end of the fixed-side retained portion 52 main body portion 52*a* In addition, the bent portion 54 is split into two in the width direction (Y-axis direction) by a slit 54*c* that extends the full length thereof.

In this manner, the bent portion 54 has a first end connected to the fixed-side retained portion 52 retained in the power supply terminal fixed-side retention recess 14*a* of the first fixed housing 11 and a second end connected to the movable-side retained portion 56 retained on both ends of the first movable housing 31 main body portion 32 in the longitudinal direction, has a bent shape as viewed from the side, and includes a first straight portion 54*a*1, a second straight portion 54*a*2, and a third straight portion 54*a*3, as well as a first bent portion 54*b*1 and second bent portion 54*b*2 that connect the straight shapes; therefore, the portion not restrained by the first fixed housing 11 or the first movable housing 31, in other words, the length of the elastically deformable portion, is long. Therefore, the bent portion 54 present between the power supply terminal fixed-side retention recess 14*a* and both ends of the main body portion 32 in the longitudinal direction can flexibly deform enabling the first movable housing 31 to flexibly move relative to the first fixed housing 11. Also, the bent portion 54 is positioned on the lower side of the brim portion 14*c* that demarcates the upper end of the power supply terminal fixed-side retention recess 14*a* of the first fixed housing 11 and the lower side of the first movable housing 31 main body portion 32 stowed in the movable housing cavity for stowing 15 of the first fixed housing 11; therefore, deformation is feasible between the first fixed housing 11 and first movable housing 31. In addition, the bent portion 54 is split into two in the width direction thereof by the slit 54*c*. Therefore, the first movable housing 31 can move not only in the span direction of the first power supply terminal 51, in other words, the longitudinal direction of the first connector 10, relative to the first fixed housing 11, but also in the pitch direction of the first power supply terminal 51, in other words, the width direction of the first connector 10. Furthermore, the first movable housing 31 can be inclined in the pitch direction of the first power supply terminal 51 with respect to the first fixed housing 11.

In addition, with the first signal terminal 61, the bent portion 64 is bent as viewed from the X-axis direction and primarily is flexible in the Y-axis direction, in other words, the width direction of the first connector 10. On the other hand, with the first power supply terminal 51, the bent portion 54 is bent as viewed from the Y-axis direction and primarily is flexible in the X-axis direction, in other words, the longitudinal direction of the first connector 10. Therefore, through cooperative elastic deformation of the first signal terminal 61 and the first power supply terminal 51, the first movable housing 31 can be stably displaced in any direction relative to the first fixed housing 11.

Furthermore, with the first power supply terminal 51, while the bent portion 54 is primarily flexible in the longitudinal direction of the first connector 10, the contact surface of the contact portion 55 faces in the width direction of the first connector 10, differing from the deformation direction of the bent portion 54 and is thus able to stably maintain a contact state with the second power supply terminal 151 of the second connector 101.

Furthermore, the tail portion 53 is bent at approximately 90 degrees with respect to the main body portion 52*a* of the fixed-side retained portion 52 that extends in the vertical direction and extends towards the center of the first fixed housing 11 in the longitudinal direction. Note, the tail portion 53 includes a relay portion 53*b* connected to the main body portion 52*a* of the fixed-side retained portion 52 and a main body portion 53*a* that is connected to the relay portion 53*b* via a stepped portion 53*c* and extends outwardly in the width direction of the first fixed housing 11. The lower surface of the main body portion 53*a* is substantially flush with the mounting surface 11*b*, which is the lower surface of the first fixed housing 11, and is connected and fixed to a connection pad formed on the surface of the first board (not shown) by means of soldering or the like. This connection pad is connected to a conductive trace for transmitting power supply current on the first board. The relay portion 53*b* connected to the main body portion 53*a* via the stepped portion 53*c* is positioned higher than the main body portion 53*a* and the lower surface thereof is separated from the surface of the first board. Also, the tail portions 53 extend from the lower end of the fixed-side retained portion 52 main body portions 52*a* toward the center of the first fixed housing 11 in the longitudinal direction and are therefore positioned to the inside at both ends of the first fixed housing 11 in the longitudinal direction and are not positioned to the outside. Therefore, the mounting surface of the first connector 10 does not increase in size in the longitudinal direction on the surface of the first board.

In addition, as illustrated in FIG. 8C and as viewed from above, with the tail portion 53, the tip of the main body portion 53*a* is positioned at least more to the outside than the long wall portion 12*a* of the first fixed housing 11 and is positioned along the long wall portion 12*a* in the same row as the tail portions 63 of the first signal terminals 61 that extend in the longitudinal direction of the first connector 10. Therefore, in the work of mounting the first connector 10 on the surface of the first board, the tail portions 53 of the first power supply terminals 51 can be connected to connection pads formed on the surface of the first board by means of work similar to that of the tail portions 63 of the first signal terminals 61, improving work efficiency. In addition, similar to the tail portions 63 of the first signal terminals 61, the operator can readily visually confirm the connection state of the tail portions 53 of the first power supply terminals 51 on the connection pads formed on the surface of the first board.

Next, the configuration of the second connector 101 will be described.

Figure 11:
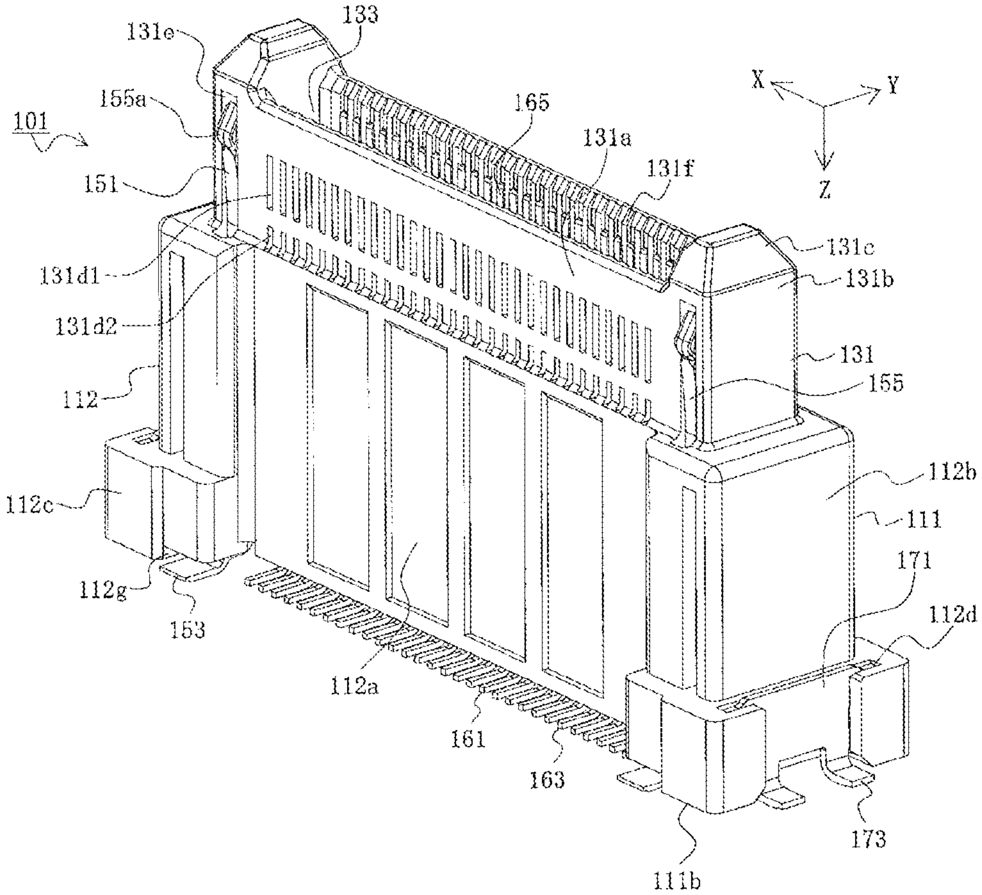
FIG. 11 is a perspective view of the second connector according to Embodiment 1.
Figure 12D:
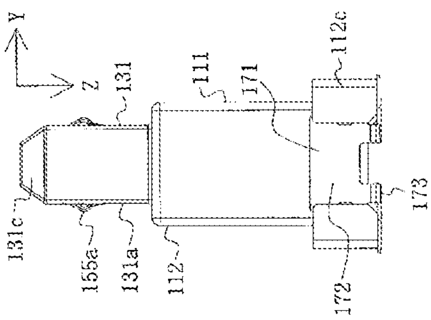
FIGS. 12A-12D are four-plane diagrams of the second connector according to Embodiment 1, where
Figure 12A:
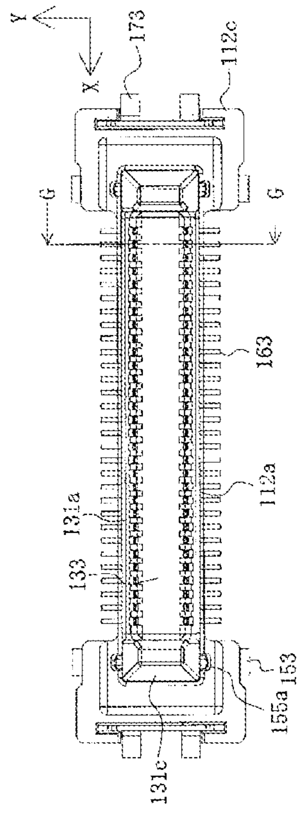
Figure 12B:
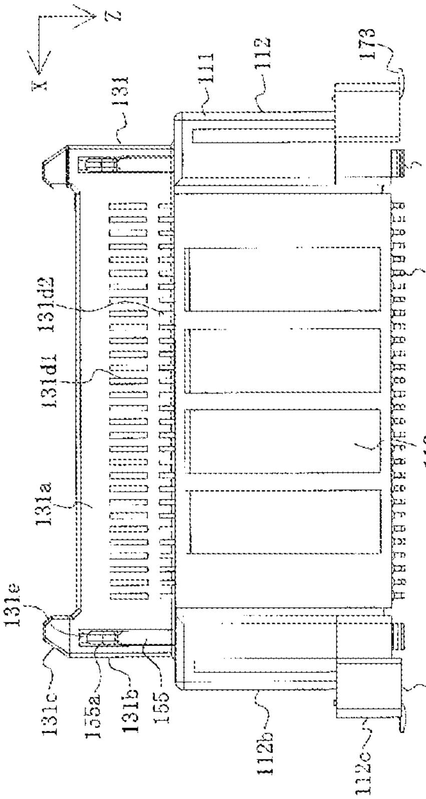
Figure 12C:
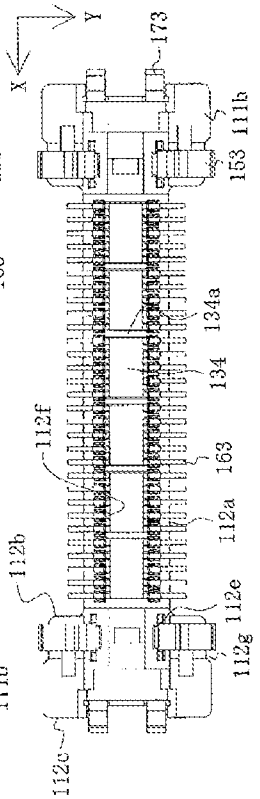
Figure 13:
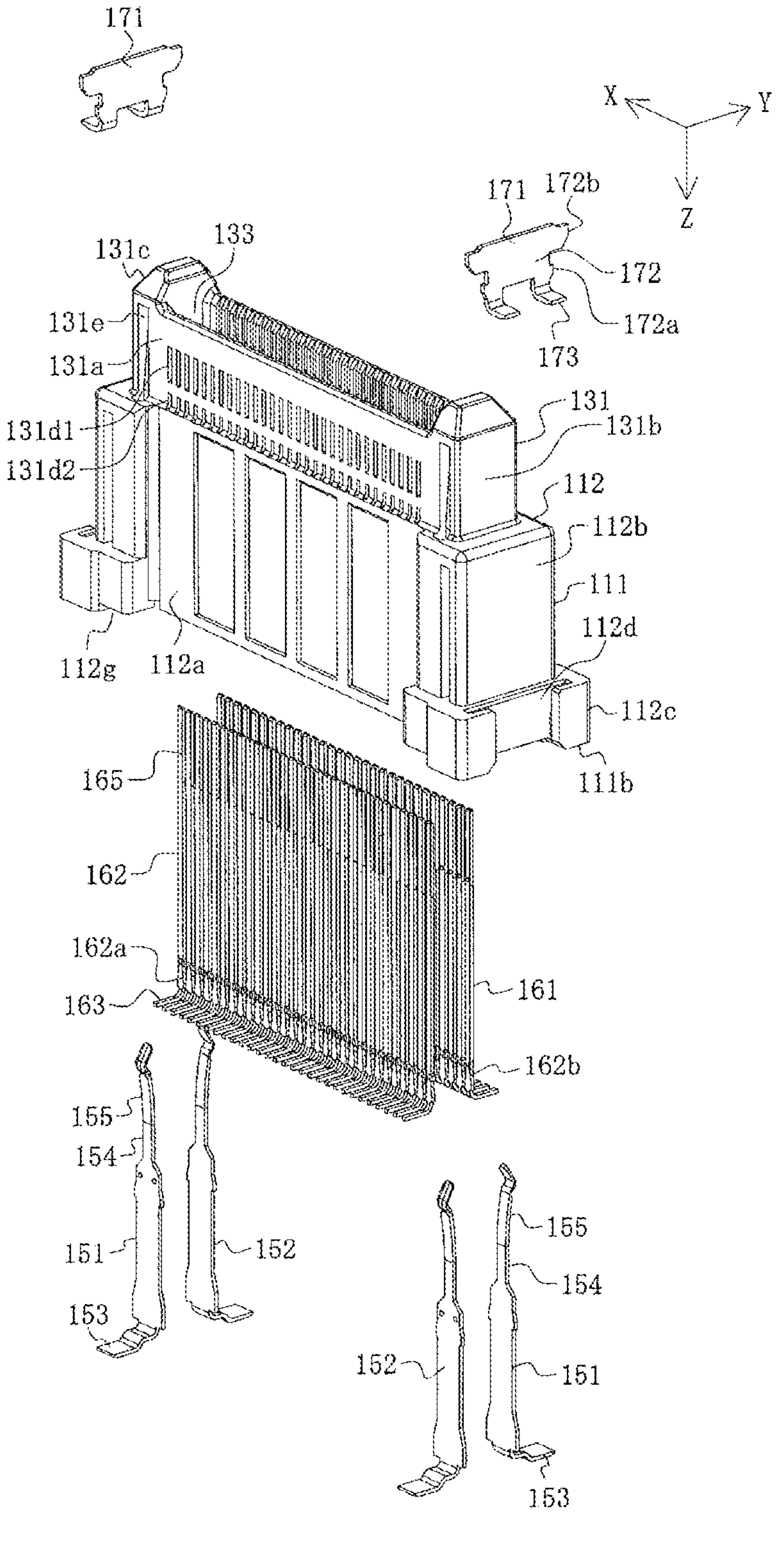
FIG. 13 is an exploded view illustrating the second connector according to Embodiment 1.
Figure 14A:
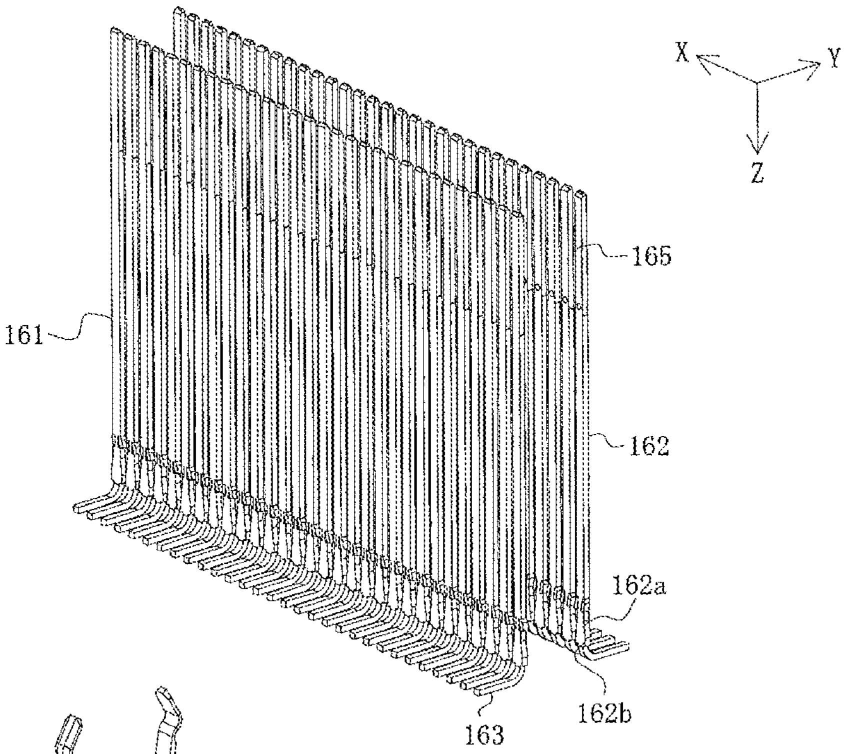
FIGS. 14A and 14B are perspective views illustrating a terminal of the second connector according to Embodiment 1.
Figure 14B:
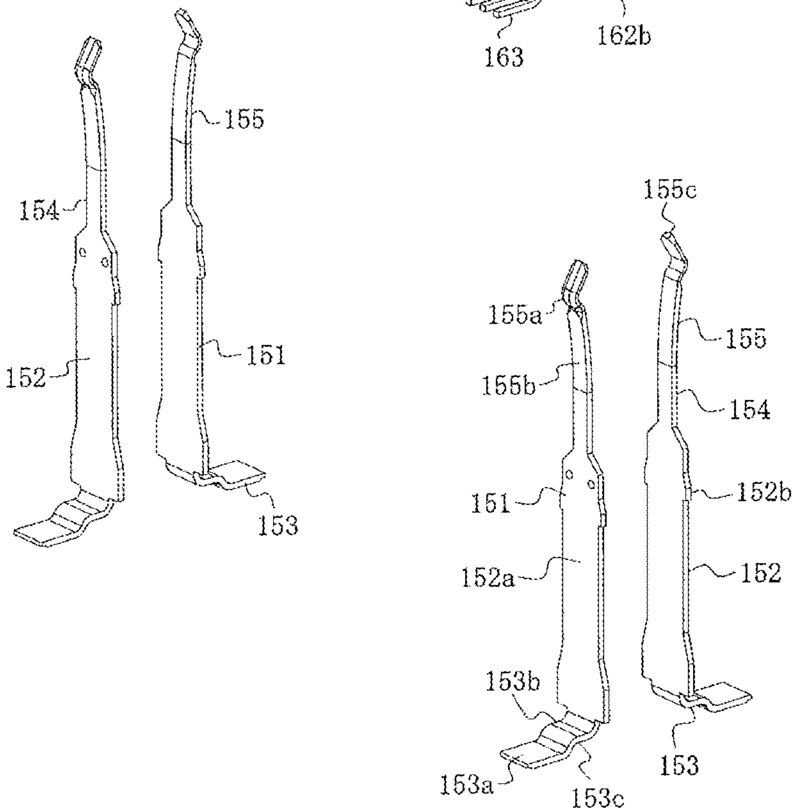

FIG. 11 is a perspective view of the second connector according to Embodiment 1. FIGS. 12A-12D are four views of the second connector according to Embodiment 1. FIG. 13 is an exploded view of the second connector according to Embodiment 1. FIGS. 14A and 14B are is a perspective view of the second connector terminals according to Embodiment 1. FIGS. 15A-15C illustrate a mounting portion of the signal terminal of the second connector to the fixed housing in Embodiment 1. FIG. 12A is a top view, FIG. 12B is a side view, FIG. 12C is a bottom view, and FIG. 12D is a front view. FIG. 14A is a diagram illustrating a signal terminal, and FIG. 14B is a diagram illustrating a power supply terminal. FIG. 15A is a sectional view taken along the line G-G of FIG. 12A, FIG. 15B is a perspective view, and FIG. 15C is an enlarged view of part H in FIG. 15B.

In the present embodiment, as illustrated in FIGS. 12A-12D, the second connector 101 is configured so as to be left-right symmetrical when viewed in the width direction (Y-axis direction), and is also configured to be left-right symmetrical when viewed in the longitudinal direction (X-axis direction). Furthermore, the second housing 111 of the second connector 101 is a member that is integrally formed using an insulating material (dielectric body) such as synthetic resin.

The second housing 111 has a lower portion 112 and an upper portion 131 connected to the upper end of the lower portion 112. The lower surface of the lower portion 112, that is, the lower surface of the second housing 111 is a mounting surface 111*b* facing the surface of the second board.

The lower portion 112 is a substantially square cylindrical member and includes a pair of rectangular flat plate-shaped long wall portions 112*a* that are mutually parallel and extend in the longitudinal direction; short wall portions 112*b* that are a pair of mutually parallel rectangular thick plate shaped or square columnar shaped members extending in the width direction, and that are connected to both ends of the long wall portions 112*a*; and a lower cavity 134 demarcated by the four surfaces of the long wall portion 112*a* and the short wall portions 112*b* that is a square columnar shaped cavity that opens downward (positive direction of Z-axis). Note, as illustrated in FIG. 15A, the upper end of the lower cavity 134 is closed by a boundary wall 135 that is a flat plate-shaped plate material extending in the X-Y direction and is a boundary of the lower portion 112 and the upper portion 131. In addition, as illustrated in FIG. 12C, the inside of the lower cavity 134 is divided into a plurality of demarcations by partition plates 134*a* that are a plurality of plate materials extending in the Y-Z direction. Furthermore, outward protruding portions 112*c* are formed at the bottom of the short wall portions 112*b*. Also, metal fitting retention recesses 112*d* are formed on the outward protruding portions 112*c* and housing fixation metal fittings 171 are stowed and retained in the metal fitting retention recesses 112*d.*

Note, lower end notches 112*g* are formed in locations adjacent to the long wall portions 112*a* at the lower end of the respective short wall portions 112*b*. Furthermore, as illustrated in FIG. 12C, the lower ends of power supply terminal retention recesses 112*e* are open at locations corresponding to the lower end notches 112*g* on the bottom surfaces of the short wall portions 112*b*. The power supply terminal retention recesses 112*e* are long narrow grooves or holes that penetrate the inside of the short wall portions 112*b* in the vertical direction, and of the second terminals provided in the second connector 101, the power terminals, in other words, retained portions 152 of the second power supply terminals 151 that are power supply terminals, are retained in each of the power supply terminal retention recesses 112*e*. Furthermore, a tail portion 153 of the second power supply terminal 151 that extends outward in the width direction (Y-axis direction) from the lower end of the retained portion 152 is stowed in the lower end notch 112*g*. Note, in the example illustrated in the drawings, there are two power supply terminal retention recesses 112*e* formed on each of the short wall portions 112*b* at both ends of the second housing 111 in the longitudinal direction but the number thereof is changed according to the number of second power supply terminals 151.

In addition, as illustrated in FIG. 12C and FIG. 15A, a plurality of long narrow groove shaped signal terminal retention recesses 112*f* extending in the vertical direction are formed on the inner surfaces of the long wall portions 112*a*. Retained portions 162 of the second signal terminals 161 that are a signal terminal of the second terminals provided in the second connector 101 are stowed in each of the signal terminal retention recesses 112*f*. Note, in the example illustrated in the drawings, there are thirty of the signal terminal retention recesses 112*f* formed in each of the left and right long wall portions 112*a* of the second housing 111 but the number thereof changes according to the number of second signal terminals 161.

The upper portion 131 is a substantially square cylindrical member similar to the lower portion 112, but has a smaller external dimension than the lower portion 112. Furthermore, the upper portion 131 includes a pair of rectangular flat plate-shaped long wall portions 131*a* that are mutually parallel and extend in the longitudinal direction; short wall portions 131*b* that are a pair of mutually parallel rectangular thick plate-shaped or square columnar shaped members extending in the width direction, and that are connected to both ends of the long wall portions 131*a*; and an upper cavity 133 demarcated by the four surfaces of the long wall portions 131*a* and the short wall portions 131*b* that is a square columnar shaped cavity that opens upward (negative direction of Z-axis). Note, the lower end of the long wall portions 131*a* and the short wall portions 131*b* are integrally connected to the upper end of the long wall portions 112*a* and short wall portions 112*b* of the lower portion 112. In addition, the upper cavity 133 has nearly the same cross-sectional shape and area as the lower cavity 134 but as illustrated in FIG. 15A, the lower end thereof is closed by the boundary wall 135 and is divided from the lower cavity 134. Note, there is no member corresponding to the partition plates 134*a* inside the upper cavity 133.

In addition, an upward protruding end portion 131*c* with a substantially quadrangular trapezoid shape is formed on the upper ends of the respective short wall portions 131*b*. Furthermore, on the side surfaces of each of the short wall portions 131*b* extending in the longitudinal direction of the second connector 101, there are groove shaped power supply terminal stowing recesses 131*e* extending in the vertical direction. The number of these power supply terminal stowing recesses 131*e* formed is equal to the number of power supply terminal retention recesses 112*e* and the lower ends thereof communicate with the upper ends of the corresponding power supply terminal retention recesses 112*e*. Furthermore, a contact portion 155 of the second power supply terminals 151 is stowed in each power supply terminal stowing recess 131*e* and at least a portion of a contact protruding portion 155*a* protrudes outside of the side surface of the short wall portion 131*b*.

In addition, as illustrated in FIG. 11 and FIG. 15A, a plurality of long narrow groove shaped signal terminal stowing recesses 131*f* extending in the vertical direction are formed on the inner surfaces of the long wall portions 131*a*. The number of signal terminal stowing recesses 131*f* is equal to the number of signal terminal retention recesses 112*f* and the lower ends thereof communicate with the upper ends of the corresponding signal terminal retention recesses 112*f*. A contact portion 165 of the second signal terminal 161 is stowed in each signal terminal stowing recess 131*f*. The surface of the contact portion 165 is substantially flush with the inner surface of the long wall portion 131*a* and protrudes a slight amount more into the upper cavity 133 than this inner surface.

Each of the second signal terminals 161 are long narrow rod-shaped members integrally formed and provided elasticity by performing processing such as punching and bending of a conductive metal plate and as illustrated in FIGS. 14A and 14B, include a retained portion 162, a tail portion 163 as a board connecting portion connected to the lower end of the retained portion 162, and a contact portion 165 connected to the upper end of the retained portion 162. In the example illustrated in the drawings, the second signal terminals 161 are configured to form a pair of left and right rows extending in the longitudinal direction of the second connector 101 and are arranged with the same pitch as the first signal terminals 61 (for example roughly 0.3 to 0.5 [mm]) and the same number (for example, thirty). The number and pitch of the second signal terminals 161 can be appropriately changed in the same manner as the first signal terminals 61. In addition, the second signal terminals 161 in each of the left and right rows are arranged so as to be symmetrical as viewed in the longitudinal direction of the second connector 101. Furthermore, each second signal terminal 161 is formed of a plate material extending in the longitudinal direction of the second connector 101 in a parallel plane and bent within a cross-sectional surface of the second connector 101 as illustrated in FIG. 15A.

The tail portion 163 is bent at approximately 90 degrees relative to the retained portion 162 that extends in the vertical direction and is connected thereto and extends outward in the width direction of the second housing 111. Furthermore, the lower surface thereof is substantially flush with the mounting surface 111*b*, which is the lower surface of the second housing 111, and is connected and fixed to a connection pad formed on the surface of the second board (not shown) by means of soldering or the like. This connection pad is typically connected to a conductive trace for transmitting signals on the second board. In addition, as illustrated in FIG. 12A, the tail portions 163 are disposed so that at least the tips thereof are positioned to the outside of the long wall portions 112*a* of the lower portion 112 of the second housing 111 in the width direction and so as to form a row extending along the long wall portions 112*a* extending in the longitudinal direction of the second connector 101. Accordingly, in the work of mounting the second connector 101 to the surface of the second board, the operator can readily visually confirm the connection state of the tail portions 163 to connection pads formed on the surface of the second board. Furthermore, the length of the tips of the tail portions 163 that protrude outside the long wall portions 112*a* of the lower portion 112 of the second housing 111 is set small to enable shortening the length thereof. This enables preventing an increase in the impedance of the second signal terminal 161.

Furthermore, the retained portion 162 includes a straight rod-shaped or strip-shaped main body portion 162*a* having a rectangular cross-sectional shape and uniform dimensions in the width direction (X-axis direction) and the thickness direction (Y-axis direction), and a plurality of protrusions 162*b* protruding outward in the width direction from both side surfaces in the width direction (X-axis direction) of the main body portion 162*a*. Furthermore, the main body portion 162*a* is configured such that the width dimension thereof is smaller than the width dimension of the signal terminal retention recess 112*f*, and the distance between the tips of the left and right protrusions 162*b* is set to be greater than the width dimension of the signal terminal retention recess 112*f*. Thus, the retained portions 162 of the second signal terminals 161 inserted from the mounting surface 111*b* of the second housing 111 into the signal terminal retention recesses 112*f* are stably retained based on the left and right protrusions 162*b* penetrating into the left and right wall surfaces of the signal terminal retention recess 112*f*.

In addition, the contact portion 165 connected to the upper end of the retained portion 162 has dimensions in the width direction (X-axis direction) and thickness direction (Y-axis direction) that are the same straight rod shape or strip shape as the main body portion 162*a* of the retained portion 162 and extends straight upward (Z-axis negative direction). Furthermore, most of the contact portion 165 is stowed inside the signal terminal stowing recess 131*f* and the center side surface of the contact portion 165 in the width direction of the second connector 101 is exposed in the upper cavity 133.

Similar to the first signal terminal 61, the second signal terminal 161 is used to transmit the signal, but in recent years, a high-frequency signal can be transmitted at, for example, 8 (GHz) (16 (Gbps)) as the speed of various types of signals has increased. If this manner of radio-frequency signals are transmitted, the impedance needs to be matched. Therefore, with the present embodiment, a signal terminal stowing recess first thickness reduction 131*d*1 and a signal terminal stowing recess second thickness reduction 131*d*2 that are spaces made up of air having a lower dielectric constant than the second housing 111 are established at a position behind the contact portion 165 in the long wall portion 131*a* of the upper portion 131 of the second housing 111, that is a dielectric, enabling adjusting the dielectric constant of the dielectric surrounding the periphery of the contact portion 165 and thus enabling adjusting the impedance of the second signal terminal 161.

Each of the second power supply terminals 151 are members integrally formed and provided elasticity by performing processing such as punching and bending of a conductive metal plate and as illustrated in FIG. 14B, include a retained portion 152, a tail portion 153 as a board connecting portion connected to the lower end of the retained portion 152, a center portion 154 connected to the upper end of the retained portion 152, and a contact portion 155 connected to the upper end of the center portion 154. In the example illustrated in the drawings, the second power supply terminals 151 are arranged on the pair of side surfaces extending in the longitudinal direction of the second connector 101 near both ends in the longitudinal direction, respectively. Thus, the second connector 101 is provided with power supply lines respectively near both ends in the longitudinal direction in which positive and negative power supply current flows. In addition, the left and right second power supply terminals 151 near each of both ends in the longitudinal direction of the second connector 101 are configured so as to be symmetrical in the longitudinal direction of the second connector 101. Each second power supply terminal 151 is formed, in general, with plate material extending in the longitudinal direction of the first connector 101 [sic] bent within a plane parallel to the second connector 101 in the longitudinal direction.

The retained portion 152 includes a flat plate-shaped main body portion 152*a* extending in the longitudinal direction and the vertical direction of the second connector 101 and a plurality of protrusions 152*b* protruding outward from both side surfaces of the main body portion 152*a* in the width direction (X-axis direction). Furthermore, the main body portion 152*a* is configured such that the width dimension thereof is smaller than the width dimension of the power supply terminal retention recess 112*e*, and the distance between the tips of the left and right protrusions 152*b* is set to be greater than the width dimension of the power supply terminal retention recess 112*e*. Thus, the second power supply terminal 151 retained portion 152 inserted from the mounting surface 111*b* side of the second housing 111 is stably retained through penetrating of the left and right protrusions 152*b* into the left and right wall surfaces of the power supply terminal retention recess 112*e*.

In addition, the center portion 154 is a long narrow strip-shaped member facing upward (negative direction of Z-axis) from the upper end of the main body portion 152*a* of the retained portion 152 and the dimension in the width direction (X-axis direction) thereof is set smaller than the dimension of the main body portion 152*a* in the width direction.

Furthermore, the contact portion 155 is a portion that contacts the first power supply terminal 51 of the first connector 10 having dimensions in the width direction (X-axis direction) and thickness direction (Y-axis direction) set as a strip-shaped portion the same as the center portion 154, and is a portion that functions as a cantilever with the lower end connected to the upper end of the center portion 154 as a base end (fixed end) and the upper end as a free end. Specifically, the contact portion 155 has a contact arm portion 155*b*, the lower end of which is connected to the center portion 154, has an overall gradual slope in an initial state with no external force applied, and has an upper end which is positioned more to the outside of the second housing 111 than the center portion 154, a contact protruding portion 155*a* connected to the upper end of the contact arm portion 155*b* that bulges toward the outside of the second housing 111 in the width direction, and a contact tip portion 155*c* at the upper end of the contact protruding portion 155*a* facing the inside of the second housing 111 in the width direction. Furthermore, as illustrated in FIG. 11, the contact portion 155 stowed in the power supply terminal stowing recess 131*e* of the second housing 111 upper portion 131 is such that at least a portion of the contact protruding portion 155*a* protrudes to the outside of the side surface of the short wall portion 112*b*.

Furthermore, the tail portion 153 is bent at approximately 90 degrees relative to the main body portion 152*a* of the retained portion 152 that extends in the vertical direction and is connected thereto and extends outward in the width direction of the second housing 111. Note, the tail portion 153 includes a relay portion 153*b* connected to the main body portion 152*a* of the retained portion 152 and a main body portion 153*a* that is connected to the relay portion 153*b* via a stepped portion 153*c* and extends outwardly in the width direction of the second housing 111. The lower surface of the main body portion 153*a* is substantially flush with the mounting surface 111*b*, which is the lower surface of the second housing 111, and is connected and fixed to a connection pad formed on the surface of the second board (not shown) by means of soldering or the like. This connection pad is connected to a conductive trace for transmitting power supply current on the second board. The relay portion 153*b* connected to the main body portion 153*a* via the stepped portion 153*c* is positioned higher than the main body portion 153*a* and the lower surface thereof is separated from the surface of the second board. In addition, as illustrated in FIG. 12A, as viewed from above, the tail portion 153 has at least the tip of the main body portion 153*a* positioned to the outside in the width direction of side walls of an outward protruding portion 112*c* of the second housing 111. Therefore, similar to the tail portions 163 of the second signal terminals 161, the operator can readily visually confirm the connection state of the tail portions 153 of the second power supply terminals 151 on the connection pads formed on the surface of the second board.

The housing fixation metal fitting 171 is a member that is integrally formed and provided elasticity by performing punching and bending of a metal plate and as illustrated in FIG. 13, includes a retained portion 172, and a tail portion 173 as a board connecting portion connected to the lower end of the retained portion 172. In the example illustrated in the figure, the housing fixation metal fittings 171 are arranged one by one at both ends of the second connector 101 in the longitudinal direction, and attached so as to be parallel to the end surface of the outward protruding portion 112*c* of the lower portion 112 facing outward in the longitudinal direction of the second connector 101.

The retained portion 172 includes a flat plate-shaped main body portion 172*a* extending in the width direction and the vertical direction of the second connector 101 and a plurality of protrusions 172*b* protruding outward in the width direction from both side surfaces of the main body portion 172*a* in the width direction (Y-axis direction). Further, the main body portion 172*a* has a width dimension that is smaller than the width dimension of the metal fitting retention recess 112*d* of the outward protruding portion 112*c* and the distance between the tips of the left and right protrusions 172*b* is set to be greater than the width dimension of the metal fitting retention recess 112*d*. Thus, the retained portion 172 of the housing fixation metal fitting 171 inserted into the metal fitting retention recess 112*d* from the side opposite the mounting surface 111*b* of the second housing 111 is stably retained by the left and right protrusions 172*b* penetrating into the left and right wall surfaces of the metal fitting retention recess 112*d*.

Two tail portions 173 are formed for one housing fixation metal fitting 171. Specifically, the tail portion 173 is bent at approximately 90 degrees relative to the retained portion 172 that extends in the vertical direction and is connected thereto and extends outward in the longitudinal direction of the second housing 111. Furthermore, the lower surface thereof is substantially flush with the mounting surface 111*b*, which is the lower surface of the second housing 111, and is connected and fixed to a connection pad formed on the surface of the second board (not shown) by means of soldering or the like. The connection pad is typically not connected to the conductive trace of the second board and functions only to fix the housing fixation metal fitting 171 to the surface of the second board.

In this manner, the housing fixation metal fitting 171 is fixed on the surface of the second board. Therefore, the second housing 111 is strongly attached to the surface of the second board and as a result, the mounted state of the second connector 101 on the second board is more reliable.

Here, for convenience of explanation, the second connector 101 is described as a so-called straight type connector in a state of being erected on the surface of the second board, in other words, mounted with the upper cavity 133 open upwards (negative direction Z-axis), and the upper cavity 133 is described as a connector extending in a direction perpendicular to the second board but the second connector 101 is not limited to a straight type and a so called right angle type connector can also be used. For a right angle type, the long wall portions 112*a* of the lower portion 112 and the long wall portions 131*a* of the upper portion 131 are mounted substantially parallel with respect to the surface of the second board, and the upper cavity 133 also becomes substantially parallel with respect to the surface of the second board.

Next, the operation of mating the first connector 10 and the second connector 101 with the above configuration is described.

Figure 16C:
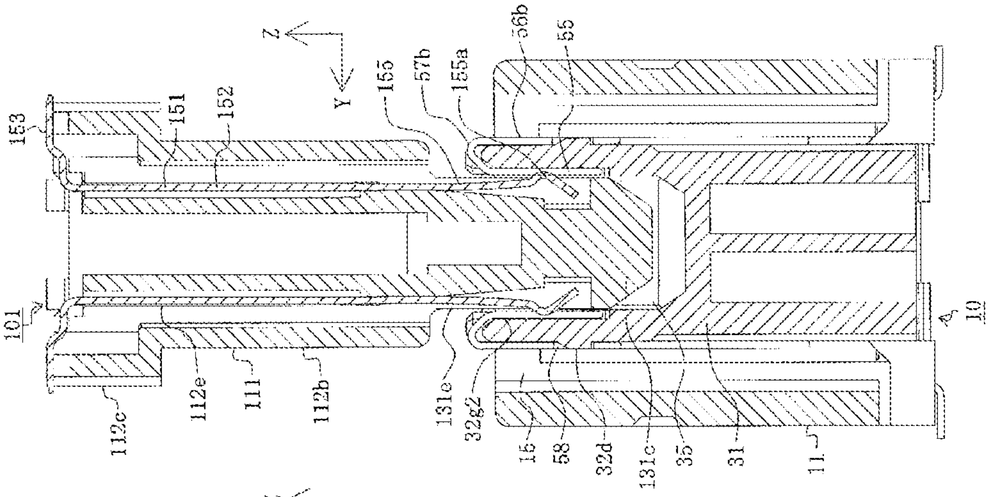
FIGS. 16A-16C are three views that illustrate the first connector and the second connector according to Embodiment 1 in a mated state.
Figure 16B:
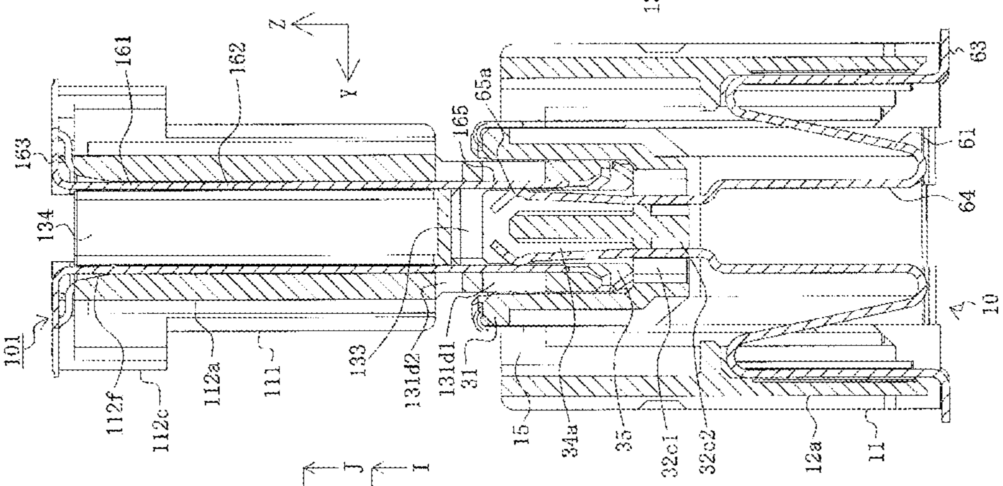
Figure 16A:
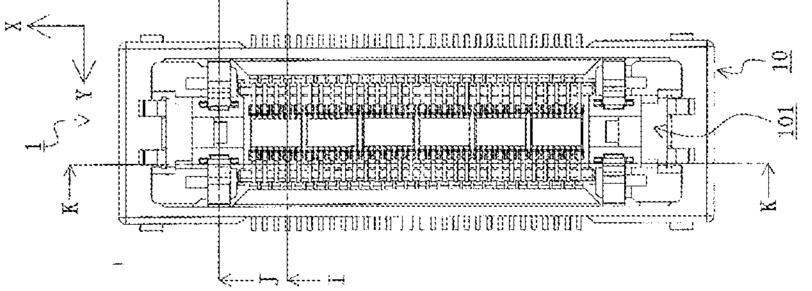
Figure 17:
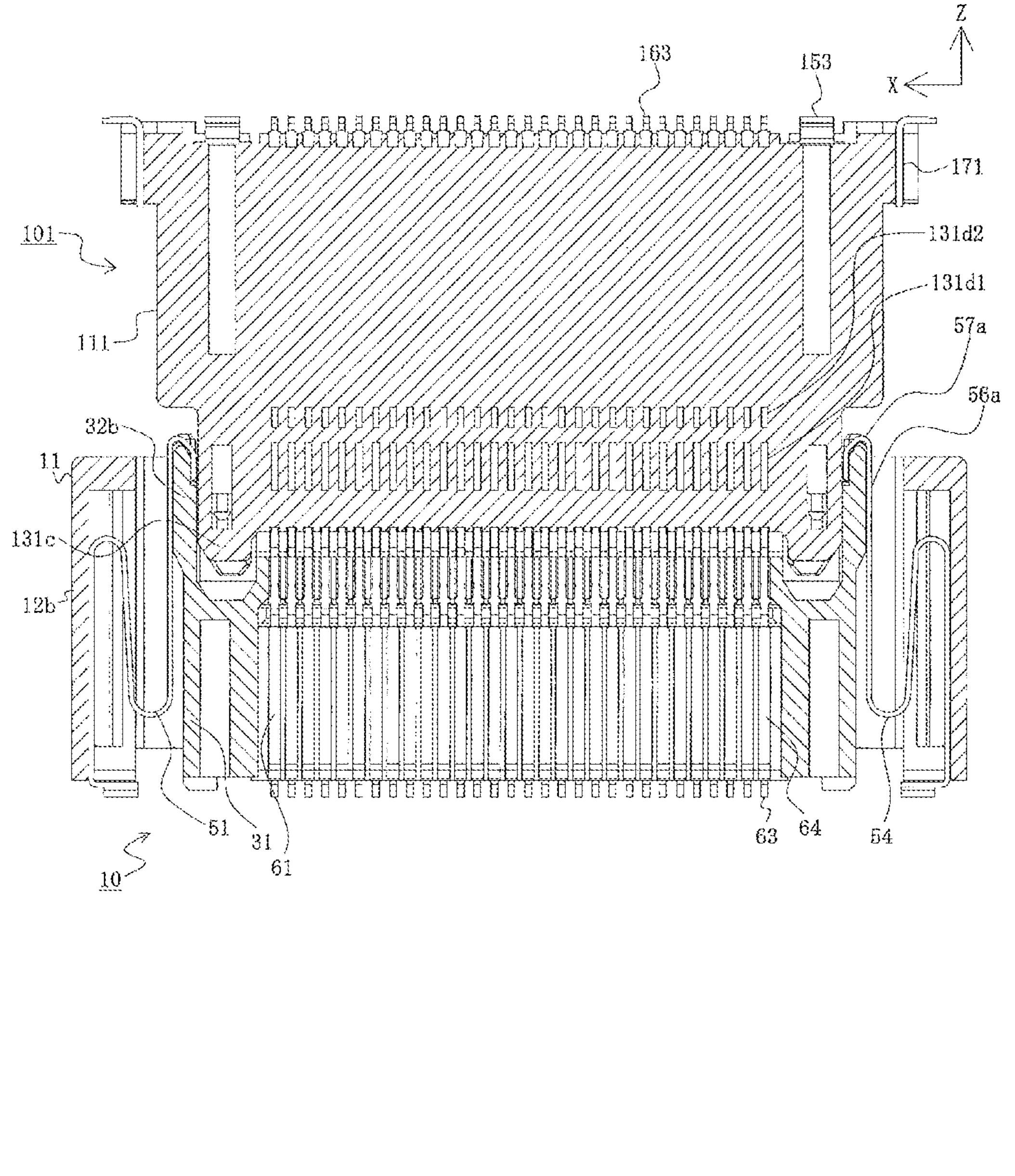
FIG. 17 is a vertical cross-sectional view illustrating the first connector and the second connector according to Embodiment 1 in a mated state and is a sectional view taken along the line K-K of FIG. 16A.

FIGS. 16A-16C are three views illustrating a mated state of the first connector and the second connector according to Embodiment 1. FIG. 17 is a vertical cross-sectional view illustrating the first connector and the second connector according to Embodiment 1 in a mated state and is a sectional view taken along the line K-K in FIG. 16A. Note, FIG. 16A is a plan view as viewed from the second connector side, FIG. 16B is a sectional view taken along the line I-I in FIG. 16A, and FIG. 16C is a sectional view taken along the line J-J in FIG. 16A.

Here, the first connector 10 is connected by means of soldering the tail portions 63 of the first signal terminals 61 and the tail portions 53 of the first power supply terminals 51 to the connection pad on the surface of the first board (not shown) and is thus surface mounted to the first board. In addition, connection pads connected to the tail portions 63 of the first signal terminals 61 are connected to a conductive trace for transmitting signals on the first board. The connection pads that the tail portions 53 of the first power supply terminals 51 are connected to are connected to a conductive trace for transmitting power supply on the first board.

In a similar manner, the second connector 101 is connected by soldering the tail portions 163 of the second signal terminals 161, the tail portions 153 of the second power supply terminals 151, and the tail portions 173 of the housing fixation metal fitting 171 to connection pads on the surface of the second board and is thus surface mounted to the second board. In addition, connection pads connected to the tail portions 163 of the second signal terminals 161 are connected to a conductive trace for transmitting signals on the second board. The connection pads that the tail portions 153 of the second power supply terminals 151 are connected to are connected to a conductive trace for transmitting power supply on the second board.

First, the operator sets the mating surface of the first connector 10 (upper surface in FIG. 2) and the mating surface of the second connector 101 (upper surface in FIG. 11) facing each other and makes adjustments aligning the position of the upper portion 131 of the second housing 111 of the second connector 101 with the position of the counterpart housing cavity for stowing 35 of the first movable housing 31 of the first connector 10. Therefore, as illustrated in FIG. 1B, positioning of the first connector 10 and the second connector 101 is complete.

In this state, as the first connector 10 and/or the second connector 101 are moved in a direction closer to the counterpart side, in other words, in a mating direction, the upper portion 131 of the second housing 111 is inserted into the counterpart housing cavity for stowing 35 of the main body portion 32 of the first movable housing 31 and the central wall portion 34 of the counterpart housing cavity for stowing 35 is inserted into the upper cavity 133 of the upper portion 131. Note, the substantially quadrangular trapezoid shape upward protruding end portion 131*c* having a sloped surface is formed at the upper end of the upper portion 131 at both ends in the longitudinal direction so when mating, the upper portion 131 is smoothly inserted into the counterpart housing cavity for stowing 35. In addition, the upper end parts of the short wall portions 32*b* and the upper end parts of the long wall portions 32*a* near the corner portions 32*h* of the first movable housing 31 are covered by the first upper end cover portion 57*a* and second upper end cover portion 57*b* that contain metal so during mating, even if the second housing 111 comes into contact with the upward protruding end portion 131*c*, no damage or injury will occur.

Thus, as illustrated in FIGS. 1A, 16, and 17, when the first connector 10 and second connector 101 are in a mated state, through mating of the first movable housing 31 and the second housing 111, the first signal terminals 61 and second signal terminals 161, that are mutually compatible, become conductive and the first power supply terminals 51 and the second power supply terminals 151, that are mutually compatible, become conductive.

Specifically, at least a portion near the upper end of the upper portion 131 of the second housing 111 enters in between the long wall portion 32*a* in the counterpart housing cavity for stowing 35 and the central wall portion 34 and the surface of the contact portion 165 of the second signal terminal 161 stowed in the signal terminal stowing recess 131*f* of the upper portion 131 in the width direction on the center side of the second connector 101 comes into contact with the portion of the contact protrusion portion 65*a* of the contact portion 65 of the first signal terminal 61 stowed in the signal terminal contact portion groove for stowing 34*a* of the central wall portion 34 protruding outside the central wall portion 34 side surface, and thus the first signal terminal 61 and the second signal terminal 161 become conductive. Here, the contact portion 65 of the first signal terminal 61 functions as a cantilever and the contact protrusion portion 65*a* is pushed against the surface of the second signal terminal 161 contact portion 165 by the elasticity exhibited by this cantilever; therefore, the conducting state of the first signal terminal 61 and second signal terminal 161 is reliably maintained.

In addition, at least the portion of the upper portion 131 of the second housing 111 close to the upper end of the short wall portion 131*b* enters into the counterpart housing cavity for stowing 35 close to the short wall portion 32*b* and the portion of the contact protruding portion 155*a* of the contact portion 155 of the second power supply terminal 151 stowed in the power supply terminal stowing recess 131*e* formed on the side surface of the short wall portion 131*b* extending in the longitudinal direction and protruding outside the side surface of the short wall portion 131*b* comes into contact with the contact surface that is the flat plate-shaped contact portion 55 connected to the lower end of the second upper end cover portion 57*b* that covers the upper end of the long wall portion 32*a* near the corner portion 32*h* of the first movable housing 31. Thus, the first power supply terminal 51 and the second power supply terminal 151 are electrically connected together. Here, the contact portion 155 of the second power supply terminal 151 functions as a cantilever and the contact protruding portion 155*a* is pushed against the contact surface of the first power supply terminal 51 contact portion 55 based on the elasticity exhibited by this cantilever; therefore, the conducting state of the first power supply terminal 51 and the second power supply terminal 151 is reliably maintained.

In this manner, with the first connector 10 and second connector 101 mated, if there is a fluctuation in the positional relationship of the first board and the second board and the second connector 101 is displaced relative to the first connector 10 or there is an external force such as an impact or vibration or the like, the bent portion 54 of the first power supply terminal 51 and the bent portion 64 of the first signal terminal 61 flexibly deform, appropriately absorbing displacement relative to the first fixed housing 11 of the first movable housing 31 mated to the second housing 111. Therefore, the mated state of the first connector 10 and the second connector 101 is maintained without being released.

In this manner, with the present embodiment, the first connector 10 includes the first fixed housing 11, the first movable housing 31 that is movable relative to the first fixed housing 11, and the first power supply terminals 51 retained in the first fixed housing 11 and first movable housing 31. Furthermore, the first fixed housing 11 includes the long wall portions 12*a* that extend in the longitudinal direction of the first connector 10 and short wall portions 12*b* that extend in the width direction of the first connector 10 and connect the end portions of the long wall portions 12*a*. The first movable housing 31 includes the long wall portions 32*a* that extend in the longitudinal direction of the first connector 10 and short wall portions 32*b* that extend in the width direction of the first connector 10 and connect the end portions of the long wall portions 32*a*. The first power supply terminals 51 include the fixed-side retained portion 52 retained in the short wall portions 12*b* of the first fixed housing 11, the movable-side retained portion 56 retained in the first movable housing 31, and the bent portion 54 that connects the fixed-side retained portion 52 and the movable-side retained portion 56. The movable-side retained portion 56 includes a first main body portion 56*a* at least a part of which extends along the short wall portions 32*b* and a second main body portion 56*b* at least a part of which extends along the long wall portions 32*a*.

Therefore, the degree of freedom of displacement of the first movable housing 31 is high, increasing the robustness of the first movable housing 31, enabling reliably maintaining the mated state of the second connector 101. In addition, this enables size reduction of the first connector 10 along with simplifying the structure, reducing component count, simplification of manufacturing, reducing cost, and improving reliability.

In addition, the first main body portion 56*a* includes the first upper end cover portion 57*a* that covers the upper end portion of the short wall portions 32*b* and the second main body portion 56*b* includes the second upper end cover portion 57*b* that covers the upper end portion of the long wall portions 32*a*. Therefore, even if the second housing 111 makes contact when mating with the second connector 101, there is no damage or injury to the long wall portions 32*a* or end wall portions 32*b* of the first movable housing 31.

Furthermore, the contact portion 55 for contacting the second power supply terminal 151 is arranged inside the long wall portion 32*a* and extends along the inner surface 32*a*1 of the long wall portion 32*a* and preferably, the contact portion 55 extends in the vertical direction parallel to the inner surface 32*a*1 of the long wall portion 32*a* and is connected to the second upper end cover portion 57*b*. Therefore, the conduction state between the first power supply terminal 51 and the second power supply terminal 151 is reliably maintained.

Furthermore, the bent portion 54 is bent in a substantially S shape as viewed from the width direction of the first connector 10; a first end thereof is connected to the upper end of the fixed-side retained portion 52 and a second end is connected to the lower end of the first main body portion 56*a* of the movable-side retained portion 56. Therefore, the first power supply terminal 51 mainly has flexibility in the longitudinal direction of the first connector 10 and the first movable housing 31 can stably be displaced relative to the first fixed housing 11.

Further, the second main body portion 56*b* of the movable-side retained portion 56 includes the engagement opening 58 that engages with the first movable housing 31. Therefore, the movable-side retained portion 56 is reliably retained in the first movable housing 31.

Further, the first power supply terminal 51 includes a tail portion 53 connected to the fixed-side retained portion 52 and the tail portion 53 includes a relay portion 53*b* extending from the lower end of the fixed-side retained portion 52 toward the center of the first connector 10 in the longitudinal direction and a main body portion 53*a* that is connected to the relay portion 53*b* and extends to the outside of the first connector 10 in the width direction. Therefore, since the tail portion 53 is not positioned outside the first fixed housing 11 in the longitudinal direction, the mounting surface of the first connector 10 on the surface of the first board does not increase in the longitudinal direction.

The first power supply terminals 51 are arranged in pairs at both ends in the longitudinal direction of the first connector 10, and arranged so as to be lined up in the width direction of the first connector 10 respectively at both ends in the longitudinal direction. Therefore, the first movable housing 31 is stably and flexibly displaceably retained with respect to the first fixed housing 11. In addition, the first connector 10 can be provided with power supply lines respectively at both ends in the longitudinal direction in which positive and negative power supply current flows.

Next, embodiment 2 will be described below. Note that, for portions having the same structure as that of embodiment 1, descriptions thereof are omitted by giving the same reference numerals thereto. Moreover, descriptions of the same operations and effects as those of embodiment 1 will be omitted.

Figure 18:
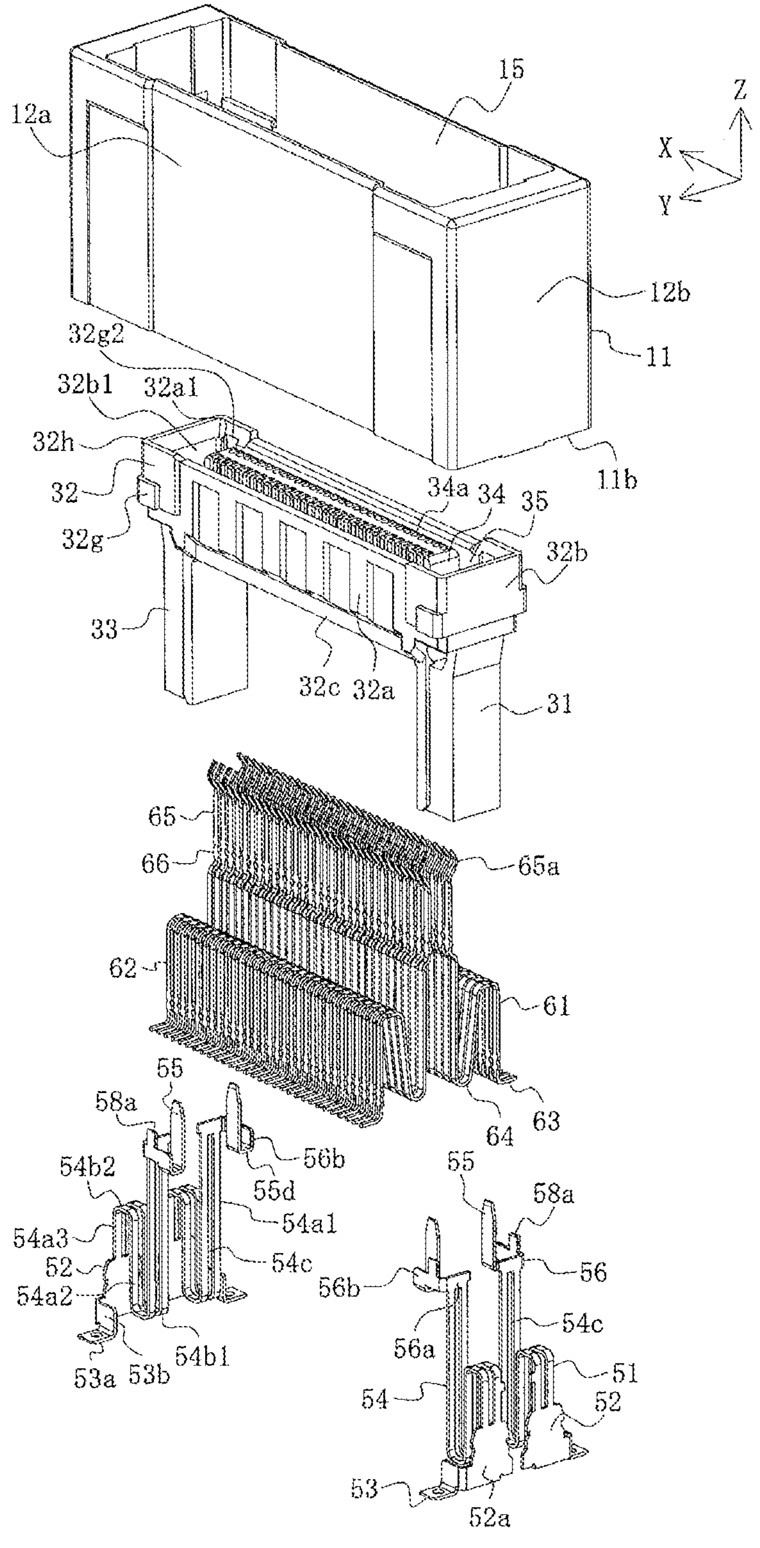
FIG. 18 is an exploded view illustrating the first connector according to embodiment 2.
Figure 19A:
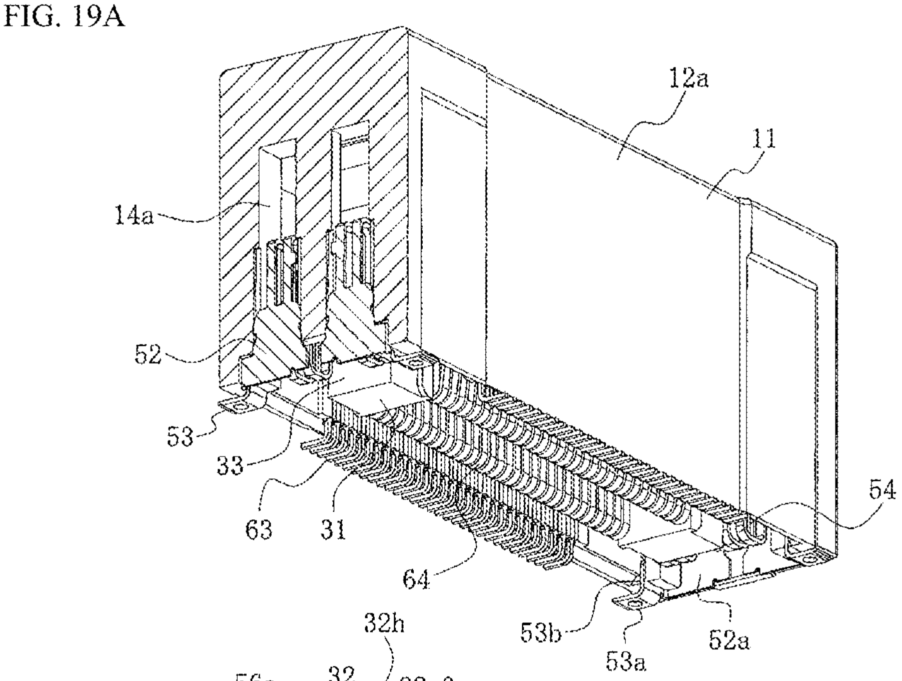
FIGS. 19A and 19B are perspective views illustrating the relationship of the movable housing and the signal terminal of the first connector according to Embodiment 2 as viewed diagonally from below.
Figure 19B:
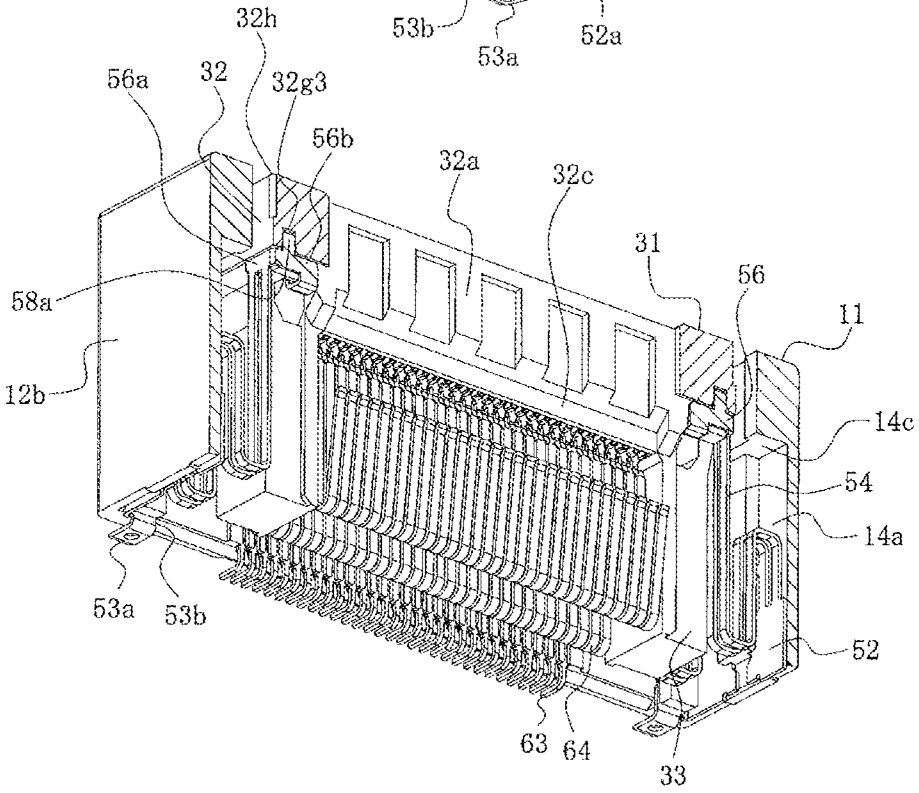
Figure 20A:
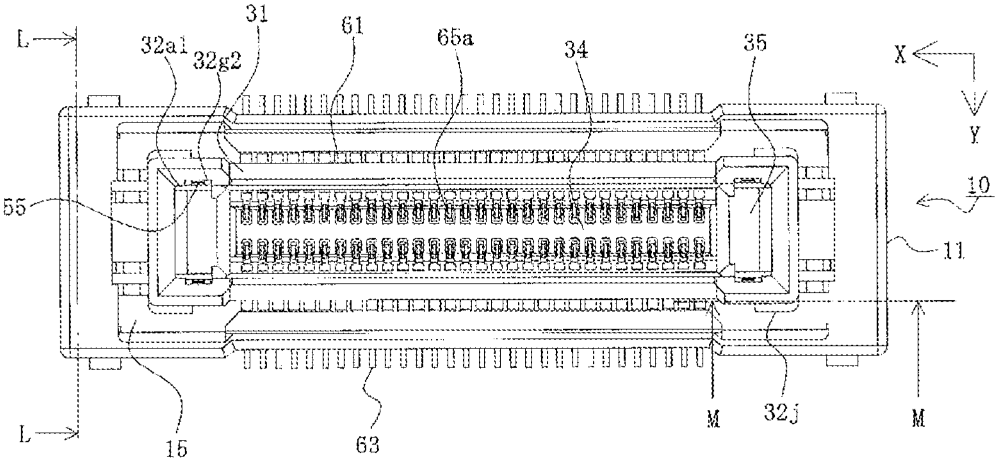
FIGS. 20A-20C illustrate a mounting portion of the first connector power supply terminal onto the movable housing according to Embodiment 2.
Figure 20B:
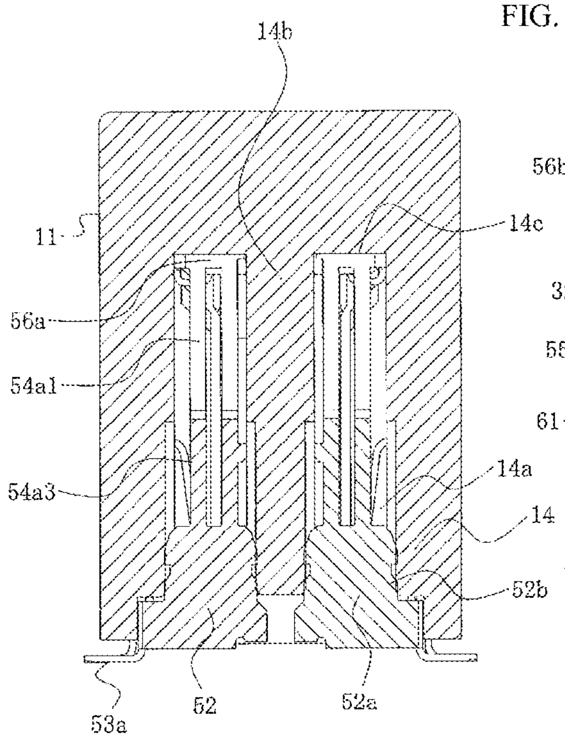
Figure 20C:
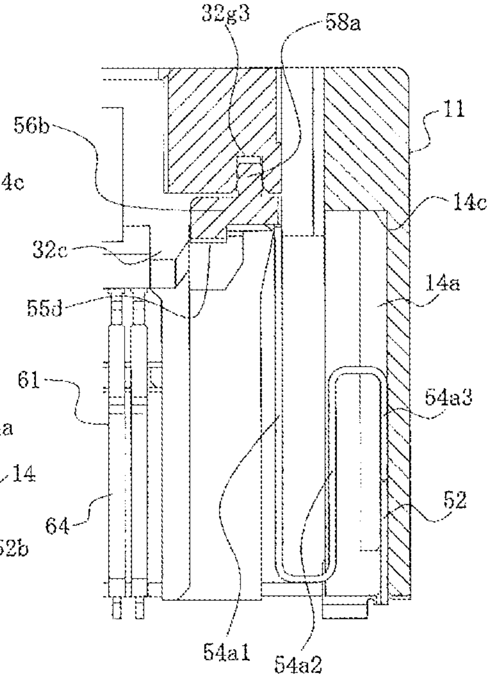

FIG. 18 is an exploded view of the first connector according to Embodiment 2. FIGS. 19A and 19B are perspective views diagonally from below of the relationship between the movable housing and the signal terminal of the first connector according to Embodiment 2. FIGS. 20A-20C illustrate a mounting portion of the power supply terminal of the first connector to the movable housing according to Embodiment 2.

FIG. 19A is a perspective view including a cross section as seen diagonally from below the first connector, and FIG. 19B is a perspective view including a side cross section as seen diagonally from below the first connector. FIG. 20A is a top view of the first connector, FIG. 20B is a sectional view taken along the line L-L of FIG. 20A, and FIG. 20C is a sectional view taken along the line M-M in FIG. 20A.

In Embodiment 1, the movable-side retained portion 56 of the first power supply terminal 51 includes the first upper end cover portion 57*a* connected to the upper end of the first main body portion 56*a*, the second upper end cover portion 57*b* connected to the upper end of the second main body portion 56*b*, and the engagement opening 58 formed on the second upper end cover portion 57*b* and second main body portion 56*b*. The movable-side retained portion 56 moves from the top to bottom relative to the first movable housing 31 and is mounted close to the corner portions 32*h* of the first movable housing 31. The first upper end cover portion 57*a* and second upper end cover portion 57*b* cover the upper end portion of the short wall portions 32*b* and the upper end portion of the long wall portions 32*a* near the corner portions 32*h* of the first movable housing 31.

On the other hand, with the present embodiment, the movable-side retained portion 56 of the first power supply terminal 51 does not include the first upper end cover portion 57*a*, the second upper end cover portion 57*b*, or the engagement opening 58. The movable-side retained portion 56 moves relatively from bottom to top with respect to the first movable housing 31 and is attached close to the corner portions 32*h* of the first movable housing 31.

In addition, with the present embodiment, the shape of the tail portion 53 of the first power supply terminal 51, the structure of a part of the first movable housing 31, and the structure of a part of the first fixed housing 11 are different from those of Embodiment 1.

With the present embodiment, the first main body portion 56*a* of the movable-side retained portion 56 of the first power supply terminal 51 is a long narrow strip plate shape extending in the width direction of the first connector 10 and the dimension in the vertical direction is smaller than that of the first main body portion 56*a* in Embodiment 1. In addition, the second main body portion 56*b* of the present embodiment is bent at approximately 90 degrees in the width direction of the first connector 10 and connected to the outer edge of the first main body portion 56*a*, is a long narrow strip plate shape extending towards the center of the first connector 10 in the longitudinal direction, and the dimension thereof in the vertical direction is smaller than that of the second main body portion 56*b* of Embodiment 1. Note, the second main body portion 56*b* in the present embodiment does not include the engagement opening 58.

Furthermore, the contact portion 55 is connected to the second main body portion 56*b* via a contact portion connecting piece 55*d*. Specifically, a contact portion connecting piece 55*d* is bent at approximately 90 degrees towards the center edge of the first connector 10 in the longitudinal direction and connected to the lower edge of the second main body portion 56*b* and is a narrow long strip plate shape extending toward the inside of the first connector 10 in the width direction. The contact portion 55 is a narrow long strip plate shaped member extending in the vertical direction, is bent at approximately 90 degrees, and connected to the tip of the contact portion connecting piece 55*d*. In addition, an engaging protruding piece 58*a* extends upwards from a portion at the upper edge of the second main body portion 56*b* near the first main body portion 56*a* as an engaged portion that engages with the first movable housing 31.

In addition, power supply terminal movable-side recesses for stowing 32*g* for stowing portions of the movable-side retained portion 56 of the first power supply terminal 51 are formed at the four corner portions 32*h* of the first movable housing 31 main body portion 32. However, the power supply terminal movable-side recesses for stowing 32*g* of the present embodiment include the second recesses for stowing 32*g*2 formed on the inner surfaces 32*a*1 of the long wall portions 32*a* but not the first recesses for stowing 32*g*1 formed on the inner surfaces 32*b*1 of the short wall portions 32*b*. Further, engaging protrusions 32*d* are formed on the outer surfaces of the long wall portions 32*a*.

However, a thickened portion 32*j* is formed on the outer surfaces of the long wall portions 32*a* at a portion near both ends in the longitudinal direction. Furthermore, the power supply terminal movable-side recesses for stowing 32*g* of the present embodiment include a third stowing recess 32*g*3 as an engagement recess formed in the thickened portion 32*j*. The third stowing recess 32*g*3 is a slit shaped cavity extending in the vertical direction, the lower end opening at a downward facing surface of the first movable housing 31, specifically, the bottom surface of the thickened portion 32*j*, and is a cavity into which the engaging protruding piece 58*a* of the first power supply terminal 51 movable-side retained portion 56 is relatively inserted and retained from below.

In addition, the second recess for stowing 32*g*2 penetrates the main body portion 32 bottom portion 32*c* of the first movable housing 31 in the vertical direction and the lower end thereof is open to the lower surface of the bottom portion 32*c*. Furthermore, the contact portion 55 of the first power supply terminal 51 movable-side retained portion 56 is inserted into the second recess for stowing 32*g*2 relatively from below and stowed.

The foot portion 33*a* is not connected to the leg portion 33 of the first movable housing 31 in the present embodiment. Accordingly, in the first fixed housing 11, the lower end notch 12*c* is omitted.

In addition, the tail portion 53 of the first power supply terminal 51 in the present embodiment has a relay portion 53*b* bent approximately 90 degrees with respect to the first connector 10 in the width direction and is connected to the outer edge of the main body portion 52*a* of the fixed-side retained portion 52 extending in the vertical direction and is formed so as to extend toward the center of the first fixed housing 11 in the longitudinal direction. Furthermore, the main body portion 53*a* of the tail portion 53 is bent approximately 90 degrees and connected to the relay portion 53*b* and extends outwardly in the width direction of the first fixed housing 11.

Note that the basic configuration of another point of the first connector 10 in the present embodiment is the same as that of Embodiment 1 described above; therefore, a description thereof is omitted.

Next, the configuration of the second connector 101 will be described.

Figure 21:
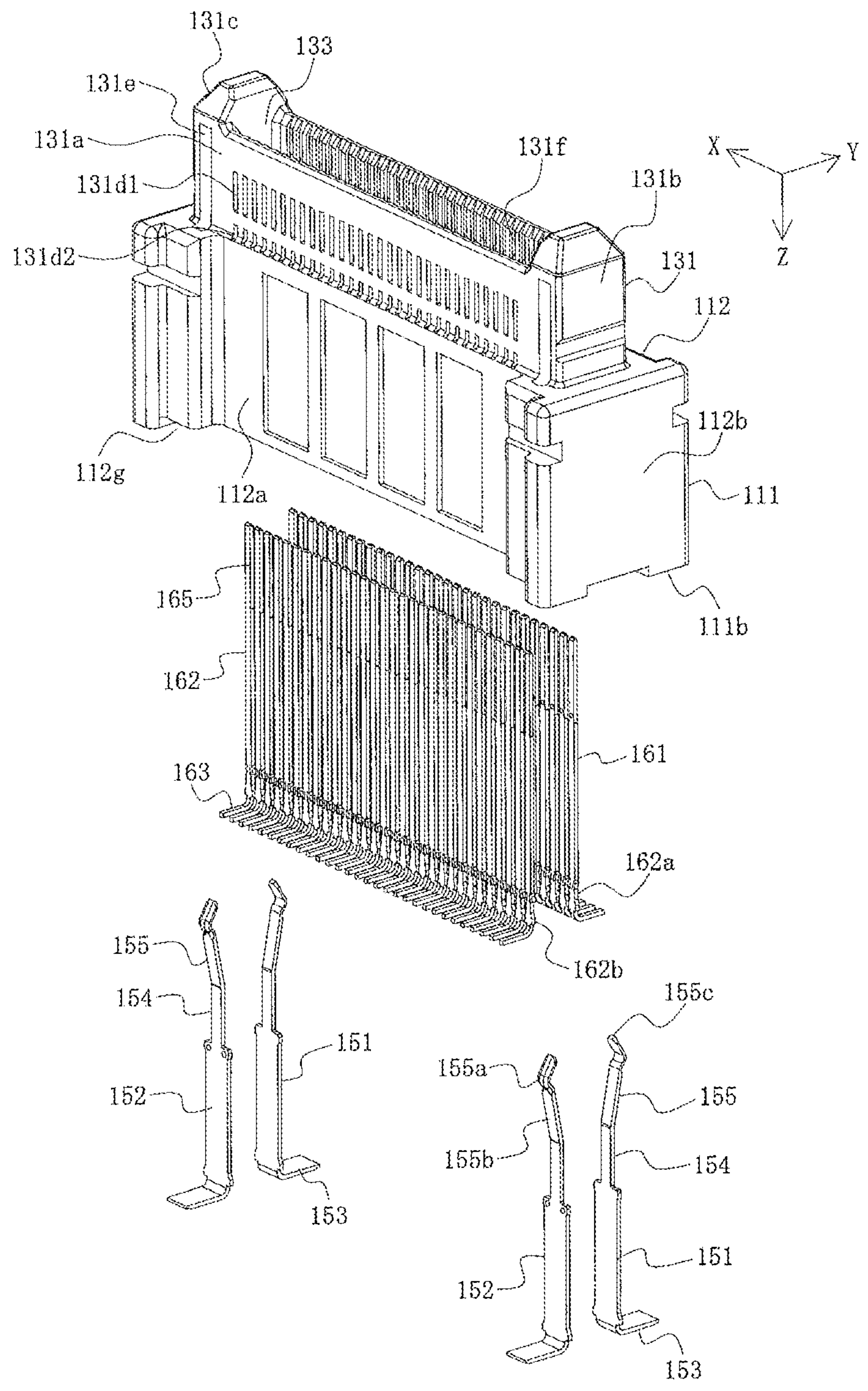
FIG. 21 is an exploded view of the second connector according to Embodiment 2.

FIG. 21 is an exploded view illustrating the second connector according to Embodiment 2.

Unlike the second connector 101 in Embodiment 1, the second connector 101 in the present embodiment does not include the housing fixation metal fitting 171. Thus, regarding the second housing 111, the outward protruding portion 112*c* formed on the metal fitting retention recess 112*d* is omitted.

Note that the basic configuration of another point of the second connector 101 in the present embodiment is the same as that of Embodiment 1 described above; therefore, a description thereof is omitted.

Next, the operation of mating the first connector 10 and the second connector 101 with the above configuration is described.

Figure 22C:
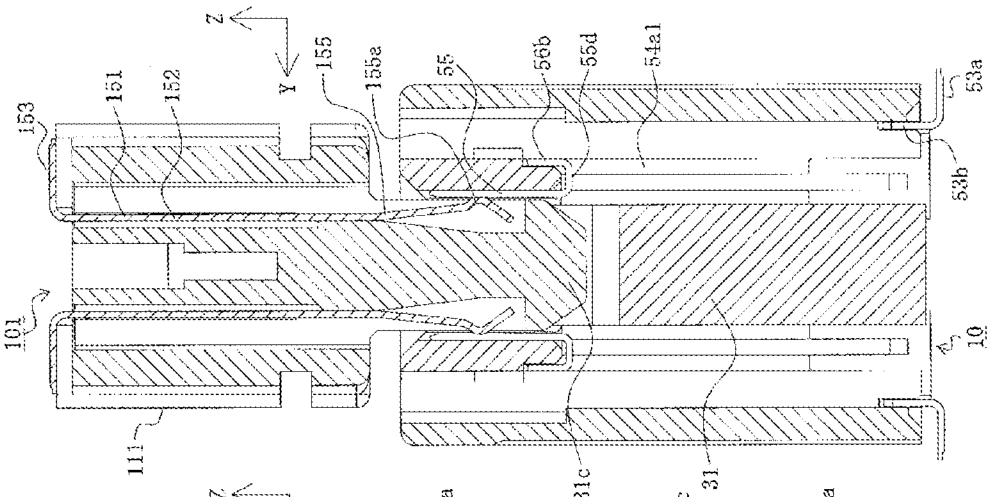
FIGS. 22A-22C are three views illustrating a state of the first connector and the second connector according to Embodiment 2 in a mated state.
Figure 22B:
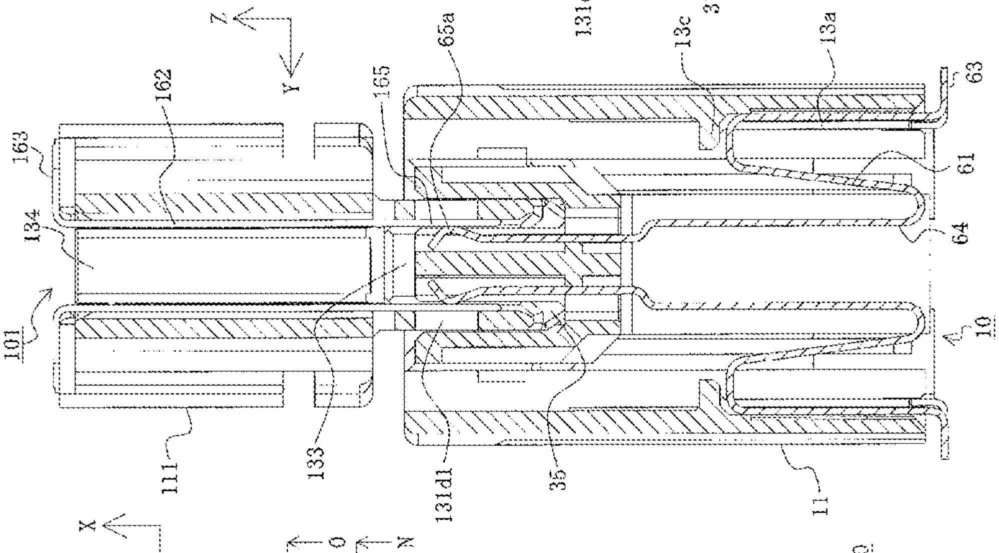
Figure 22A:
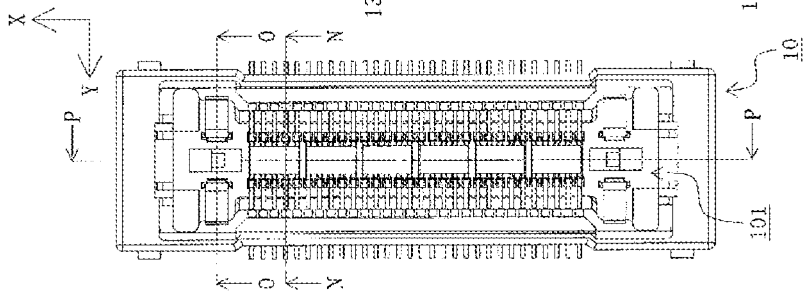
Figure 23:
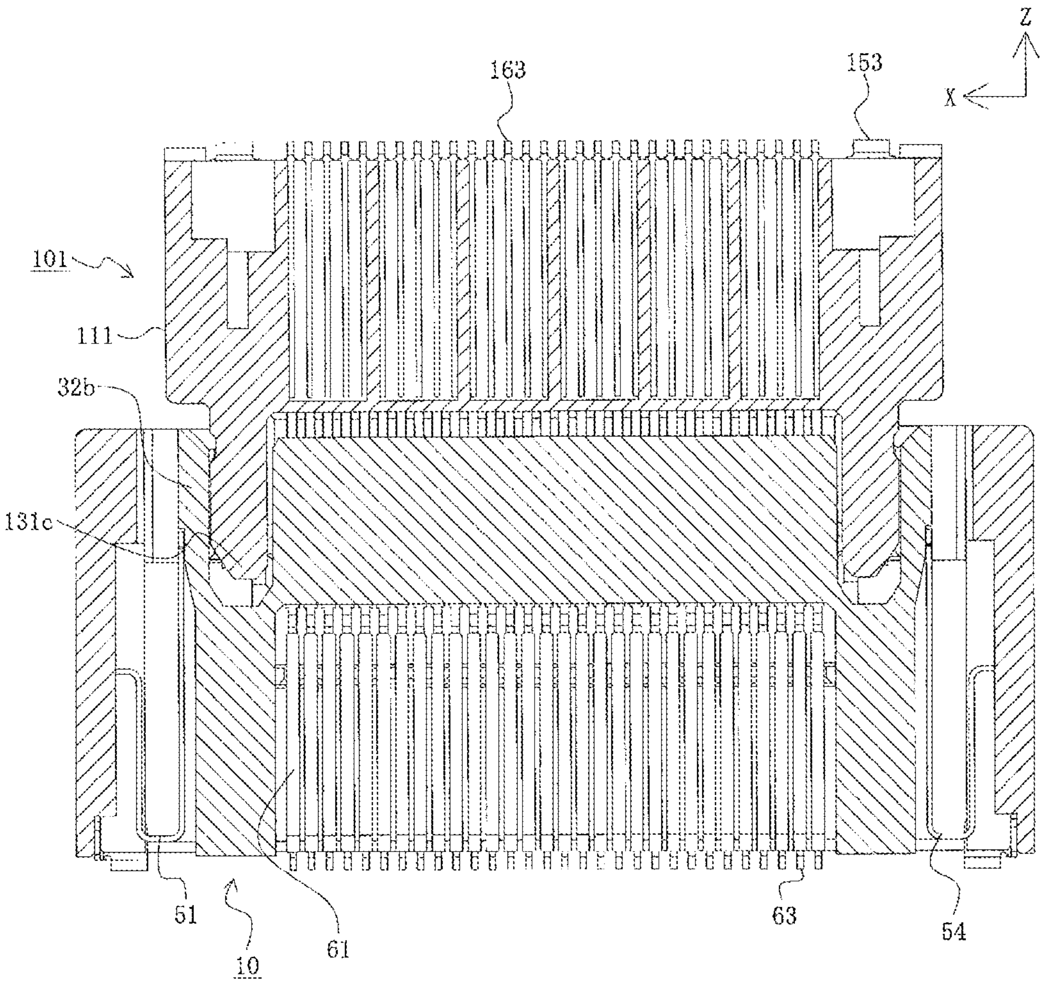
FIG. 23 is a vertical cross-sectional view illustrating the first connector and the second connector according to Embodiment 2 in a mated state and is a sectional view taken along the line P-P in FIG. 22A.

FIGS. 22A-22C are three views illustrating a mated state of the first connector and the second connector according to Embodiment 2. FIG. 23 is a vertical cross-sectional view illustrating the first connector and the second connector according to Embodiment 2 in a mated state and is a sectional view taken along the line P-P in FIG. 22A. Note, in FIG. 22A is a plan view as viewed from the second connector side, FIG. 22B is a sectional view taken along the line N-N in FIG. 22A, and FIG. 22C is a sectional view taken along the line O—O in FIG. 22A.

As illustrated in FIGS. 22A-22C and FIG. 23, when the first connector 10 and second connector 101 are in a mated state, through mating of the first movable housing 31 and the second housing 111, the first signal terminals 61 and second signal terminals 161, that are mutually compatible, become conductive and the first power supply terminals 51 and the second power supply terminals 151, that are mutually compatible, become conductive.

Specifically, at least a portion near the upper end of the upper portion 131 of the second housing 111 enters in between the long wall portion 32*a* in the counterpart housing cavity for stowing 35 and the central wall portion 34 and the surface of the contact portion 165 of the second signal terminal 161 stowed in the signal terminal stowing recess 131*f* of the upper portion 131 in the width direction on the center side of the second connector 101 comes into contact with the portion of the contact protrusion portion 65*a* of the contact portion 65 of the first signal terminal 61 stowed in the signal terminal contact portion groove for stowing 34*a* of the central wall portion 34 protruding outside the central wall portion 34 side surface, and thus the first signal terminal 61 and the second signal terminal 161 become conductive. Here, the contact portion 65 of the first signal terminal 61 functions as a cantilever and the contact protrusion portion 65*a* is pushed against the surface of the second signal terminal 161 contact portion 165 by the elasticity exhibited by this cantilever; therefore, the conducting state of the first signal terminal 61 and second signal terminal 161 is reliably maintained.

In addition, at least the portion of the upper portion 131 of the second housing 111 close to the upper end of the short wall portion 131*b* enters into the counterpart housing cavity for stowing 35 close to the short wall portion 32*b* and the portion of the contact protruding portion 155*a* of the contact portion 155 of the second power supply terminal 151 stowed in the power supply terminal stowing recess 131*e* formed on the side surface of the short wall portion 131*b* extending in the longitudinal direction and protruding outside the side surface of the short wall portion 131*b* comes into contact with the contact surface that is the flat plate-shaped contact portion 55 stowed in the second recess for stowing 32*g*2 formed in the inner surface 32*a*1 of the long wall portion 32*a* near the corner portion 32*h* of the first movable housing 31. Thus, the first power supply terminal 51 and the second power supply terminal 151 are electrically connected together. Here, the contact portion 155 of the second power supply terminal 151 functions as a cantilever and the contact protruding portion 155*a* is pushed against the contact surface of the first power supply terminal 51 contact portion 55 based on the elasticity exhibited by this cantilever; therefore, the conducting state of the first power supply terminal 51 and the second power supply terminal 151 is reliably maintained.

In this manner, with the first connector 10 and second connector 101 mated, if there is a fluctuation in the positional relationship of the first board and the second board and the second connector 101 is displaced relative to the first connector 10 or there is an external force such as an impact or vibration or the like, the bent portion 54 of the first power supply terminal 51 and the bent portion 64 of the first signal terminal 61 flexibly deform, appropriately absorbing displacement relative to the first fixed housing 11 of the first movable housing 31 mated to the second housing 111. Therefore, the mated state of the first connector 10 and the second connector 101 is maintained without being released.

In this manner, with the present embodiment, the engaging protruding piece 58*a* is inserted into the third stowing recess 32*g*3 with a lower end open to the downward facing surface of the first movable housing 31 from below and engaged. Accordingly, similar to the movable-side retained portion 66 of the first signal terminal 61, the movable-side retained portion 56 of the first power supply terminal 51 can be relatively inserted into and fixed in the first movable housing 31. Therefore, the assembly process of the first connector 10 is simplified, enabling reducing manufacturing costs of the first connector 10.

Note that an operation of mating the first connector 10 and the second connector 101 in the present embodiment and basic configurations and effects of the state of being mated and other points of the first connector 10 and the second connector 101 are the same as those of Embodiment 1 described above; therefore, descriptions thereof are omitted.

Next, Embodiment 3 will be described. Note that, for those having the same structure as those of Embodiments 1 and 2, descriptions thereof are omitted by giving the same reference numerals thereto. Moreover, descriptions of the same operations and effects as those of Embodiments 1 and 2 will be omitted.

Figure 24A:
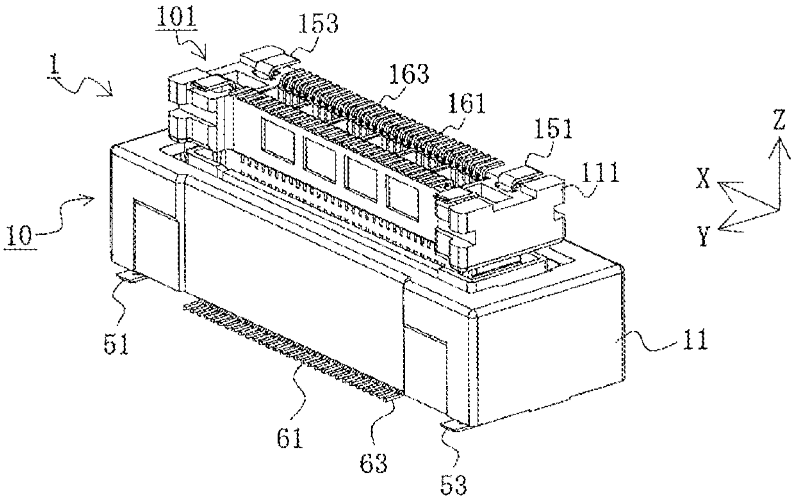
FIGS. 24A and 24B are perspective views illustrating the first connector and the second connector of Embodiment 3.
Figure 24B:
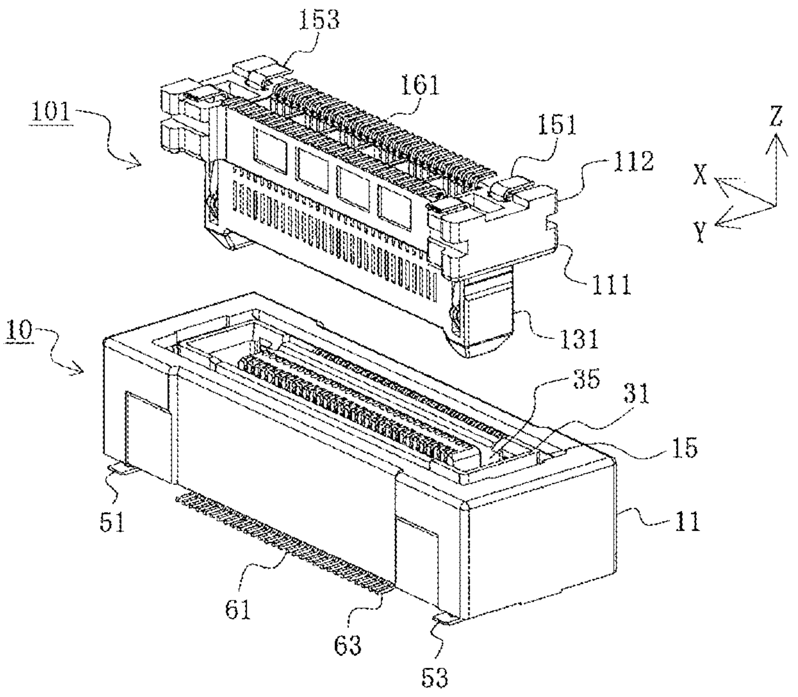
Figure 25:
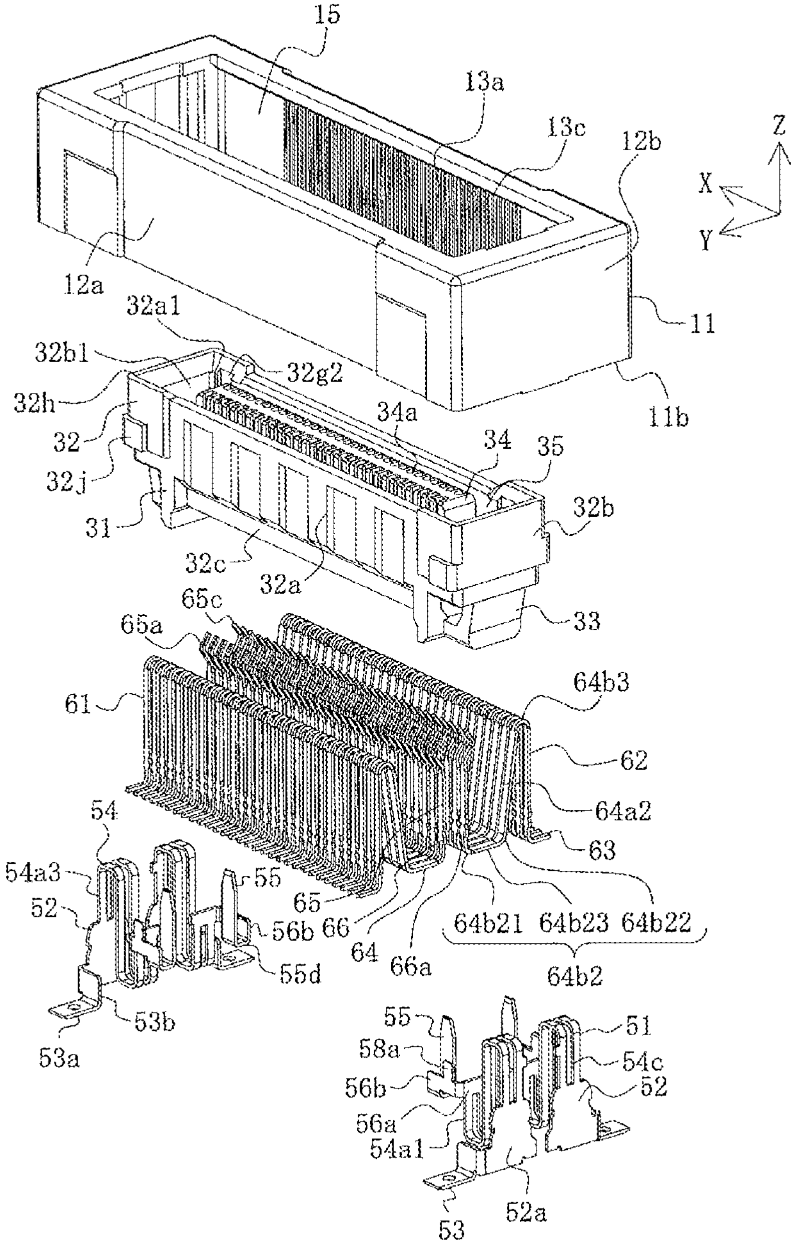
FIG. 25 is an exploded view of the first connector according to Embodiment 3.
Figure 26A:
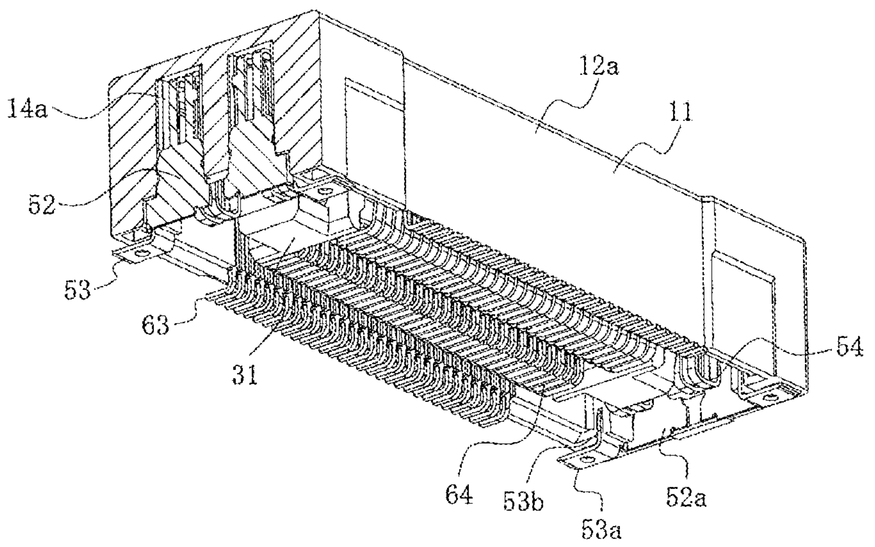
FIGS. 26A and 26B are perspective views illustrating the relationship of the movable housing and the signal terminal of the first connector according to Embodiment 3 as viewed diagonally from below.
Figure 26B:
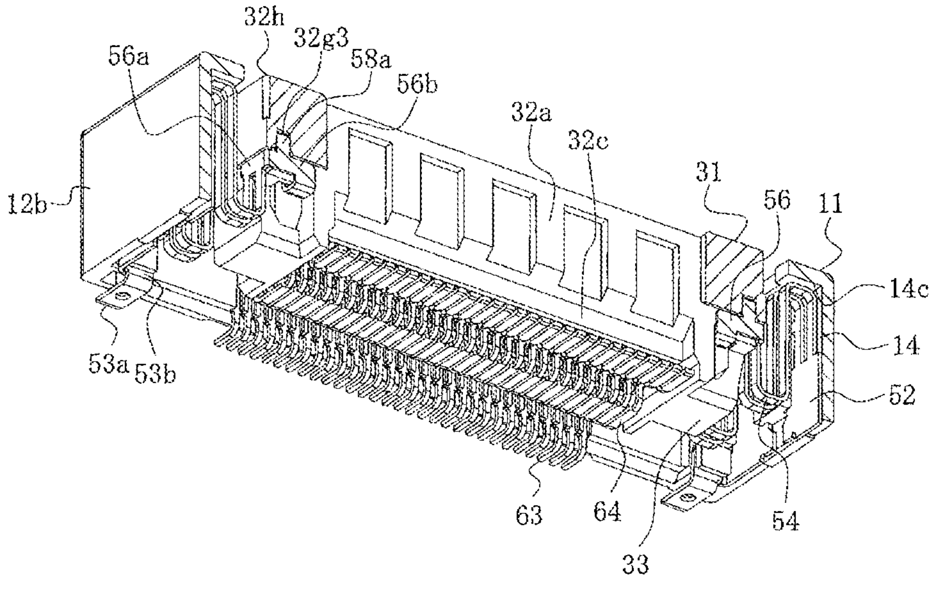

FIGS. 24A and 24B are perspective views illustrating the first connector and the second connector according to Embodiment 3. FIG. 25 is an exploded view of the first connector according to Embodiment 3. FIGS. 26A and 26B are perspective views diagonally from below of the relationship between the movable housing and the signal terminal of the first connector according to Embodiment 3. FIGS. 27A-27C illustrate a mounting portion of the power supply terminal of the first connector to the movable housing according to Embodiment 3.

Note, FIG. 24A is a diagram illustrating a mated state and FIG. 24B is a diagram illustrating a state prior to mating. FIG. 26A is a perspective view including a cross section as seen diagonally from below the first connector, and FIG. 26B is a perspective view including a side cross section as seen diagonally from below the first connector. FIG. 27A is a top view of the first connector, FIG. 27B is a sectional view taken along the line Q-Q in FIG. 27A, and FIG. 27C is a sectional view taken along the line R-R in FIG. 27A.

As illustrated in FIGS. 24A and 24B, the first connector 10 and second connector 101 of the present embodiment have dramatically reduced dimensions in the vertical direction (Z-axis direction) compared to the first connector 10 and the second connector 101 of Embodiments 1 and 2.

Specifically, with the first movable housing 31 of the first connector 10, the dimension in the vertical direction of the main body portion 32 is nearly the same as that in Embodiments 1 and 2, while the dimension in the vertical direction of the leg portion 33 is dramatically reduced compared to that of Embodiments 1 and 2. In accordance with this, the dimensions in the vertical direction of the first fixed housing 11, the first signal terminal 61, and the first power supply terminal 51 are dramatically reduced compared to those of Embodiments 1 and 2.

The first signal terminal 61 of the present embodiment is changed in that the first straight portion 64*a*1 and the first bent portion 64*b*1 of the bent portion 64 are omitted and in addition, the second bent portion 64*b*2 is provided with a bottom portion straight portion 64*b*23 that extends straight in the width direction of the first connector 10, as well as a bottom portion first bent portion 64*b*21 and bottom portion second bent portion 64*b*22 connected to both ends of the bottom portion straight portion 64*b*23. The bottom portion first bent portion 64*b*21 is a bent portion bent at approximately 180 degrees with a first end connected to the lower end of the main body portion 66*a* of the movable-side retained portion 66 and a second end connected to the bottom portion straight portion 64*b*23. In addition, the bottom portion second bent portion 64*b*22 is a bent portion bent at approximately 180 degrees with a first end connected to the lower end of the second straight portion 64*a*2 and a second end connected to the bottom portion straight portion 64*b*23. Thus, the dimensions in the vertical direction of the first signal terminal 61 are dramatically reduced compared to Embodiments 1 and 2 such that the contact tip portion 65*c* of the contact portion 65 is positioned only slightly above the upper end of the third bent portion 64*b*3. Note, the height of the upper end of the third bent portion 64*b*3 (position in vertical direction) is nearly the same as that of Embodiments 1 and 2.

In addition, the first power supply terminal 51 of the present embodiment has a first straight portion 54*a*1 with a dramatically reduced length (dimension in vertical direction) compared to that of Embodiment 2, and the movable-side retained portion 56 that was positioned above the second bent portion 54*b*2 in Embodiment 2 is changed and is positioned below the second bent portion 54*b*2.

Furthermore, the first fixed housing 11 of the present embodiment has the dimension in the vertical direction dramatically reduced compared to Embodiments 1 and 2 such that the brim portion 13*c* that demarcates the upper end of the signal terminal fixed-side retention recess 13*a* formed on the inner surface of the long wall portion 12*a* was positioned in the center or the lower half of the long wall portion 12*a* in the vertical direction in Embodiments 1 and 2 is changed to be positioned near the upper end of the long wall portion 12*a*.

Note that the basic configuration of another point of the first connector 10 in the present embodiment is the same as that of Embodiment 2 described above; therefore, a description thereof is omitted.

Next, the configuration of the second connector 101 will be described.

Figure 28:
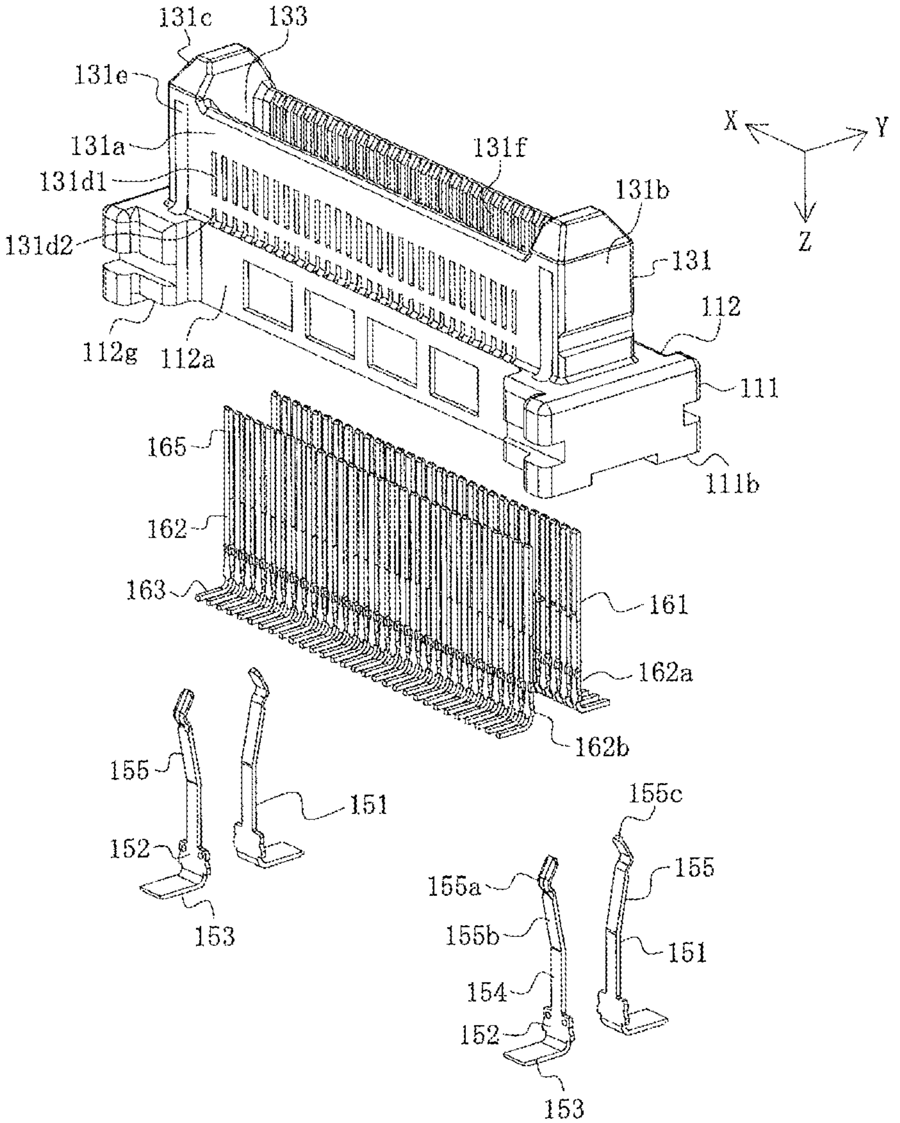
FIG. 28 is an exploded view illustrating the second connector according to Embodiment 3.

FIG. 28 is an exploded view illustrating the second connector according to Embodiment 3.

The second connector 101 of the present embodiment has dimensions of the second housing 111 in the vertical direction of the upper portion 131 that are nearly the same as those of Embodiments 1 and 2 while the dimension in the vertical direction of the lower portion 112 is dramatically reduced compared to that of Embodiments 1 and 2. In accordance with this, the dimensions in the vertical direction of the retained portion 162 of the second signal terminal 161 and the retained portion 152 of the second power supply terminal 151 are dramatically reduced compared to those of Embodiments 1 and 2.

Note that the basic configuration of another point of the second connector 101 in the present embodiment is the same as that of Embodiment 2 described above; therefore, a description thereof is omitted.

Next, the operation of mating the first connector 10 and the second connector 101 with the above configuration is described.

Figure 29A:
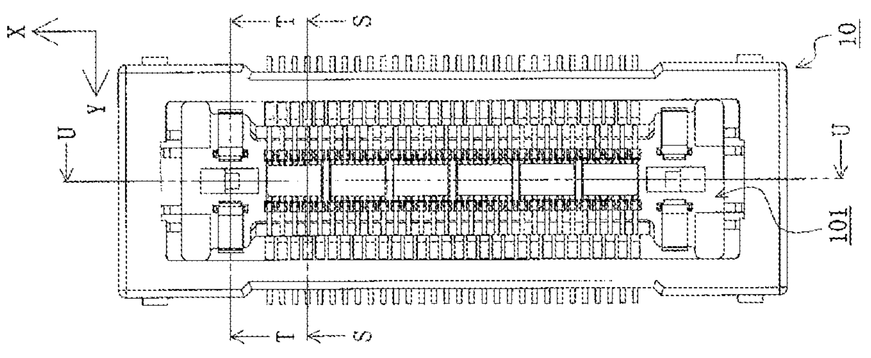
FIGS. 29A-29C are three views that illustrate the first connector and the second connector according to Embodiment 3 in a mated state.
Figure 29B:
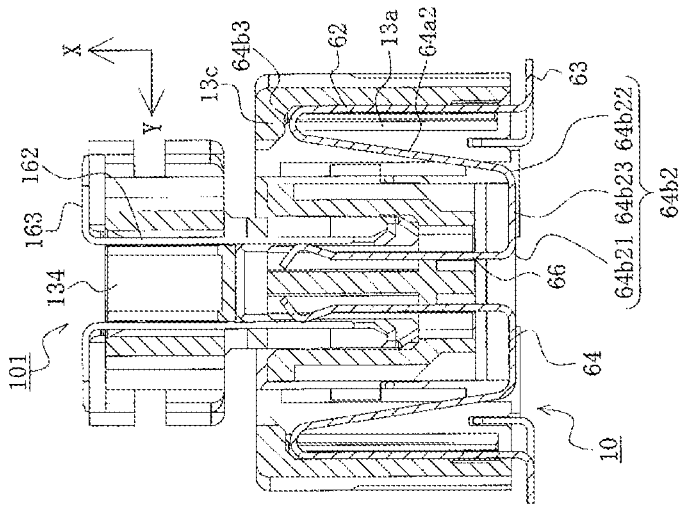
Figure 29C:
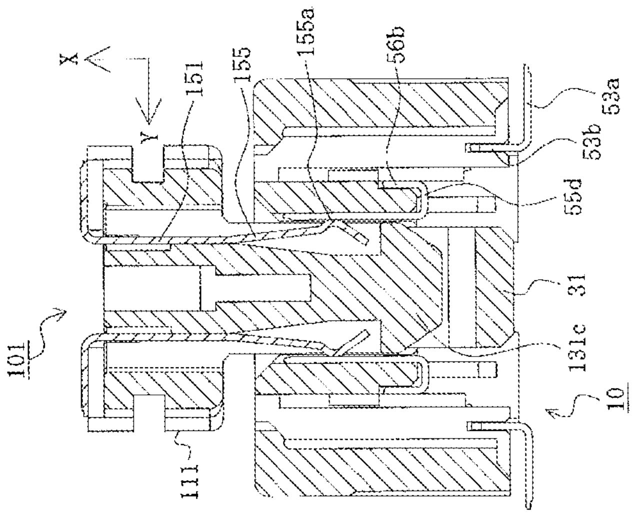
Figure 30:
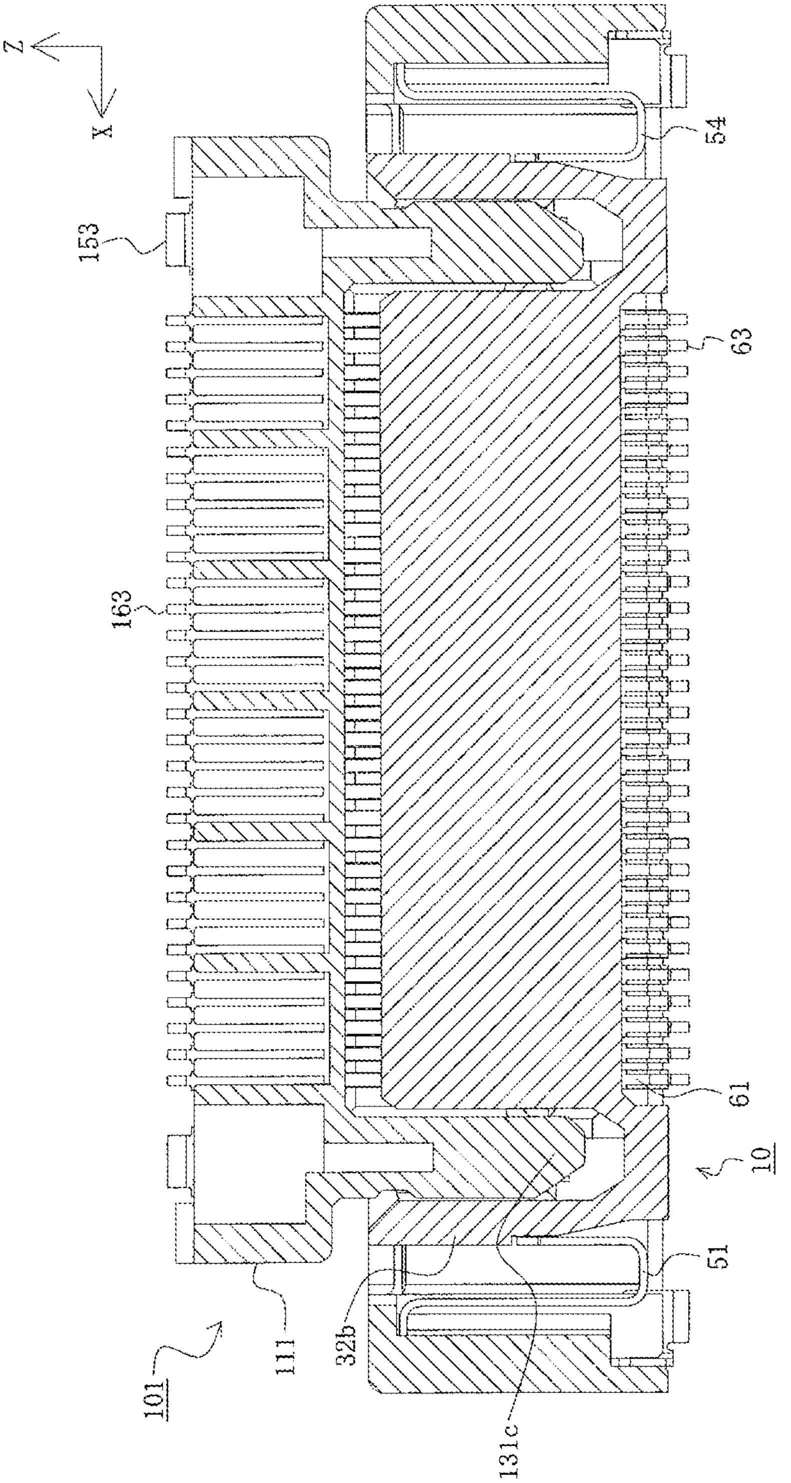
FIG. 30 is a vertical cross-sectional view illustrating the first connector and the second connector according to Embodiment 3 in a mated state and is a sectional view taken along the line U-U of FIG. 29A.

FIGS. 29A-29C are three views illustrating a mated state of the first connector and the second connector according to Embodiment 3. FIG. 30 is a vertical cross-sectional view illustrating the first connector and the second connector according to Embodiment 3 in a mated state and is a sectional view taken along the line U-U in FIG. 29A. Note, FIG. 29A is a plan view as viewed from the second connector side, FIG. 29B is a sectional view taken along the line S-S in FIG. 29A, and FIG. 29C is a sectional view taken along the line T-T in FIG. 29A.

As illustrated in FIGS. 24A, 29A-29C, and 30, when the first connector 10 and second connector 101 are in a mated state, through mating of the first movable housing 31 and the second housing 111, the first signal terminals 61 and second signal terminals 161, that are mutually compatible, become conductive and the first power supply terminals 51 and the second power supply terminals 151, that are mutually compatible, become conductive.

In this manner, with the first connector 10 and second connector 101 mated, if there is a fluctuation in the positional relationship of the first board and the second board and the second connector 101 is displaced relative to the first connector 10 or there is an external force such as an impact or vibration or the like, the bent portion 54 of the first power supply terminal 51 and the bent portion 64 of the first signal terminal 61 flexibly deform, appropriately absorbing displacement relative to the first fixed housing 11 of the first movable housing 31 mated to the second housing 111. Therefore, the mated state of the first connector 10 and the second connector 101 is maintained without being released.

Note that an operation of mating the first connector 10 and the second connector 101 in the present embodiment and basic configurations and effects of the state of being mated and other points of the first connector 10 and the second connector 101 are the same as those of Embodiment 2 described above; therefore, descriptions thereof are omitted.

Next, Embodiment 4 will be described. Note that, for those having the same structure as that of Embodiments 1 to 3, descriptions thereof are omitted by giving the same reference numerals thereto. Moreover, descriptions of the same operations and effects as those of Embodiments 1 to 3 will be omitted.

Figure 31:
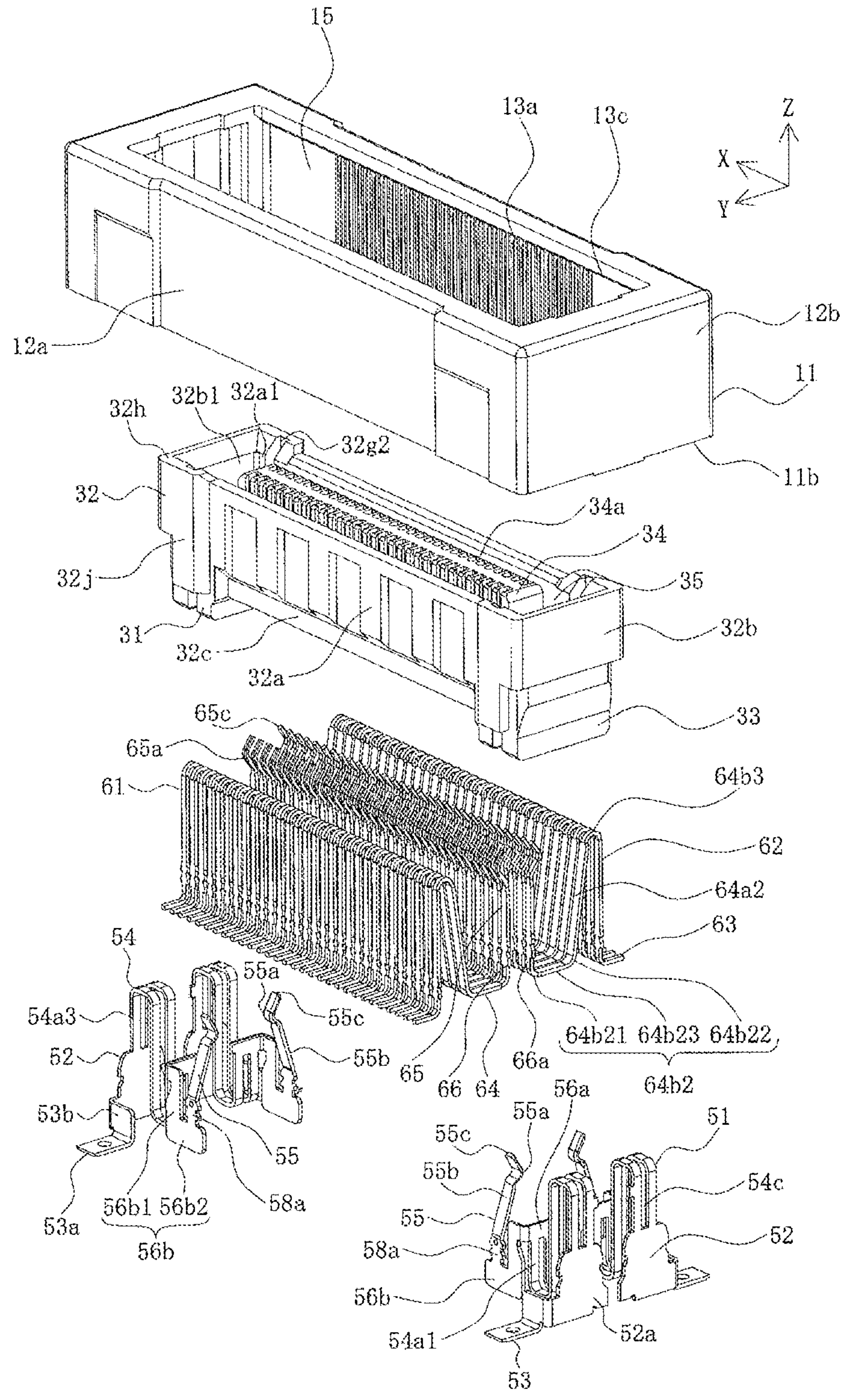
FIG. 31 is an exploded view illustrating the first connector according to Embodiment 4.
Figure 32A:
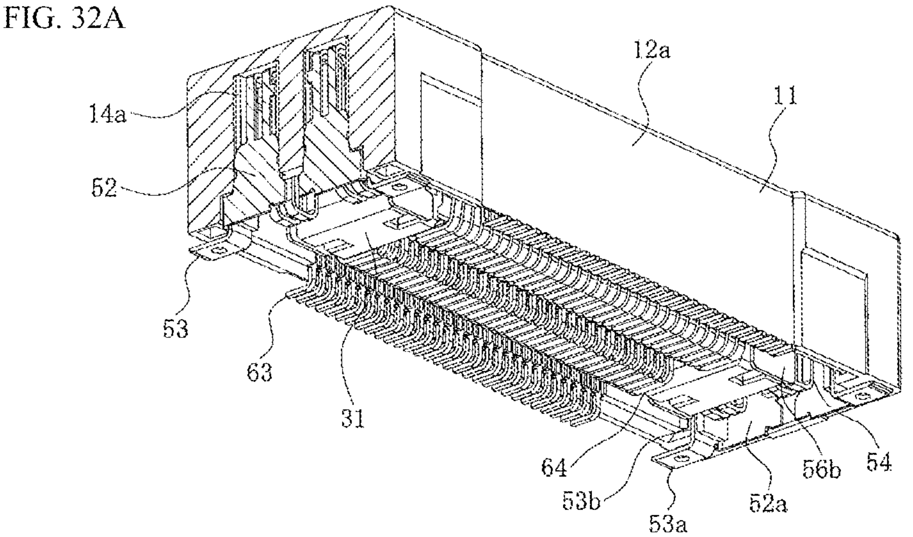
FIGS. 32A and 32B are perspective views illustrating the relationship of the movable housing and the signal terminal of the first connector according to Embodiment 4 as viewed diagonally from below.
Figure 32B:
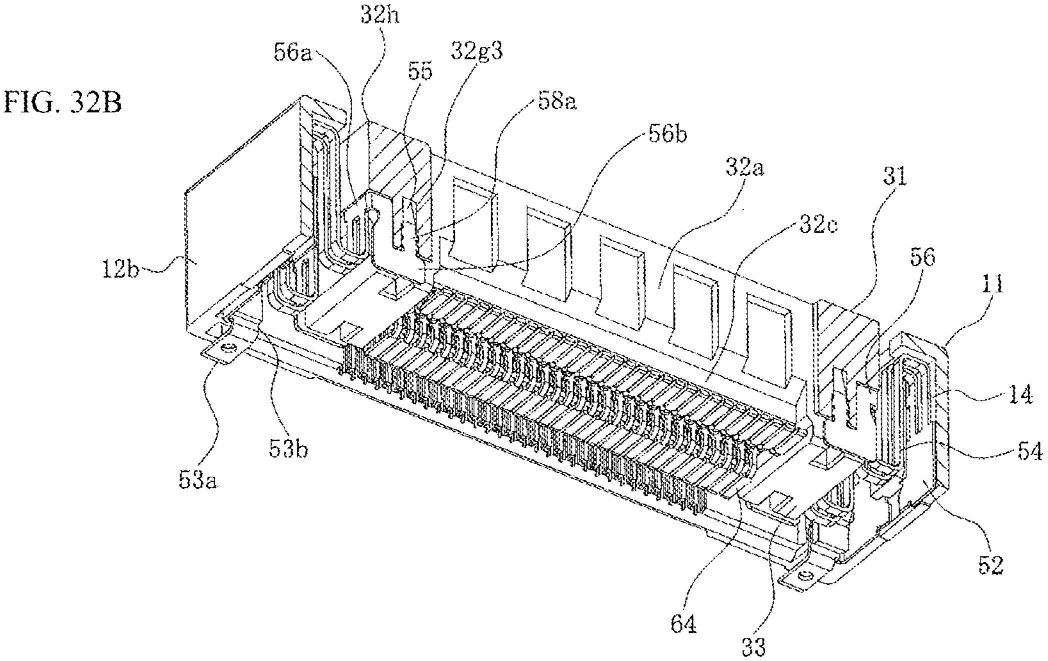

FIG. 31 is an exploded view of the first connector according to Embodiment 4. FIGS. 32A and 32B are perspective views diagonally from below of the relationship between the movable housing and the signal terminal of the first connector according to Embodiment 4. FIGS. 33A-33C illustrate a mounting portion of the power supply terminal of the first connector to the movable housing according to Embodiment 4.

FIG. 32A is a perspective view including a cross section as seen diagonally from below the first connector, and FIG. 32B is a perspective view including a side cross section as seen diagonally from below the first connector. FIG. 33A is a top view of the first connector, FIG. 33B is a sectional view taken along the line V-V in FIG. 33A, and FIG. 33C is a sectional view taken along the line W-W in FIG. 33A.

In Embodiments 1 to 3, the contact portion 55 of the first power supply terminal 51 is a long rectangular plate material in the vertical direction and the surface thereof functions as a contact surface for contacting with the second power supply terminal 151 of the second connector 101. Furthermore, the contact portion 55 is stowed in the second recess for stowing 32*g*2 formed on the inner surface 32*a*1 of the first movable housing 31 long wall portion 32*a*. In addition, the contact surface is parallel with the inner surface 32*a*1.

On the other hand, with the present embodiment, the contact portion 55 of the first power supply terminal 51 includes a contact arm portion 55*b* stowed in the second recess for stowing 32*g*2, a contact protruding portion 55*a* that is connected to the upper end of the contact arm portion 55*b* and bulges toward the inside of the first movable housing 31 in the width direction, and a contact tip portion 55*c* at the upper end of the contact protruding portion 55*a* that faces outwardly in the width direction of the first movable housing 31. Furthermore, in a state prior to mating of the first connector 10 and the second connector 101, in other words, an initial state without application of an external force, the contact arm portion 55*b* is at an overall gradual incline and the upper end faces inward in the width direction of the first connector 10, in other words, inward in the width direction of the first movable housing 31. At least a portion of the contact protruding portion 55*a* protrudes from the inner surface 32*a*1 to the inside of the first movable housing 31 in the width direction.

Specifically, similar to Embodiments 2 and 3, the first main body portion 56*a* of the first power supply terminal 51 movable-side retained portion 56 is a narrow long strip plate shape extending in the width direction of the first connector 10 and the second main body portion 56*b* is bent approximately 90 degrees and connected to the outer edge of the first main body portion 56*a* in the width direction of the first connector 10 and extends toward the center of the first connector 10 in the longitudinal direction. However, the second main body portion 56*b* of the present embodiment is a plate material with a substantially L shape in side view (as viewed from the width direction of the first connector 10) and includes a strip-shaped vertical portion 56*b*1 that extends downward from the contact portion with the first main body portion 56*a* and a strip-shaped horizontal portion 56*b*2 that extends from the lower end of the vertical portion 56*b*1 toward the center of the first connector 10 in the longitudinal direction.

Furthermore, the engaging protruding piece 58*a* extends upwards from the upper edge near the tip of the horizontal portion 56*b*2 and the upper end of the engaging protruding piece 58*a* is connected to the lower end of the contact portion 55, in other words, the lower end of the contact arm portion 55*b*. The engaging protruding piece 58*a* extends in the vertical direction (Z-axis direction), whereas the contact arm portion 55*b* is inclined and connects to the engaging protruding piece 58*a* and extends diagonally upward while facing the inside of the first movable housing 31 in the width direction. Note, for the present embodiment, the contact portion connecting piece 55*d* is omitted.

In addition, similar to Embodiments 2 and 3, the thickened portion 32*j* is formed on the long wall portion 32*a* of the first movable housing 31 main body portion 32 and the power supply terminal movable-side recess for stowing 32*g* includes the third stowing recess 32*g*3 formed inside the thickened portion 32*j*. However, with the present embodiment, the thickened portion 32*j* is formed over a broad area of the long wall portion 32*a* and the third stowing recess 32*g*3 is formed with the lower end thereof open to the lower surface of the thickened portion 32*j* and the upper end thereof connected to the lower end of the second recess for stowing 32*g*2 formed on the inner surface 32*a*1 of the long wall portion 32*a*. Furthermore, the contact portion 55 of the first power supply terminal 51 movable-side retained portion 56 is relatively inserted through the third stowing recess 32*g*3 into the second recess for stowing 32*g*2 from below and stowed. Note that at least a part of the contact protruding portion 55*a* projects inward in the width direction of the first movable housing 31 from the inner surface 32*a*1. In addition, the engaging protruding piece 58*a* connected to the lower end of the contact portion 55 is stowed and retained in the third stowing recess 32*g*3.

Note that the basic configuration of another point of the first connector 10 in the present embodiment is the same as that of Embodiment 3 described above; therefore, a description thereof is omitted.

Next, the configuration of the second connector 101 will be described.

Figure 34:
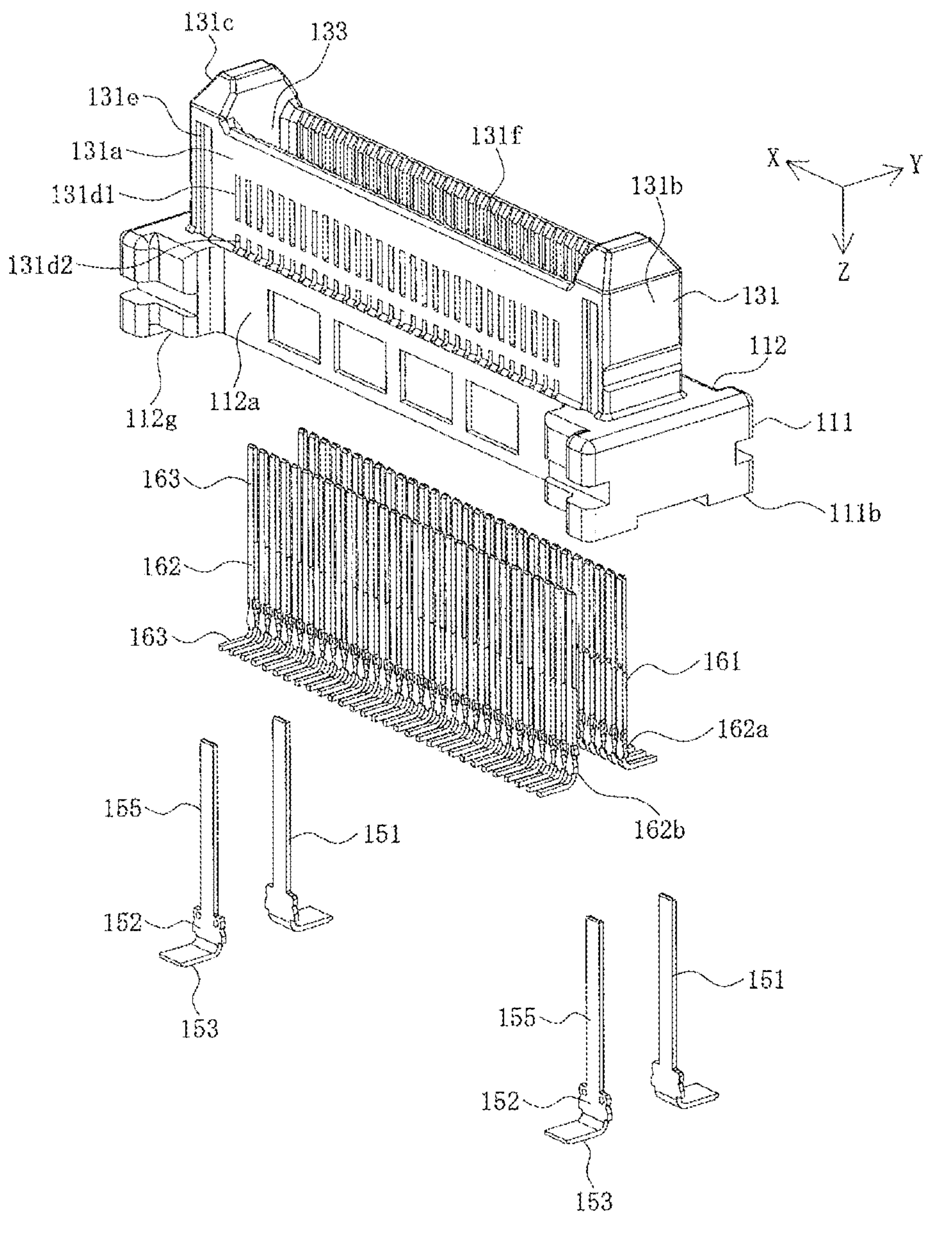
FIG. 34 is an exploded view illustrating the second connector according to embodiment 4.

FIG. 34 is an exploded view illustrating the second connector according to Embodiment 4.

With Embodiments 1 to 3, the contact portion 155 of the second power supply terminal 151 in an initial state without an external force applied includes the contact arm portion 155*b* with an overall gradual incline, the contact protruding portion 155*a* connected to the upper end of the contact arm portion 155*b* that bulges outwardly in the width direction of the second housing 111, and the contact tip portion 155*c* that is the upper end of the contact protruding portion 155*a* and faces inward in the width direction of the second housing 111. Furthermore, the contact portion 155 stowed in the power supply terminal stowing recess 131*e* of the second housing 111 upper portion 131 is such that at least a portion of the contact protruding portion 155*a* protrudes to the outside of the side surface of the short wall portion 112*b*.

In contrast, with the present embodiment, the contact portion 155 of the second power supply terminal 151 is a long rectangular plate material in the vertical direction and the surface thereof functions as the contact surface for contacting the first power supply terminal 51 of the first connector 10. Further, the contact portion 155 is stowed in the power supply terminal stowing recess 131*e* and is stationary. In addition, the contact surface is parallel to the side surface of the short wall portion 112*b* but is preferably indented into the short wall portion 112*b* beyond the side surface.

Note that the basic configuration of another point of the second connector 101 in the present embodiment is the same as that of Embodiment 3 described above; therefore, a description thereof is omitted.

Next, the operation of mating the first connector 10 and the second connector 101 with the above configuration is described.

Figure 35C:
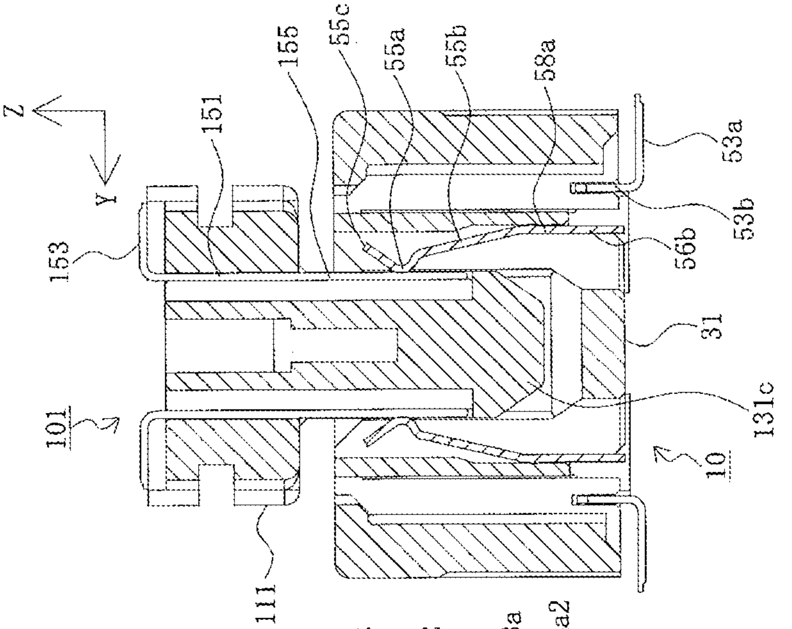
FIGS. 35A-35C are three views that illustrate the first connector and the second connector according to Embodiment 4 in a mated state.
Figure 35B:
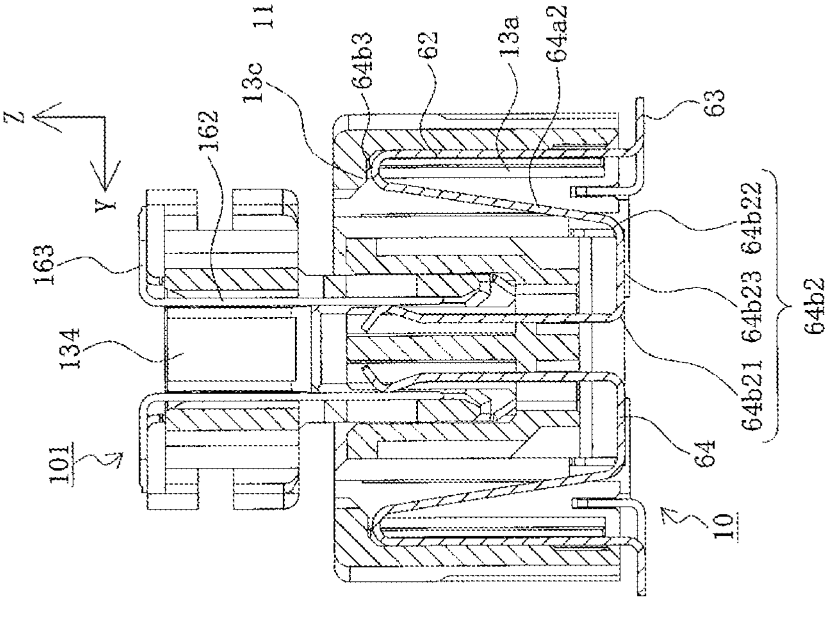
Figure 35A:
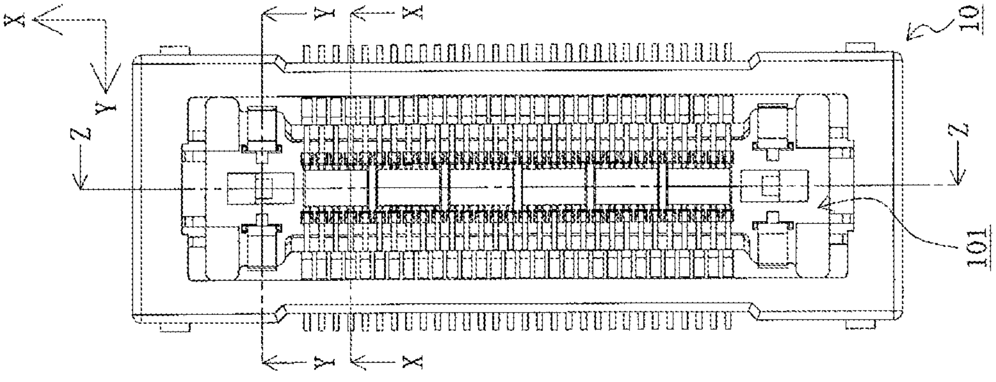
Figure 36:
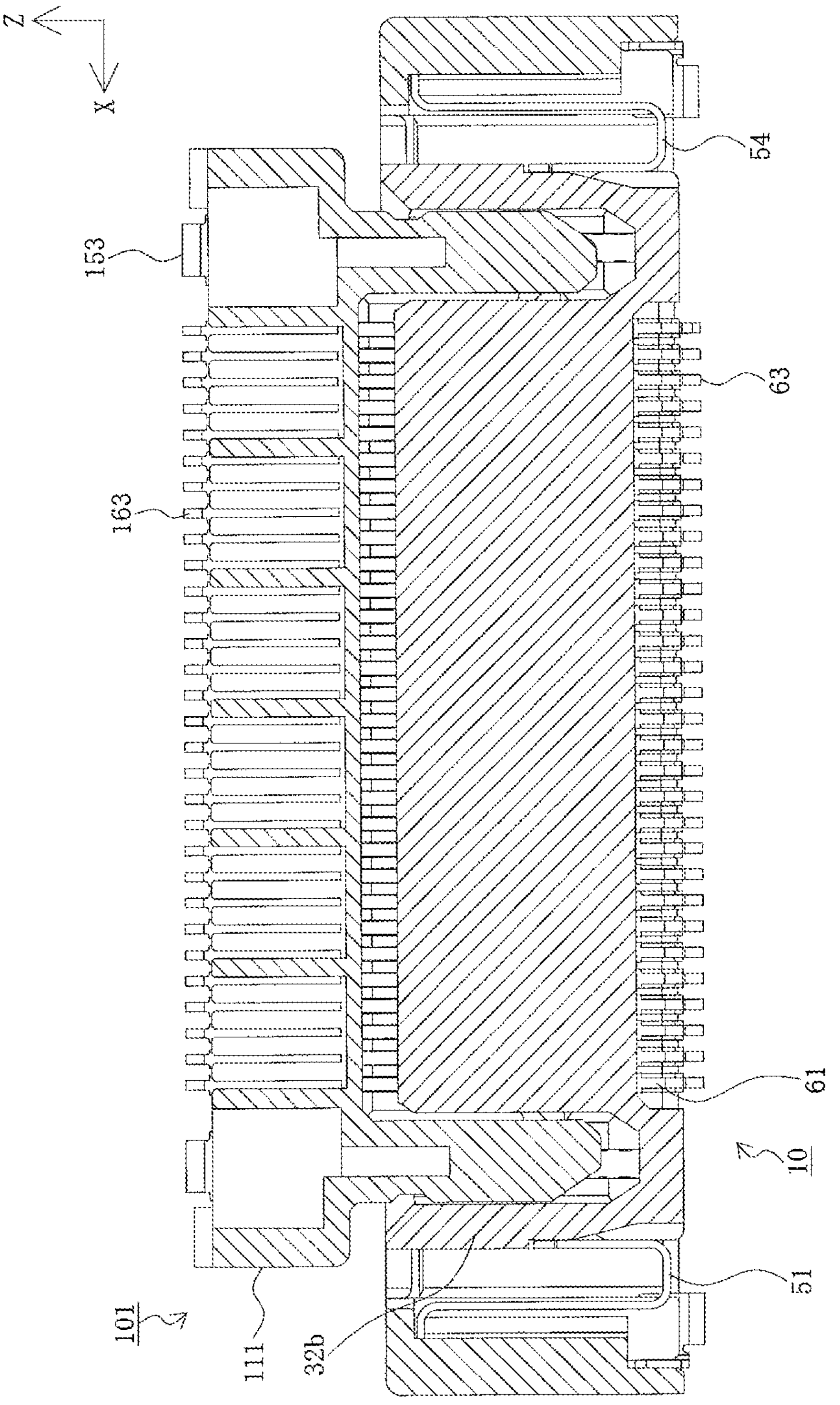
FIG. 36 is a vertical cross-sectional view illustrating the first connector and the second connector according to Embodiment 4 in a mated state and is a sectional view taken along the line Z-Z of FIG. 35A.
Figure 37:
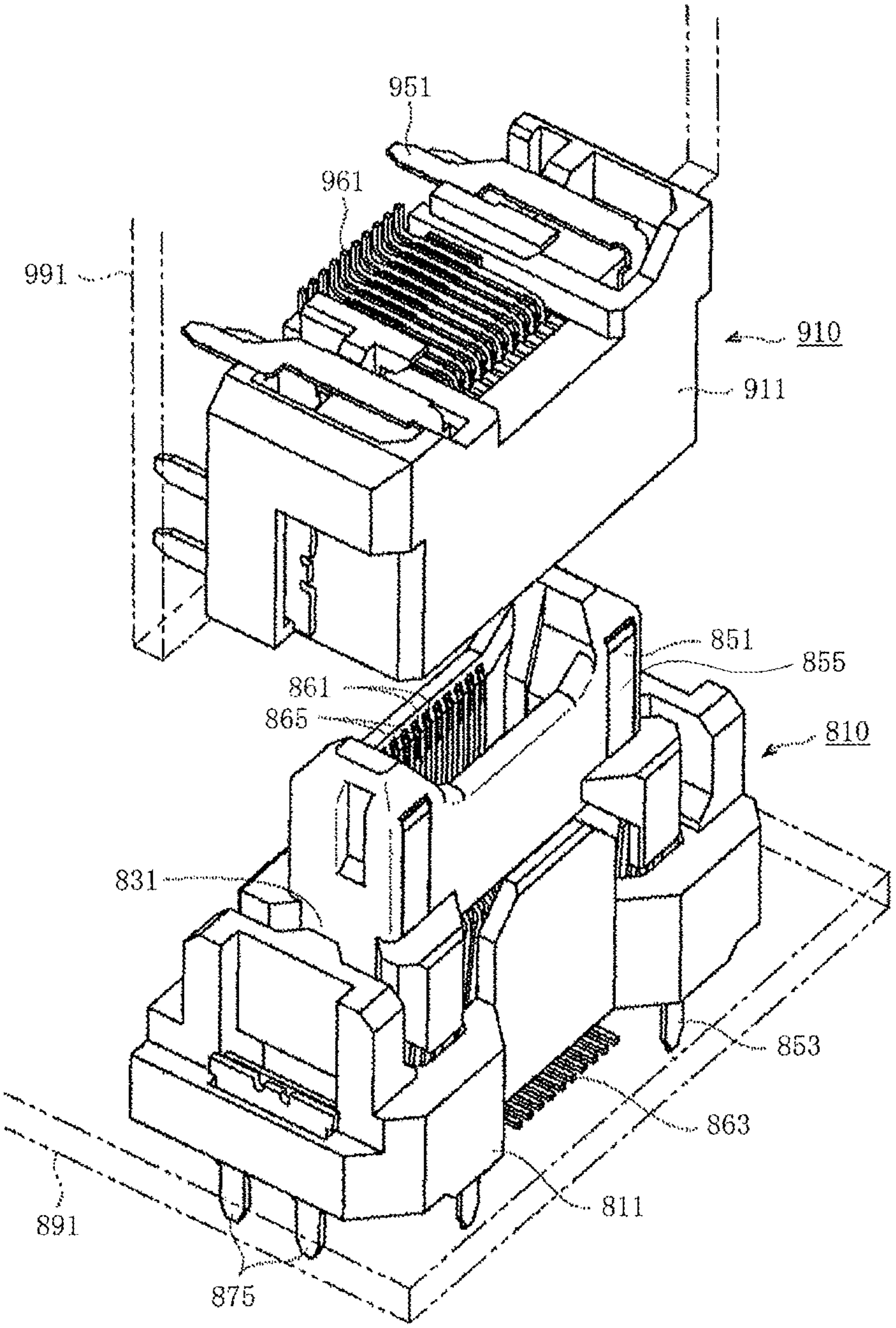
FIG. 37 is a perspective view illustrating a conventional board to board connector prior to mating.

FIGS. 35A-35C are three views illustrating a mated state of the first connector and the second connector according to Embodiment 4. FIG. 36 is a vertical cross-sectional view illustrating the first connector and the second connector according to Embodiment 4 in a mated state and is a sectional view taken along the line Z-Z in FIG. 35A. Note, in FIG. 35A is a plan view as viewed from the second connector side, FIG. 35B is a sectional view taken along the line X-X in FIG. 35A, and FIG. 35C is a sectional view taken along the line Y-Y in FIG. 35A.

As illustrated in FIGS. 35A-35C and FIG. 36, when the first connector 10 and second connector 101 are in a mated state, through mating of the first movable housing 31 and the second housing 111, the first signal terminals 61 and second signal terminals 161, that are mutually compatible, become conductive and the first power supply terminals 51 and the second power supply terminals 151, that are mutually compatible, become conductive.

Specifically, at least a portion of the short wall portion 131*b* of upper portion 131 of the second housing 111 near the upper end enters into the counterpart housing cavity for stowing 35 near the short wall portion 32*b* and the portion of the contact protruding portion 55*a* of the contact portion 55 stowed in the second recess for stowing 32*g*2 formed on the inner surface 32*a*1 of the long wall portion 32*a* near the corner portion 32*h* of the first movable housing 31 protruding from the inner surface 32*a*1 in the width direction of the first movable housing 31 contacts the contact surface that is the surface of the contact portion 155 of the second power supply terminal 151 stowed in the power supply terminal stowing recess 131*e* formed on the side surface extending in the longitudinal direction of the short wall portion 131*b*. Thus, the first power supply terminal 51 and the second power supply terminal 151 are electrically connected together. Here, the contact arm portion 55*b* of the first power supply terminal 51 functions as a cantilever and the contact protruding portion 55*a* is pushed against the contact surface of the second power supply terminal 151 contact portion 155 based on the elasticity exhibited by this cantilever; therefore, the conducting state of the first power supply terminal 51 and the second power supply terminal 151 is reliably maintained.

Note that an operation of mating the first connector 10 and the second connector 101 in the present embodiment and basic configurations and effects of the state of being mated and other points of the first connector 10 and the second connector 101 are the same as those of Embodiment 3 described above; therefore, descriptions thereof are omitted.

Moreover, the disclosure herein describes features relating to suitable typical embodiments. Various other embodiments, modifications, and variations within the scope and spirit of the claims appended hereto will naturally be conceived of by those skilled in the art upon review of the disclosure herein.

The present disclosure can be applied to a connector.

The invention claimed is:

1. A connector comprising:

a fixed housing including a long wall portion extending in a longitudinal direction of the fixed housing and a short wall portion extending in a width direction of the fixed housing, the short wall portion being connected to an end portion of the long wall portion;

a movable housing movable relative to the fixed housing, the movable housing including a long wall portion extending in a longitudinal direction of the movable housing and a short wall portion extending in a width direction of the movable housing and connected to an end portion of the long wall portion of the movable housing; and power supply terminals retained in the fixed housing and in the movable housing, each power supply terminals comprising a fixed-side retained portion retained in the short wall portion of the fixed housing, a movable-side retained portion retained in the movable housing, and a bent portion connected to the fixed-side retained portion and connected to the movable-side retained portion, and wherein in each power supply terminal, the movable-side retained portion includes a first retained portion with at least a portion extending along the short wall portion of the movable housing and a second retained portion with at least a portion extending along the long wall portion of the movable housing.

2. The connector according to claim 1, wherein in each power supply terminal, the first retained portion includes a first upper end cover portion covering an upper end portion of the short wall portion of the movable housing, and the second retained portion includes a second upper end cover portion covering an upper end portion of the long wall portion of the movable housing.

3. The connector according to claim 1, wherein each power supply terminal further comprises a contact portion connected to the second retained portion, wherein the second retained portion is arranged inside the long wall portion of the movable housing, and the contact portion is configured to come into contact with a counterpart power supply terminal.

4. The connector according to claim 3, wherein in each power supply terminal, the contact portion of each power supply terminal extends in a vertical direction along an inner surface of the long wall portion of the movable housing.

5. The connector according to claim 3, wherein in each power supply terminal, the contact portion includes a contact arm portion that extends in a vertical direction at an incline with respect to an inner surface of the long wall portion of the movable housing, and each power supply terminal further comprises a contact protruding portion connected to an upper end of the contact arm portion and which bulges inward in the width direction of the movable housing.

6. The connector according to claim 1, wherein the movable-side retained portion of each power supply terminal further comprises a second retained portion which includes an engaged portion that is engaged with the movable housing.

7. The connector according to claim 6, wherein the engaged portion of each power supply terminal is inserted and engaged from below in an engagement recess in which a lower end thereof is open to a downward facing surface of the movable housing.

8. The connector according to claim 1, wherein in each power supply terminal, the bent portion is bent in a substantially S-shape when viewed from the width direction of the movable housing, wherein a first end of the bent portion is connected to an upper end of the fixed-side retained portion and a second end of the bent portion is connected to a lower end of the first retained portion of the movable-side retained portion.

9. The connector according to claim 1, wherein each power supply terminal comprises a board connecting portion connected to the fixed-side retained portion, and wherein each board connecting portion includes a relay portion extending from the fixed-side retained portion toward a center of the fixed housing in the longitudinal direction of the fixed housing and a main body portion connected to the relay portion that extends towards an outside of the fixed housing in the width direction.

10. The connector according to claim 1, wherein the power supply terminals are arranged in pairs at both ends of the fixed housing in the longitudinal direction of the fixed housing and lined up in the width direction of the fixed housing respectively at both ends of the fixed housing in the longitudinal direction of the fixed housing.

11. The connector according to claim 2, wherein each power supply terminal further comprises a contact portion connected to the second retained portion, wherein the second retained portion is arranged inside the long wall portion of the movable housing, and the contact portion is configured to come into contact with a counterpart power supply terminal.

12. The connector according to claim 11, wherein in each power supply terminal, the contact portion of each power supply terminal extends in a vertical direction along an inner surface of the long wall portion of the movable housing.

13. The connector according to claim 11, wherein in each power supply terminal, the contact portion includes a contact arm portion that extends in a vertical direction at an incline with respect to an inner surface of the long wall portion of the movable housing, and each power supply terminal further comprises a contact protruding portion connected to an upper end of the contact arm portion and which bulges inward in the width direction of the movable housing.

14. The connector according to claim 11, wherein each power supply terminal comprises a board connecting portion connected to the fixed-side retained portion, and wherein each board connecting portion includes a relay portion extending from the fixed-side retained portion toward a center of the fixed housing in the longitudinal direction of the fixed housing and a main body portion connected to the relay portion that extends towards an outside of the fixed housing in the width direction.

15. The connector according to claim 2, wherein the movable-side retained portion of each power supply terminal further comprises a second retained portion which includes an engaged portion that is engaged with the movable housing.

16. The connector according to claim 15, wherein the engaged portion of each power supply terminal is inserted and engaged from below in an engagement recess in which a lower end thereof is open to a downward facing surface of the movable housing.

17. The connector according to claim 15, wherein each power supply terminal comprises a board connecting portion connected to the fixed-side retained portion, and wherein each board connecting portion includes a relay portion extending from the fixed-side retained portion toward a center of the fixed housing in the longitudinal direction of the fixed housing and a main body portion connected to the relay portion that extends towards an outside of the fixed housing in the width direction.

18. The connector according to claim 2, wherein in each power supply terminal, the bent portion is bent in a substantially S-shape when viewed from the width direction of the movable housing, wherein a first end of the bent portion is connected to an upper end of the fixed-side retained portion and a second end of the bent portion is connected to a lower end of the first retained portion of the movable-side retained portion.

19. The connector according to claim 2, wherein each power supply terminal comprises a board connecting portion connected to the fixed-side retained portion, and wherein each board connecting portion includes a relay portion extending from the fixed-side retained portion toward a center of the fixed housing in the longitudinal direction of the fixed housing and a main body portion connected to the relay portion that extends towards an outside of the fixed housing in the width direction.

20. The connector according to claim 2, wherein the power supply terminals are arranged in pairs at both ends of the fixed housing in the longitudinal direction of the fixed housing and lined up in the width direction of the fixed housing respectively at both ends of the fixed housing in the longitudinal direction of the fixed housing.

* * * * *